(12) United States Patent
Orihara et al.

(10) Patent No.: US 11,274,981 B2
(45) Date of Patent: Mar. 15, 2022

(54) STRESS MEASUREMENT DEVICE FOR STRENGTHENED GLASS, STRESS MEASURING METHOD FOR STRENGTHENED GLASS, MANUFACTURING METHOD OF STRENGTHENED GLASS, AND STRENGTHENED GLASS

(71) Applicants: ORIHARA INDUSTRIAL CO., LTD., Toshima-ku (JP); AGC Inc., Chiyoda-ku (JP)

(72) Inventors: Shuji Orihara, Toshima-ku (JP); Yoshio Orihara, Toshima-ku (JP); Satoshi Ogami, Chiyoda-ku (JP); Seiji Inaba, Chiyoda-ku (JP)

(73) Assignees: ORIHARA INDUSTRIAL CO., LTD., Toshima-ku (JP); AGC Inc., Chiyoda-ku (JP)

( * ) Notice: Subject to any disclaimer, the term of this patent is extended or adjusted under 35 U.S.C. 154(b) by 331 days.

(21) Appl. No.: 16/363,010

(22) Filed: Mar. 25, 2019

(65) Prior Publication Data

US 2019/0219463 A1 Jul. 18, 2019

Related U.S. Application Data

(63) Continuation of application No. PCT/JP2017/032901, filed on Sep. 12, 2017.

(30) Foreign Application Priority Data

Sep. 26, 2016 (JP) .............................. JP2016-187489
Feb. 23, 2017 (JP) .............................. JP2017-032730

(51) Int. Cl.
*G01L 1/24* (2006.01)
*C03C 21/00* (2006.01)
(Continued)

(52) U.S. Cl.
CPC .............. *G01L 1/24* (2013.01); *C03C 21/002* (2013.01); *G01L 1/00* (2013.01); *G01N 21/21* (2013.01)

(58) Field of Classification Search
CPC .......... G01L 1/24; G01L 1/00; G01L 5/0047; G01N 21/21; C03C 21/002; C03B 18/12; C03B 27/067; G02F 1/13
(Continued)

(56) References Cited

U.S. PATENT DOCUMENTS 4,655,589 A      4/1987 Cestaro et al.
9,442,028 B2 *   9/2016 Roussev ................. G01L 1/241
(Continued)

FOREIGN PATENT DOCUMENTS

CN    103940537 A    7/2014
JP    49-16677       4/1974
(Continued)

OTHER PUBLICATIONS

International Search Report dated Oct. 24, 2017 in PCT/JP2017/032901, filed Sep. 12, 2017 (with English Translation).
(Continued)

*Primary Examiner* — Roy M Punnoose
(74) *Attorney, Agent, or Firm* — Oblon, McClelland, Maier & Neustadt, L.L.P.

(57) ABSTRACT

A stress measurement device for strengthened glass includes a polarization phase difference variable member configured to vary a polarization phase difference of a laser light by one wavelength of the laser light or more; an imaging element configured to image a plurality of times at a predetermined time interval a scattered light emitted according to the laser light with the varied polarization phase difference entering the strengthened glass, and obtain a plurality of images; and an arithmetic unit configured to measure a periodic change
(Continued)

in luminance of the scattered light using the plurality of images, calculate a change in a phase of the change in luminance, and calculate a stress distribution in a depth direction from a surface of the strengthened glass based on the change in the phase.

41 Claims, 33 Drawing Sheets

(51) Int. Cl.
   *G01L 1/00* (2006.01)
   *G01N 21/21* (2006.01)

(58) Field of Classification Search
   USPC .......................... 356/3.09, 33, 364, 630, 445
   See application file for complete search history.

(56) References Cited

U.S. PATENT DOCUMENTS

| | | | | |
|---|---|---|---|---|
| 2001/0049327 A1* | 12/2001 | Hachitani | ............. | C03C 21/002 501/69 |
| 2010/0035038 A1* | 2/2010 | Barefoot | ................. | C03C 3/064 428/220 |
| 2014/0368808 A1 | 12/2014 | Roussev et al. | | |
| 2015/0308908 A1 | 10/2015 | Roussev et al. | | |
| 2016/0356760 A1 | 12/2016 | Roussev et al. | | |

FOREIGN PATENT DOCUMENTS

| | | | |
|---|---|---|---|
| JP | 53-136886 | 11/1978 | |
| JP | 55-33675 | 3/1980 | |
| JP | 2001-348245 | 12/2001 | |
| JP | 2011-530470 | 12/2011 | |
| JP | 2014-28730 | 2/2014 | |
| JP | 2016-24002 | 2/2016 | |
| JP | 2016-142600 | 8/2016 | |
| WO | WO 2012/128184 A1 | 9/2012 | |
| WO | WO-2012128184 A1 * | 9/2012 | ........... G01L 5/0047 |

OTHER PUBLICATIONS

Written Opinion dated Oct. 24, 2017 in PCT/JP2017/032901, filed Sep. 12, 2017.

Kishii, T. "Surface Stress Measurement Using Optical Waveguide Effect of Chemically Tempered Glass", Yogyo-Kyokaki-Shi 87 (3), 1979, 8 pages (with English Abstract).

Kishii, T. et al. "Scattered Light Photoelasticity of Glass by Argon Ion Laser", Yogyo-Kyokaki-Shi 80 (4), 1972, 6 pages (with English Abstract).

* cited by examiner

POINT A

TIME t1

POINT A

TIME t2

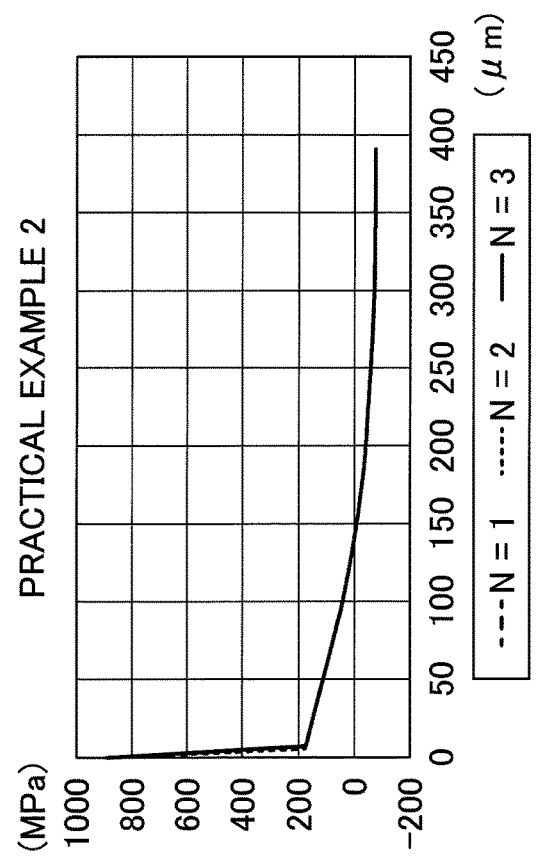
FIG.33A COMPARATIVE EXAMPLE 1
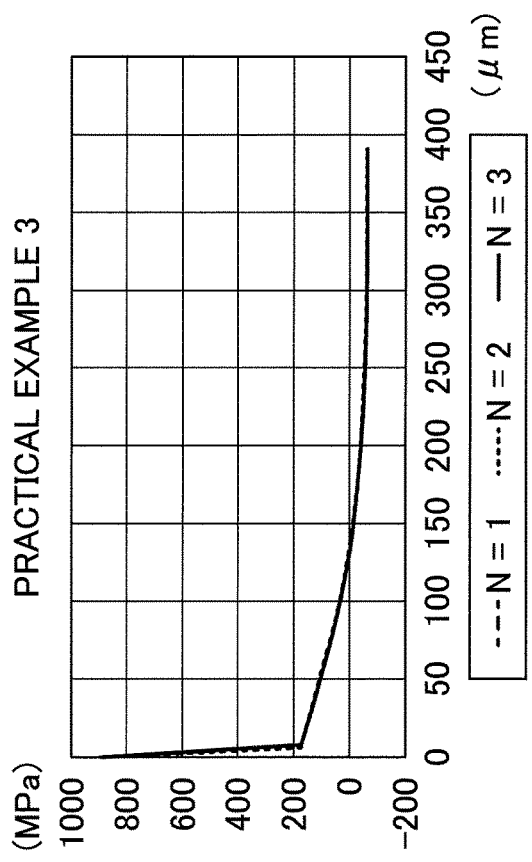
FIG.33B PRACTICAL EXAMPLE 1
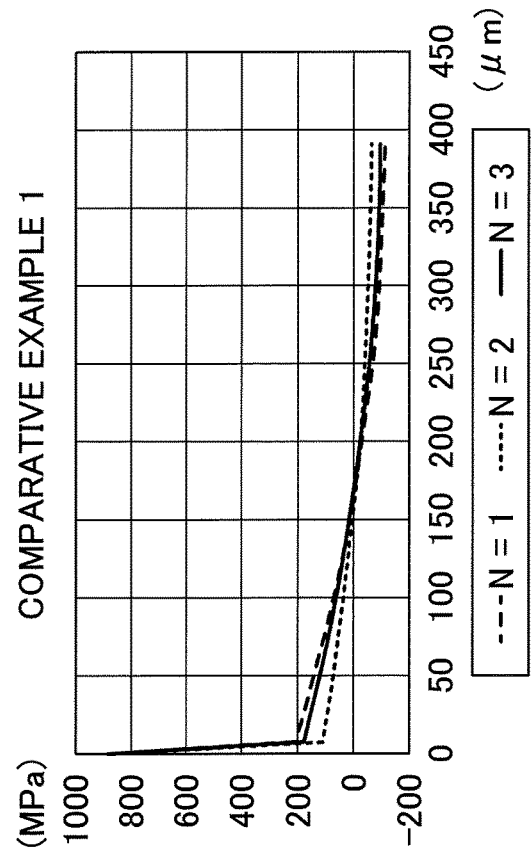
FIG.33C PRACTICAL EXAMPLE 2
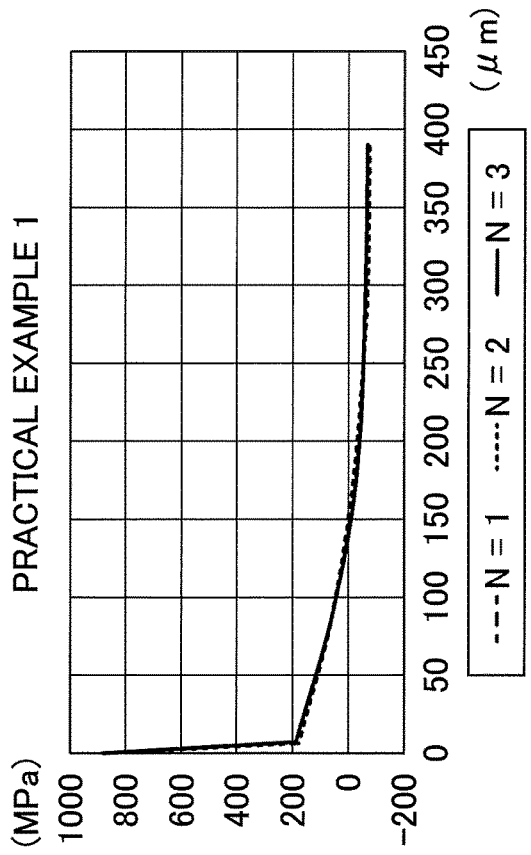
FIG.33D PRACTICAL EXAMPLE 3

CAMERA IMAGE

STRESS MEASUREMENT DEVICE FOR STRENGTHENED GLASS, STRESS MEASURING METHOD FOR STRENGTHENED GLASS, MANUFACTURING METHOD OF STRENGTHENED GLASS, AND STRENGTHENED GLASS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/032901 filed on Sep. 12, 2017 and designating the U.S., which claims priority of Japanese Patent Applications No. 2016-187489 filed on Sep. 26, 2016 and No. 2017-032730 filed on Feb. 23, 2017. The entire contents of the foregoing applications are incorporated herein by reference.

BACKGROUND OF THE INVENTION

1. Field of the Invention

The disclosure herein generally relates to a stress measurement device for a strengthened glass, a stress measuring method for a strengthened glass, a manufacturing method of a strengthened glass, and a strengthened glass.

2. Description of the Related Art

In an electronic apparatus, such as a mobile phone or a smart phone, and display unit, a glass is often used for a display unit or a housing body. For such a glass, in order to increase strength, a so-called chemically strengthened glass, in which the strength is increased by forming a surface layer by an ion exchange (ion exchange layer) on a glass surface, is used. The surface layer may include a compressive stress layer, which is present at least on the glass surface side and generates a compressive stress due to ion exchange, and a tensile stress layer, which is present on an inner side of the glass adjacent to the compressive stress layer and generates a tensile stress.

Techniques for measuring a stress of the surface layer of the strengthened glass include, for example, a technique of measuring a compressive stress of the surface layer in a non-destructive manner (in the following, referred to as a non-destructive measuring technique) by using a light waveguide effect and a photoelastic effect, in the case where a refractive index of the surface layer of the strengthened glass is greater than an internal refractive index. In the non-destructive measuring technique, a monochromatic light enters the surface layer of the strengthened glass, to generate a plurality of modes according to the optical waveguide effect. In each mode, a light in which a light beam path is determined is extracted, and is caused to form a bright line corresponding to the mode by a convex lens. Note that the formed bright lines are present as many as the number of modes.

Moreover, in the non-destructive measurement technique, the light extracted from the surface layer is configured so that bright lines of two light components, a horizontal light oscillation direction and a vertical light oscillation direction with respect to an emission surface, can be observed. By using a property that a light of the lowest order mode 1 passes near the surface of the surface layer, from positions of bright lines corresponding to the light of the lowest order of the two light components, refractive indices of the respective light components are calculated. From a difference between the refractive indices of the two light components and a photoelastic constant of the glass, a stress near the surface of the strengthened glass is obtained (See, for example, Japanese Unexamined Patent Application Publication No. S53-136886).

A method of determining a stress on an outermost surface of the glass from positions of bright lines corresponding to the mode 1 and mode 2 by extrapolation, based on the principle of the aforementioned non-destructive measurement technique (in the following, referred to as a surface stress value), and assuming that a refractive index distribution of the surface layer varies linearly, to determine a depth of a compressive stress layer has been proposed (see, for example, Japanese Unexamined Patent Application Publication No. 2016-142600 and Yogyo-Kyokai-Shi 87 {3} 1979).

Moreover, a method of defining a tensile stress CT in the glass based on the surface stress value measured by the aforementioned measuring technique using the surface waveguide light and the depth of the compressive stress layer, and managing the strength of the strengthened glass with a CT value has been proposed (See, for example, Japanese Translation of PCT International Application Publication No. JP-T-2011-530470). In this method, the tensile stress CT is calculated by "CT=(CS×DOL)/(t×1000−2×DOL)" (equation 0). In the equation, CS represents a surface stress value (MPa), DOL is a depth of the compressive stress layer (unit: μm), and t is a plate thickness (unit: mm).

Typically, if no external force is applied, a sum of stresses is zero. Thus, a tensile stress is generated substantially uniformly so that a value obtained by integrating the stress formed by the chemical strengthening along the depth direction is balanced at a central portion which is not chemically strengthened.

Moreover, a method of measuring a stress distribution from the glass surface layer to the glass depth where the stress distribution is curved (DOL_TP), and predicting a stress distribution where the depth is greater than DOL_TP, based on the measurement result of the stress distribution on the glass surface layer side (measurement image), has been proposed (See, for example, U.S. Patent Application Publication No. 2016/0356760). However, in this method, the stress distribution where the depth is greater than DOL_TP is not actually measured, and there is a problem that measurement reproducibility is poor.

SUMMARY OF THE INVENTION

Problem to be Solved by the Invention

Recently, a lithium-aluminosilicate based glass is attracting attention, in which an ion exchange is easily performed, and in a chemical strengthening process, the surface stress value can be increased and the depth of the stress layer can be increased in a short time.

The glass is immersed in a mixed molten salt of sodium nitrate and potassium nitrate at high temperature, to perform chemical strengthening treatment. Because sodium ions and potassium ions have high concentrations in the molten salt, ion exchange is performed with lithium ions in the glass. Because sodium ions are more easily diffused into the glass, first, lithium ions in the glass and sodium ions in the molten salt are exchanged.

A refractive index of the glass becomes lower when sodium ions are ion-exchanged with lithium ions, and becomes higher when potassium ions are ion-exchanged with lithium ions or sodium ions. That is, because compared with a portion in the glass where an ion-exchange is not performed, the ion-exchanged region near the glass surface has a high potassium ion concentration, and the deep ion-exchanged region has a high sodium ion concentration, the glass has a feature that near the outermost surface of the ion-exchanged glass, the refractive index decreases with the depth, but in the region where the depth is greater than a predetermined value, the refractive index increases with the depth.

Thus, with the stress measurement device using a waveguide light at the surface, described in "Description of the related art", the stress distribution of the deep portion could not be measured only by the stress value or the stress distribution of the outermost surface; thus, the depth of the stress layer, the CT value, and the entire stress distribution could not be obtained. As a result, development for finding an appropriate chemical strengthening condition was not progressed. Moreover, a quality in manufacturing could not be managed.

Moreover, in the case where an aluminosilicate glass or a soda glass is chemically strengthened after an air-cooling strengthening, the stress distribution or the stress value of the chemically strengthened portion can be measured by the stress measurement device using the surface waveguide light, described in "Description of the related art". However, in a portion, which was only air-cooling strengthened and was not chemically strengthened, a change of the refractive index is small, and cannot be measured by the stress measurement device using the surface waveguide light, described in "Description of the related art". Thus, the depth of the stress layer, the CT value, and the entire stress distribution could not be obtained. As a result, development for finding an appropriate chemical strengthening condition was not progressed. Moreover, a quality in manufacturing could not be managed.

The present invention has been made in view of the above problem, and aims at providing a stress measurement device for a strengthened glass, that can measure a stress distribution of the strengthened glass from an outermost surface of the strengthened glass to a portion that is deeper than the related art, regardless of a refractive index distribution of the strengthened glass.

Means for Solving the Problem

According to an aspect of the present invention, a stress measurement device for strengthened glass includes a polarization phase difference variable member configured to vary a polarization phase difference of a laser light by one wavelength of the laser light or more; an imaging element configured to image a plurality of times at a predetermined time interval a scattered light emitted according to the laser light with the varied polarization phase difference entering the strengthened glass, and obtain a plurality of images; and an arithmetic unit configured to measure a periodic change in luminance of the scattered light using the plurality of images, calculate a change in a phase of the change in luminance, and calculate a stress distribution in a depth direction from a surface of the strengthened glass based on the change in the phase.

Effects of the Invention

According to the aspect of the present invention, it is possible to provide a stress measurement device for a strengthened glass, that can measure a stress distribution of the strengthened glass from an outermost surface of the strengthened glass to a portion that is deeper than the related art, regardless of a refractive index distribution of the strengthened glass.

BRIEF DESCRIPTION OF THE DRAWINGS

Other objects and further features of embodiments will become apparent from the following detailed description when read in conjunction with the accompanying drawings, in which:

FIGS. 33A to 33D are diagrams depicting stress distributions obtained in a comparative example 1 and practical examples 1 to 3;

DETAILED DESCRIPTION OF THE PREFERRED EMBODIMENTS

Figure 1:
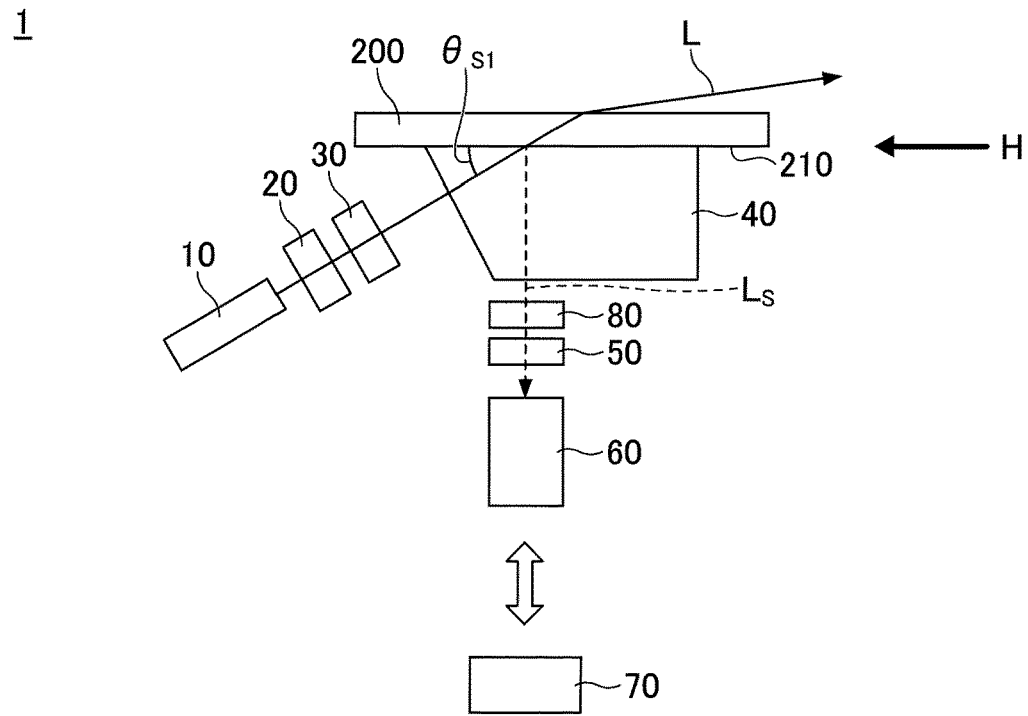
FIG. 1 is a diagram depicting an example of a stress measurement device according to a first embodiment.

In the following, with reference to drawings, embodiments of the present invention will be described. In each drawing, the same or corresponding reference numeral is assigned to the same or corresponding component, and redundant explanation will be omitted.

First Embodiment

FIG. 1 is a diagram depicting an example of a stress measurement device according to a first embodiment. As illustrated in FIG. 1, the stress measurement device 1 includes a laser light source 10; a polarization member 20; a polarization phase difference variable member 30; a light supply member 40; a light conversion member 50; an imaging element 60; an arithmetic unit 70; and a light wavelength selection member 80.

A member with a reference numeral 200 is a strengthened glass serving as a body to be measured. The strengthened glass 200 is a glass subjected to a strengthening treatment by applying a chemical strengthening method, an air cooling strengthening method, or the like.

The laser light source 10 is arranged so that a laser light L from the light supply member 40 is incident on a surface layer of the strengthened glass 200, and the polarization phase difference variable member 30 is inserted between the laser light source 10 and the light supply member 40.

For the laser light source 10, for example, a semiconductor laser, a helium neon laser, or an argon laser may be used. Typically, the semiconductor laser has a polarization, and a semiconductor laser having a wavelength of 405 nm, 520 nm, 630 nm or the like is practically used. As a wavelength of a laser light becomes shorter, a beam diameter can be made smaller and a spatial resolution becomes higher.

In order to enhance the resolution in the depth direction of the strengthened glass 200, a position of the smallest beam diameter of a laser light is preferably located inside an ion exchange layer of the strengthened glass 200, and the smallest beam diameter is preferably 20 Tim or less. Further preferably, the position of the smallest beam diameter of the laser light locates on a surface 210 of the strengthened glass 200. Note that because the beam diameter of the laser light is the resolution in the depth direction, the beam diameter is required to be the necessary resolution in the depth direction or less. The beam diameter means a size of $1/e^2$ (about 13.5%) of a beam width when a luminance at the center of the beam is the maximum. In the case where a beam shape is an elliptical shape or a sheet shape, the beam diameter means the minimum width. However, in this case, the minimum width of the beam diameter is required to be directed in the glass depth direction.

The polarization member 20, as necessary, is inserted between the laser light source 10 and the polarization phase difference variable member 30. Specifically, in the case where the laser light L emitted from the laser light source 10 is not a polarized light, the polarization member 20 is inserted between the laser light source 10 and the polarization phase difference variable member 30. When a laser light L emitted from the laser light source 10 is polarized light, the polarization member 20 may be inserted or may not be inserted. Moreover, the laser light source 10 and the polarization member 20 are arranged so that an angle formed by a polarization plane of the laser light L and the surface 210 of the strengthened glass 200 is 45°. For the polarization member 20, for example, a polarization plate arranged in a rotatable state can be used. However, another member having the same function may be used.

The light supply member 40 is placed in a state of being brought into optical contact with the surface 210 of the strengthened glass 200, which is to be measured. The light supply member 40 has a function of causing a light from the laser light source 10 to be incident on the strengthened glass 200. For the light supply member 40, for example, a prism made of an optical glass may be used. In this case, a refractive index of the prism is required to be almost the same as the refractive index of the strengthened glass 200 (within ±0.2), so that a laser light is optically incident via the prism at the surface 210 of the strengthened glass 200.

A liquid having substantially the same refractive index as the refractive index of the strengthened glass 200 may be sandwiched between the light supply member 40 and the strengthened glass 200. Thus, the laser light L can be efficiently incident into the strengthened glass 200. This configuration will be described in detail in a third embodiment.

A laser light L passing through the strengthened glass 200 generates a small amount of scattered light $L_S$. A luminance of the scattered light $L_S$ varies according to a polarization phase difference of a part where the laser light L is scattered. Moreover, the laser light source 10 is arranged so that an angle, $\theta_{s2}$ illustrated in FIG. 2, formed by the polarization direction of the laser light L and the surface 210 of the strengthened glass 200 is 45° (within ±5°). Thus, according to a photoelastic effect of a stress applied in an in-plane direction of the strengthened glass 200, a birefringence occurs. As a laser light L goes through the strengthened glass, the polarization phase difference also varies. Along with the variation of the polarization phase difference, the luminance of the scattered light $L_S$ also varies. Note that the polarization phase difference means a phase difference (retardation) generated according to birefringence.

Moreover, an angle $\theta_{s1}$ formed by the laser light L and the surface 210 of the strengthened glass 200 is set to be 10° or more and 30° or less. When the angle is less than 10°, according to an optical waveguide effect, the laser light propagates on the glass surface, and information in the glass cannot be acquired. In the case where the angle is greater than 30°, the depth resolution inside the glass with respect to an optical path length of laser is lowered, and is not preferable for a measuring method. Thus, preferably, $\theta_{s1}$ is set to 15°±5°.

Figure 2:
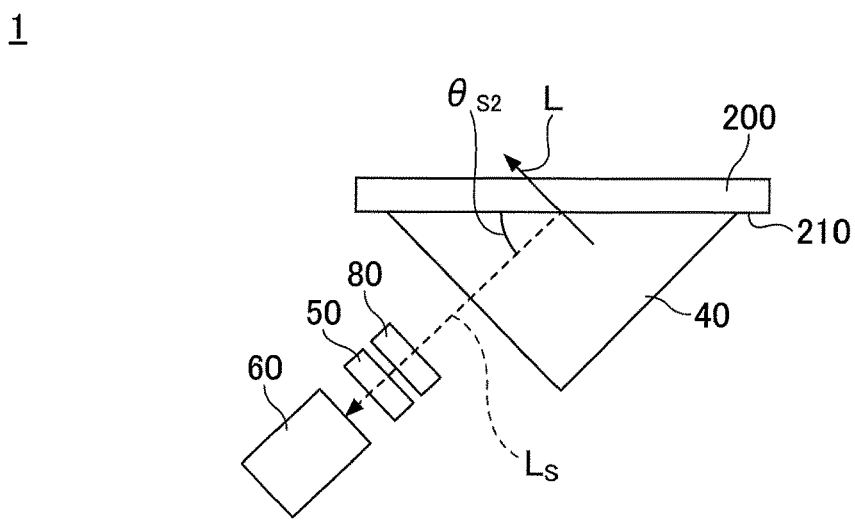
FIG. 2 is a diagram depicting an example of the stress measurement device according to the first embodiment viewed from an H direction in FIG. 1.

Next, the imaging element 60 will be described with reference to FIG. 2. FIG. 2 is a diagram depicting the stress measurement device according to the first embodiment, viewed from the H direction in FIG. 1, and illustrating a position of the imaging element 60. Because a polarized light of a laser light L is incident on the surface 210 of the strengthened glass 200 at an angle of 45°, a scattered light $L_S$ is also radiated at an angle of 45° with respect to the surface 210 of the strengthened glass 200. Thus, in order to capture the scattered light $L_S$ radiated at 45° with respect to the surface of the strengthened glass, the imaging device 60 is arranged, as illustrated in FIG. 2, in a direction of 45° with respect to the surface 210 of the strengthened glass 200. That is, in FIG. 2, $\theta_{s2}$ is 45°.

Moreover, a light conversion member 50 is inserted between the imaging element 60 and the laser light L so that an image of the scattered light $L_S$ by the laser light L is focused on the imaging element 60. As the light conversion member 50, a convex lens made of glass or a lens, in which a plurality of convex lenses or concave lenses are combined, may be used.

Moreover, in the case where a telecentric lens, in which a principal ray is parallel to an optical axis, is employed for the lens in which a plurality of lenses are combined, an image can be focused only with light scattering mainly in a 45° direction (direction of the imaging element) with respect to the glass surface of the strengthened glass 200, among the scattered light scattered in four directions from the laser light L. Thus, the lens has an effect of reducing unnecessary light such as irregular reflection on the glass surface.

Moreover, a light wavelength selection member 80, which blocks 50% or more of a light with wavelength of at least the wavelength of the laser light +100 nm or higher and the wavelength of the laser light −100 nm or lower, and preferably blocks 90% or more, may be inserted between the laser light L and the imaging element 60. When the light wavelength selection member 80 is inserted, a fluorescence light or an external light generated from the laser light L can be removed, and only the scattered light $L_S$ is collected into the imaging element 60. For the optical wavelength selection member 80, for example, a band-pass filter having a multi-layered dielectric film or a short-pass filter may be used.

For the imaging element 60, for example, a CCD (Charge Coupled Device) element or a CMOS (Complementary Metal Oxide Semiconductor) sensor element may be used. Although not shown in FIGS. 1 and 2, the CCD element or the CMOS sensor element is connected to a control circuit for controlling the element and extracting an electric signal of an image from the element, a digital image data generation circuit for converting the electric signal into digital image data, and a digital recording device for recording a plurality of pieces of digital image data. Furthermore, the digital image data generation circuit and the digital recording device are connected to an arithmetic unit 70.

The arithmetic unit 70 has a function of extracting image data from the imaging element 60, or the digital image data generation circuit or the digital recording device connected to imaging element 60; and performing image processing and numerical calculation. The arithmetic unit 70 may be configured to have another function other than the above (for example, a laser light source (10) and a function of controlling an amount of light and an exposure time of the laser light source 10). The arithmetic unit 70 may be configured to include, for example, a CPU (central processing unit), a ROM (read only memory), a RAM (random access memory), a RAM (random access memory), a main memory, and the like.

In this case, various functions of the arithmetic unit 70 are realized by a program stored in the ROM or the like read out to the main memory, and executed by the CPU. The CPU of the arithmetic unit 70 can read data from the RAM and store data in the RAM, as necessary. However, a part of or whole of the arithmetic unit 70 may be realized by hardware alone. Moreover, the arithmetic unit 70 may be configured of a plurality of devices, which are physically separated from each other, or the like. For the arithmetic unit 70, for example, a personal computer may be used. Moreover, the arithmetic unit 70 may have a function of the digital image data generation circuit and/or a function of the digital recording device.

The polarization phase difference variable member 30 temporally changes a polarization phase difference when a laser light is incident on the strengthened glass 200. The polarization phase difference to be changed is one or more times a wavelength A of the laser light. The polarization phase difference is required to be uniform with respect to a wave front of the laser light L. For example, because, in a quartz wedge, a polarization phase difference is not uniform in a direction with an inclined surface of the wedge, the wave front of the laser light is not uniform. Then, it is not preferable to use a quartz wedge as the polarization phase difference variable member 30.

A polarization phase difference variable member 30 capable of changing a polarization phase difference, which is uniform with respect to a wave front of a laser light, by 1λ or more electrically includes, for example, a liquid crystal element. The liquid crystal element can change the polarization phase difference by an electric voltage applied to the element. For example, when the wavelength of the laser light is 630 nm, the wavelength of the laser light can be changed by 3 to 6 wavelengths. In the liquid crystal element, a maximum value of a polarization phase difference, which can be changed by the applied voltage, is determined by a dimension of a cell gap.

Typically, a liquid crystal element has a cell gap of several μm, and the maximum polarization phase difference is about ½ λ (several 100 nm). Moreover, in a display device or the like using a liquid crystal, no further change is required. In the liquid crystal element used in the embodiment, when the wavelength of the laser light is 630 nm, for example, it is necessary to change the polarization phase difference by about 3 times 630 nm, i.e. about 2000 nm, and a cell gap of 20 to 50 μm is required.

Figure 3:
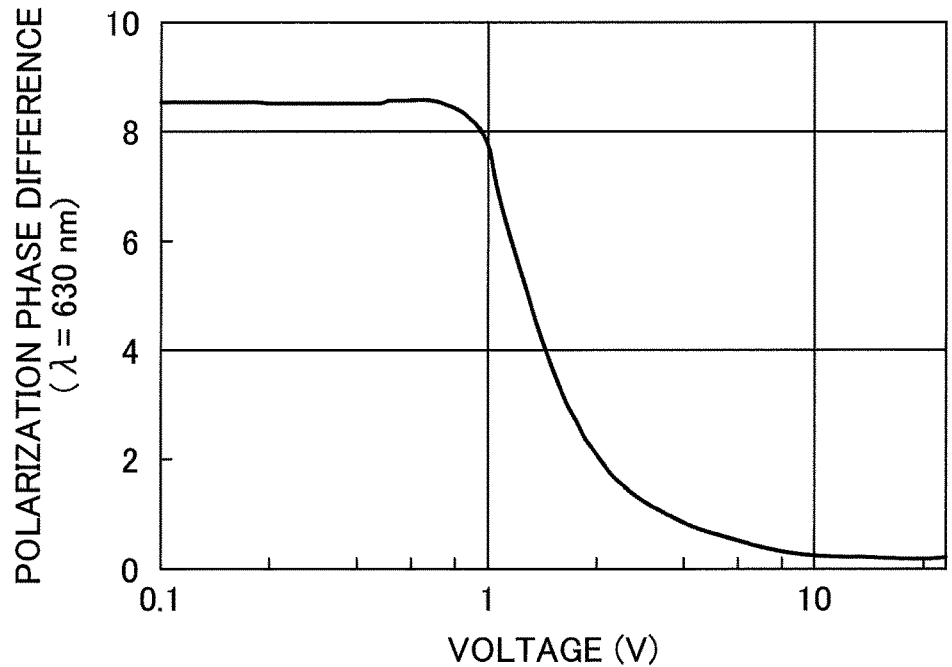
FIG. 3 is a diagram depicting an example of a relation between an applied voltage to a liquid crystal element and a polarization phase difference.

The electric voltage applied to the liquid crystal element is not proportional to the polarization phase difference. For example, FIG. 3 is a diagram depicting a relation between an applied voltage to the liquid crystal element having a cell gap of 30 μm and the polarization phase difference. In FIG. 3, a vertical axis represents a polarization phase difference (a number of wavelengths with respect to the wavelength of 630 nm), and a horizontal axis represents a voltage (in a logarithm) applied to the liquid crystal element.

The voltage applied to the liquid crystal element falls within a range from 0 V to 10 V, and a polarization phase difference of about 8λ (5000 nm) can be changed. However, in a liquid crystal element, at a low voltage from 0 V to 1 V, an orientation of a liquid crystal is not stable, and the polarization phase difference may fluctuate due to a change in temperature or the like. Moreover, when the voltage applied to the liquid crystal element is 5 V or more, a change in the polarization phase difference is small with respect to a change in the voltage. In the case of the above-described liquid crystal element, by using an application voltage within a range from 1.5 V to 5 V, a polarization phase difference of about 3λ (i.e. 4λ to 1λ) can be changed stably.

In the case where a liquid crystal element is used for the polarization phase difference variable member 30, the polarization phase difference variable member 30 is connected to a liquid crystal control circuit for controlling the liquid crystal, and is controlled synchronously with the imaging element 60. At this time, the polarization phase difference is required to be temporally changed linearly so as to be synchronized with a timing of imaging by the imaging element 60.

FIG. 3 is a diagram depicting an example of a relation between the applied voltage of the liquid crystal element and the polarization phase difference. As illustrated in FIG. 3, the voltage applied to the liquid crystal element does not change linearly with the polarization phase difference. Then, a signal, which causes the polarization phase difference to change linearly within a certain time period, is required to be generated, and applied as a driving voltage to the liquid crystal element.

Figure 4:
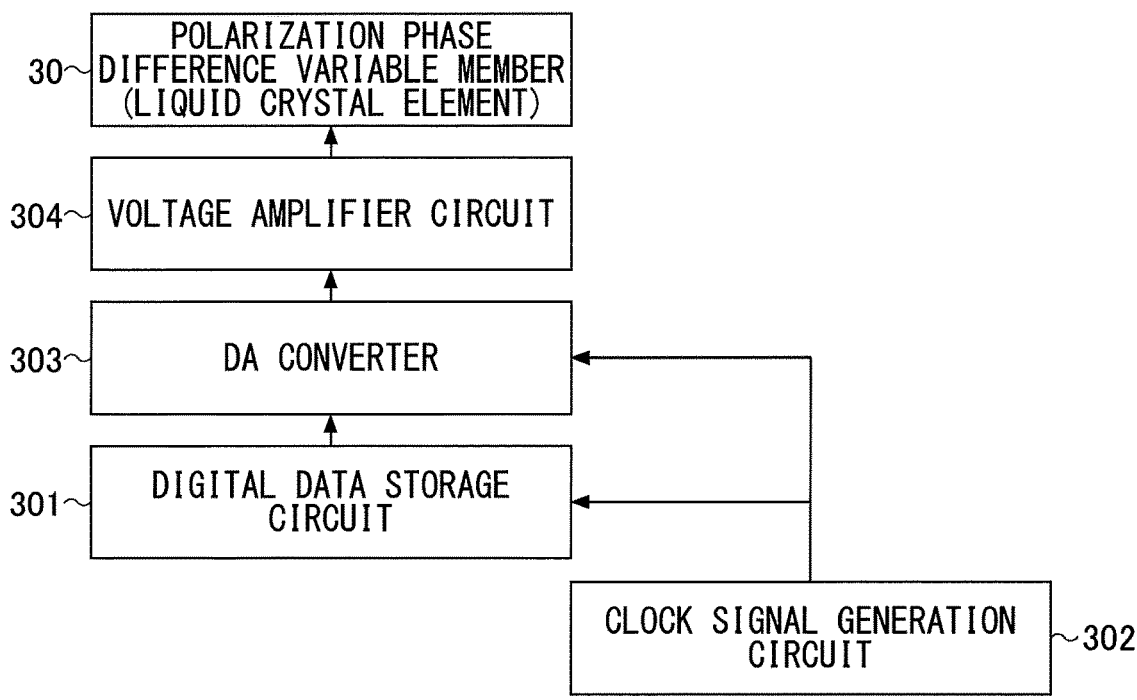
FIG. 4 is a diagram depicting an example of a circuit for causing a liquid crystal element to generate a drive voltage such that a polarization phase difference temporally changes linearly.

FIG. 4 is a diagram depicting an example of a circuit that causes the liquid crystal element to generate a driving voltage such that the polarization phase difference temporally changes linearly.

In a digital data storage circuit 301, illustrated in FIG. 4, based on data obtained by previously measuring applied voltages and polarization phase differences of a liquid crystal element to be used, voltage values, which correspond to the polarization phase differences for changing the polarization phase difference at a regular interval, are recorded in an address order, as digital data within a range of the necessary polarization phase difference change. TABLE 1 shows a part of digital data recorded in the digital data storage circuit 301. A column of voltages in TABLE 1 indicates the digital data to be recorded, and voltage values with step of 10 nm of the polarization phase difference.

TABLE 1

| polarization phase difference (nm) | voltage (V) |
|---|---|
| 1890 | 1.500 |
| 1880 | 1.510 |
| 1870 | 1.520 |
| 1860 | 1.529 |
| . | . |
| . | . |
| . | . |
| 630 | 4.999 |
| 620 | 5.000 |

A clock signal generation circuit 302 generates a clock signal having a constant frequency using a quartz oscillator or the like. The clock signal generated by the clock signal generation circuit 302 is input to the digital data storage circuit 301 and a DA converter 303.

The DA converter 303 converts the digital data from the digital data storage circuit 301 into analog signals. In accordance with the clock signal generated by the clock signal generation circuit 302, the digital data of the voltage values sequentially stored in the digital data storage circuit 301 are read out from the digital data storage circuit 301, and sent to the DA converter 303.

The DA converter 303 converts the digital data of voltage values, read out at a regular time interval, into analog voltages. The analog voltages output from the DA converter 303 are applied, via a voltage amplification circuit 304, to the liquid crystal element used as a polarization phase difference variable member 30.

Note that although not shown in FIG. 4, a driving circuit for the liquid crystal element is synchronized with a circuit for controlling the imaging element 60, illustrated in FIG. 2, and starts a temporally continuous imaging using the imaging element 60, with a start of application of the driving voltage to the liquid crystal element.

Figure 5:
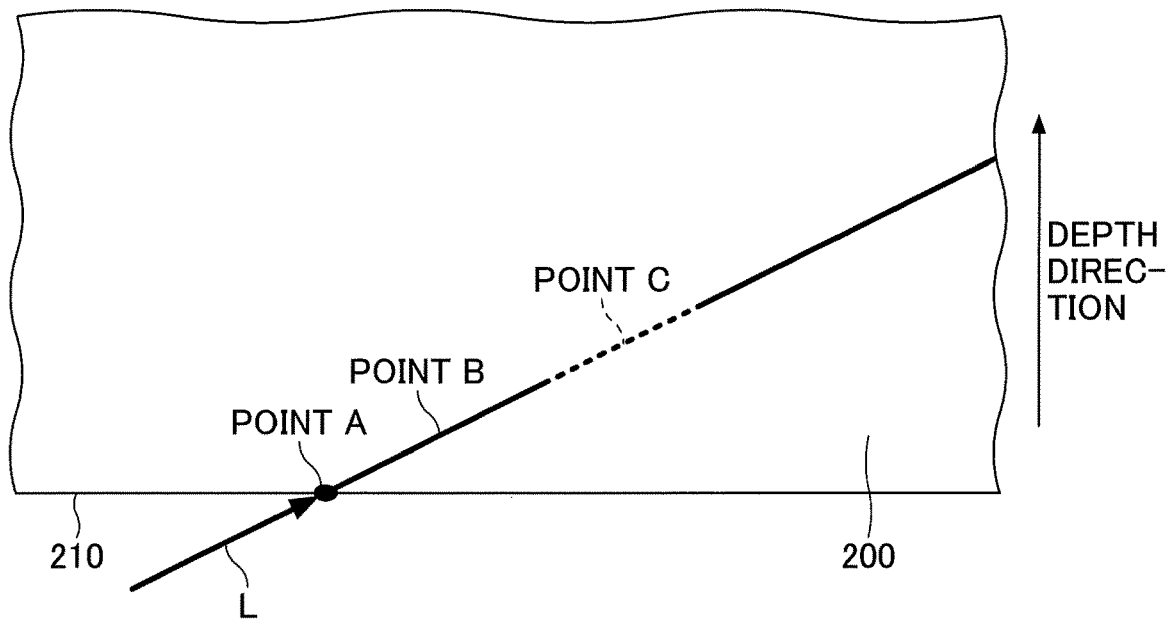
FIG. 5 is a diagram depicting an example of a scattered light image at a certain moment of a laser light L imaged on an imaging element.

FIG. 5 is a diagram depicting an example of an image of a scattered light at a certain moment of a laser light L imaged on the imaging element 60. In FIG. 5, a depth from a surface 210 of the strengthened glass 200 increases toward the top. In FIG. 5, a point A indicates the surface 210 of the strengthened glass 200. Because the scattering light on the surface 210 of the strengthened glass 200 is strong, a scattered light image spreads in an oval shape.

Because a strong compressive stress is applied to the surface portion of the strengthened glass 200, the polarization phase difference of the laser light L changes with the depth, due to a birefringence caused by a photoelastic effect. Thus, a scattered light luminance of the laser light L also varies with the depth. Note that the principle in which a scattered light luminance of a laser light varies in accordance with an internal stress of the strengthened glass is described in, for example, Yogyo-Kyokai-Shi (ceramic association journal) 80 {4} 1972, or the like.

By using the polarization phase difference variable member 30, a polarization phase difference of a laser light L before entering the strengthened glass 200, can be continuously changed temporally. Then, at each point of the scattered light image, illustrated in FIG. 5, the scattered light luminance varies in accordance with the polarization phase difference changed by the polarization phase difference variable member 30.

Figure 6:
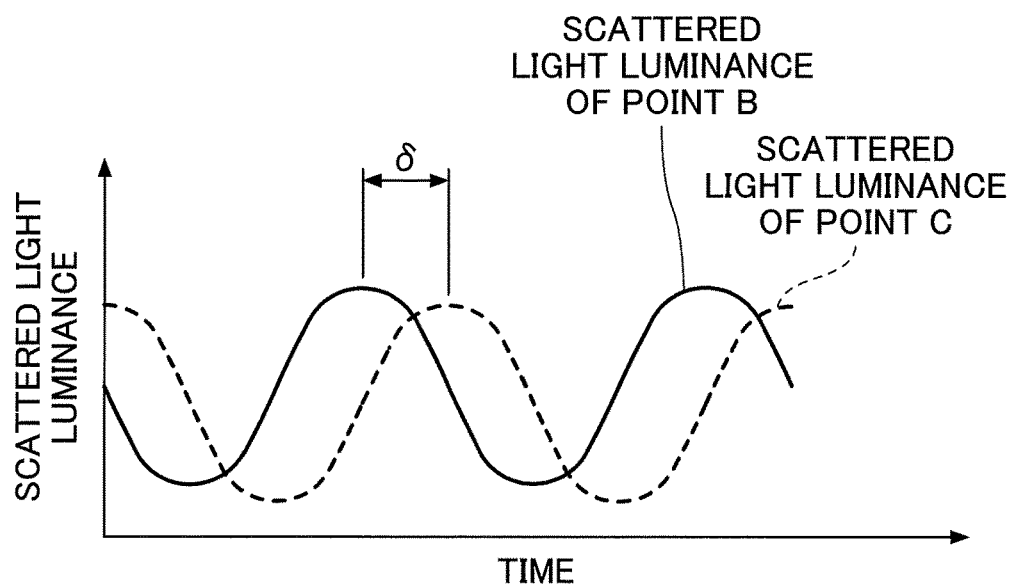
FIG. 6 is a diagram depicting an example of a temporal change of a scattered light luminance at a point B and a point C in FIG. 5.

FIG. 6 is a diagram depicting an example of a temporal change of a scattered light luminance at a point B and a point C in FIG. 5. The scattered light luminance temporally varies in accordance with the polarization phase difference changed by the polarization phase difference variable member 30, and periodically varies in a cycle of a wavelength λ of the laser light. For example, in FIG. 6, the periods of change in the scattered light luminance at the points B and C are the same, but the phases at the points B and C are different from each other. This is because while the laser light L goes from the point B to the point C, the polarization phase difference is further changed due to the birefringence caused by the stress in the strengthened glass 200. A phase difference, δ, between the point B and the point C is obtained by dividing the polarization phase difference, q, which is changed when the laser light L goes from the point B to the point C, expressed by a pass difference, by the wavelength of the laser light L, λ, i.e. δ=q/λ.

Locally considered, an amount of birefringence occurred by an in-plane stress of the strengthened glass 200 is a differential value dF/ds, of a function F(s), which is a phase of a periodic variation of a scattered light luminance, along with a temporal change in a polarization phase difference of the polarization phase difference variable member 30, at an arbitrary point S on the laser light L, in terms of a position s along the laser light L. The stress c at the point S in an in-plane direction of the strengthened glass 200 can be calculated with a light elastic constant C, and the differential value dF/ds, using the following equation 1 (Math 1).

Because in the present application, the laser light L is obliquely incident on the glass, in order to obtain a stress distribution to a depth in the vertical direction from a surface of the glass, a conversion from the point s to a depth direction is necessary. The procedure of the conversion will be described with an equation 8 (Math 8).

[Math 1]

$$\sigma = \frac{1}{C}\frac{dF}{ds} \qquad \text{(equation 1)}$$

Polarization phase difference variable member 30 temporally changes the polarization phase difference continuously by one wavelength or more within a predetermined period of time. The imaging device 60 records a plurality of scattered light images by temporally continuous laser light L. Then, a temporal change in luminance at each point of the scattered light images which were continuously captured is measured.

A change of scattered light at each point of the scattered light image is periodic. The cycle is constant and independent of a position of the point. Thus, the cycle T is measured from a change in scattered light luminance at a specific point. Alternatively, the cycle T may be an average of cycles measured at a plurality of points.

In the polarization phase difference variable member 30, in order to change the polarization phase difference by one wavelength or more (one cycle or more), the scattered light intensity is also changed by one cycle or more. Thus, the cycle T can be measured from a difference between a plurality of peaks or valleys, or a difference between times, at which zero points of amplitude pass. Note that from data of one cycle or less, the one cycle cannot be obtained in principle.

In data of periodic change of scattered light at a certain point, based on the aforementioned cycle T, a phase F at the point can be accurately obtained by the least squares method or a Fourier integral of the trigonometric function.

In the least squares method or Fourier integral of the trigonometric function for the cycle T which is known in advance, only a phase component for the known cycle T is extracted, and noises of other cycles can be eliminated. Moreover, an elimination capability is enhanced as a temporal change of the data becomes longer. Because typically, a scattered light luminance is weak and a phase amount which actually varies is also small, measurement for data by changing the polarization phase difference of several (a few A) is required.

Figure 7:
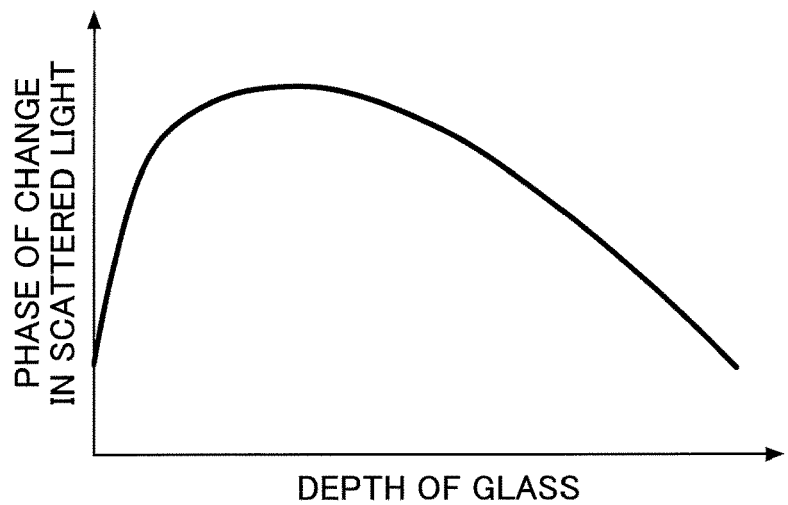
FIG. 7 is a diagram depicting an example of a phase of a scattered light change corresponding to a glass depth.

When data of temporal change of scattered light at each point of the scattered light image along the laser light L on the image captured by the imaging element 60 is measured, and the phases F are obtained for the respective data using the same method as above, phases F of the scattered light luminance along the laser light L can be obtained. FIG. 7 is a diagram depicting an example of the phase of the scattered light change depending on the depth of glass.

Figure 8:
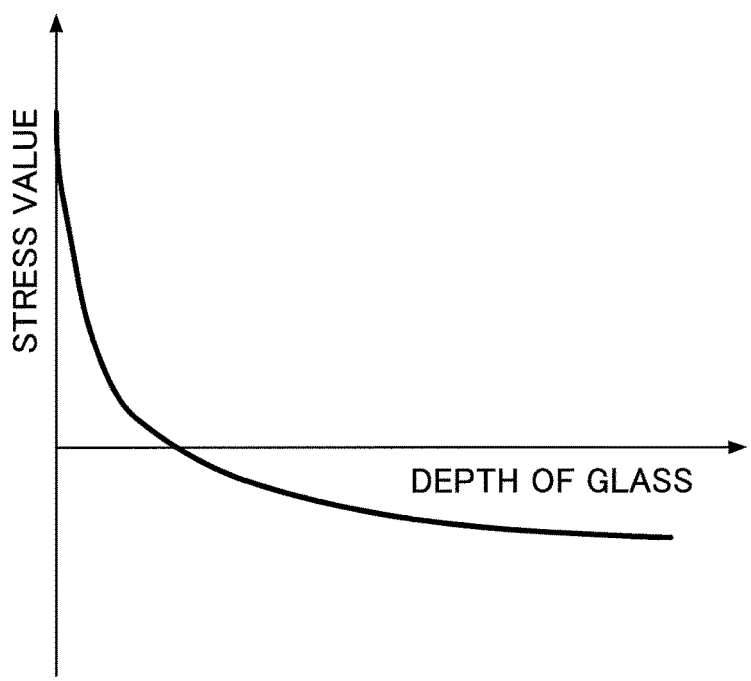
FIG. 8 is a diagram depicting an example of a stress distribution, based on phase data of the scattered light change of FIG. 7, calculated using formula 1.

In the phase F of the scattered light luminance along the laser light L, a differential value at a coordinate on the laser light L is calculated, and a stress value at the coordinate s on the laser light L can be obtained by Equation 1. Furthermore, when the coordinate s is converted into a distance from the glass surface, a stress value with respect to a depth from the surface of the strengthened glass can be calculated. FIG. 8 is a diagram depicting an example of the stress distribution obtained by Equation 1 based on the phase data of the scattering light change illustrated in FIG. 7.

Figure 9A:
FIGS. 9A and 9B are diagrams depicting an example of actual scattered light images at different times t1 and t2.
Figure 9B:

FIGS. 9A and 9B are diagrams depicting an example of an actual scattered light image at different times t1 and t2. A point A in FIGS. 9A and 9B represents the surface of the strengthened glass, and surface scattered light is reflected due to a roughness of the surface of the strengthened glass. A center of the surface scattered light image corresponds to the surface of the strengthened glass.

In FIGS. 9A and 9B, it is found that luminance in the scattered light image of the laser light is different at each point. Moreover, it is also found that a luminance distribution at the time t2 is not the same as the luminance distribution at the time t1, even at the same point. This is because the phases of the periodic scattered light luminance change are deviated from each other.

In the stress measurement device 1, the incident surface of the laser light L is preferably inclined by 45° with respect to the surface 210 of the strengthened glass 200. This feature will be described with reference to FIGS. 10 and 11.

Figure 10A:
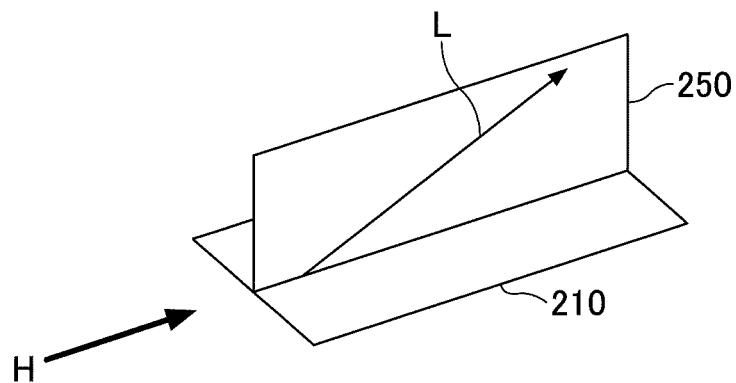
FIGS. 10A and 10B are diagrams depicting an example of an unfavorable design for an incident surface of a laser light L in a strengthened glass.
Figure 10B:
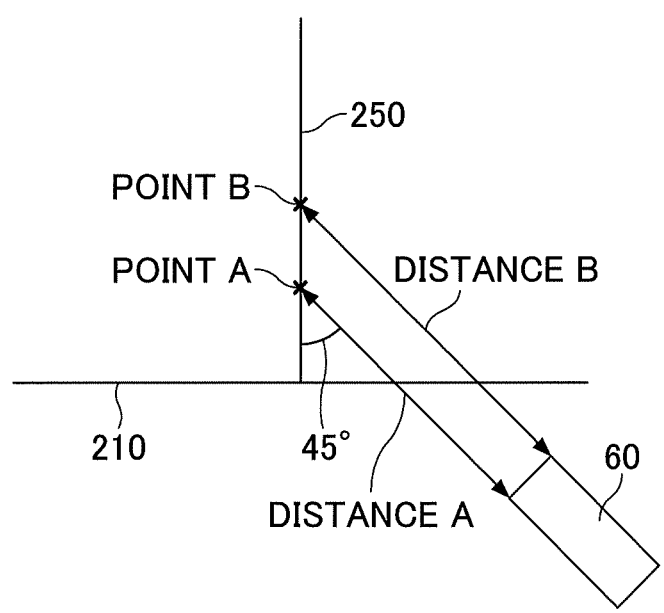

FIGS. 10A and 10B are diagrams depicting an example of an unfavorable design for the incident surface of the laser light L in the strengthened glass. In FIGS. 10A and 10B, an incident surface 250 for the laser light L in the strengthened glass 200 is perpendicular to the surface 210 of the strengthened glass.

FIG. 10B is a diagram depicting the incident surface viewed from a direction H in FIG. 10A. As illustrated in FIG. 10B, the imaging element 60 is arranged inclined by 45° with respect to the surface 210 of the strengthened glass 200, and observes the laser light L from an oblique angle of 45°. In the case of FIGS. 10A and 10B, when a distance A and a distance B are defined to be distances from two different points on the laser light L, a point A and a point B to the imaging element 60, respectively, the distances A and B are different from each other. That is, it is impossible to focus at the point A and at the point B simultaneously. Thus, a scattered light image of the laser light L for a required area cannot be acquired as an excellent image.

Figure 11A:
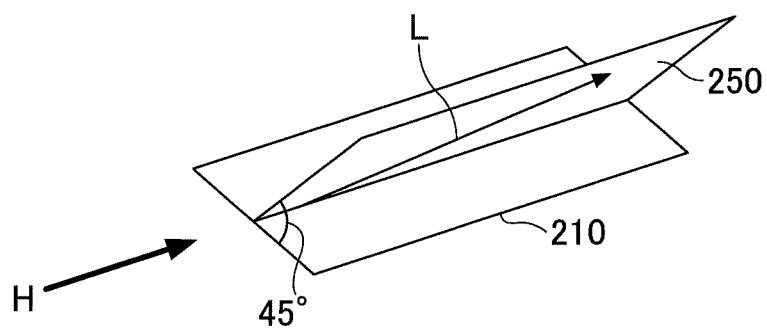
FIGS. 11A and 11B are diagrams depicting an example of a favorable design for the incident surface of a laser light L in the strengthened glass.
Figure 11B:
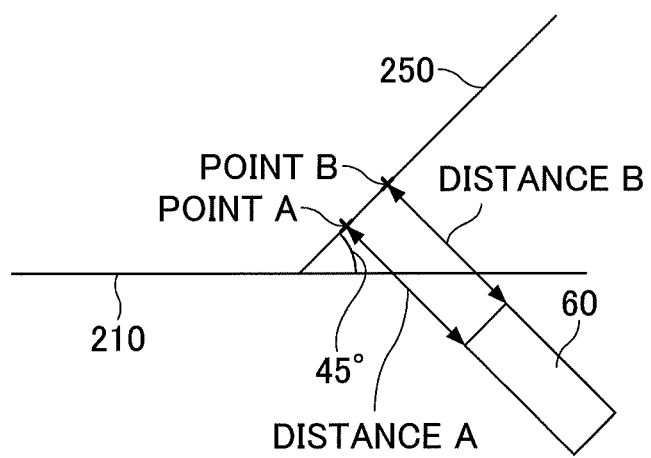

FIGS. 11A and 11B are diagrams depicting an example of a preferable design for the incident surface of the laser light L in the strengthened glass. In FIGS. 11A and 11B, an incident surface 250 for the laser light L in the strengthened glass 200 is inclined by 45° with respect to the surface 210 of the strengthened glass 200.

FIG. 11B is a diagram depicting the incident surface viewed from a direction H in FIG. 11A. As illustrated in FIG. 11B, the imaging element 60 is arranged inclined by 45° with respect to the surface 210 of the strengthened glass 200, and the incident surface on which the laser light L passes is also similarly inclined by 45°. Thus, at any point on the laser light L, a distance to the imaging element 60 (distance A and distance B) are the same, and a scattered light image of the laser light L for a required area can be acquired as an excellent image.

In particular, when a laser light having a minimum beam diameter of 20 μm or less is used, a focal depth is shallow, several tens of micrometers at most. Thus, in order to acquire an excellent image, it is highly important to arrange the incident surface 250 for the laser light L in the strengthened glass 200 inclined by 45° with respect to the surface 210 of the strengthened glass 200, so that the distance from any point on the laser light L to the imaging element 60 is the same.

(Flow of Measurement)

Figure 12:
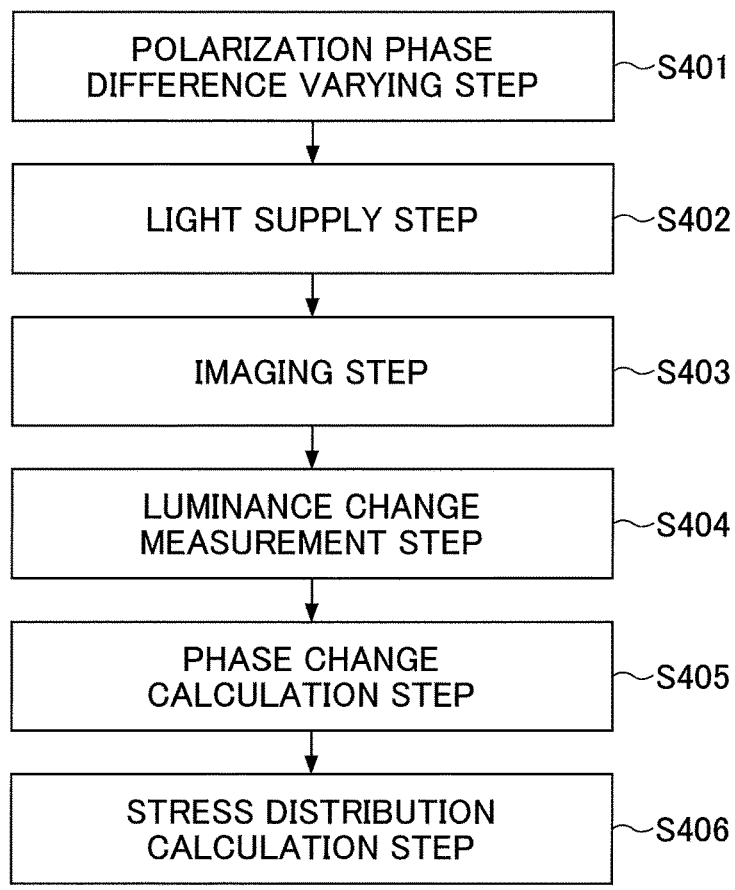
FIG. 12 is a flowchart depicting a measurement method of the stress measurement device 1.
Figure 13:
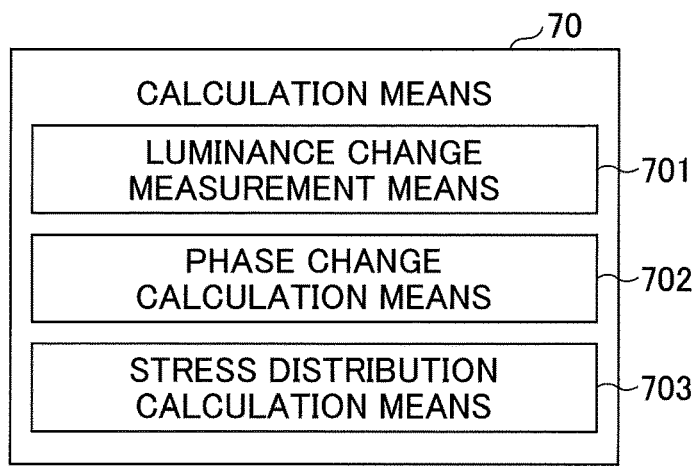
FIG. 13 is a diagram depicting an example of a functional block of an arithmetic unit 70 of the stress measurement device 1.

Next, a flow of the measurement will be described with reference to FIGS. 12 and 13. FIG. 12 is a flowchart depicting a measurement method of the stress measurement device 1. FIG. 13 is a diagram depicting an example of a functional block of the arithmetic unit 70 of the stress measurement device 1.

First, in step S401, a polarization phase difference of a laser light from the laser light source 10 having polarization or the laser light source 10 that is polarized, is changed by the polarization phase difference variable member 30, temporally continuously one wavelength or more for the wavelength of the laser light (Polarization Phase Difference Variable Step).

Next, in step S402, the laser light, in which polarization phase difference is changed, is incident into the strengthened glass 200, which is a subject to be measured, obliquely with respect to the surface 210, via the light supply member 40 (light supply step).

Next, in step S403, the imaging element 60 captures a plurality of times at a predetermined time interval, a scattered light by the laser light, in which polarization phase difference is changed, and which goes through the strengthened glass 200, to obtain a plurality of images (imaging step).

Next, in step S404, a luminance change measuring means 701 of the arithmetic unit 70, using the plurality of images of the scattered light, which are spaced temporally, obtained in the imaging step, measures a periodic luminance change of the scattered light caused by the temporal change of the polarization phase difference changed by the polarization phase difference variable step (luminance change measurement step).

Next, in step S405, a phase change calculation means 702 of the arithmetic unit 70 calculates a phase change of a periodic luminance change of scattered light, along the laser light incident into the strengthened glass 200 (phase change calculation step).

Next, in step S406, a stress distribution calculation means 703 of the arithmetic unit 70 calculates a stress distribution in the depth direction from the surface 210 of the strengthened glass 200, along the laser light incident into the strengthened glass 200, on the basis of the phase change of the periodic luminance change of the scattered light (stress distribution calculation step). Note that the calculated stress distribution may be displayed on a display device (a liquid crystal display or the like).

In this way, the stress measurement device 1, different from the stress measurement device using the guided wave of the surface, does not perform the stress measurement depending on a refractive index distribution of the strengthened glass, and performs a measurement based on the scattered light. Thus, regardless of the refractive index distribution of the strengthened glass (irrespective of the refractive index distribution of the strengthened glass), the stress distribution of the strengthened glass can be measured from the outermost surface of the strengthened glass to a portion deeper than the conventional one. For example, also for a lithium aluminosilicate-based strengthened glass or the like having a characteristic that the refractive index increases with a depth from a certain depth, the stress measurement can be performed.

Moreover, the polarization phase difference of laser light is changed, by the polarization phase difference variable member 30, temporally continuously by one wavelength or more with respect to the wavelength of the laser light. Thus, the phase of the periodic luminance change of the scattered light can be obtained by the least squares method of trigonometric functions or Fourier integration. In the least squares method of a trigonometric function or Fourier integration, unlike the conventional method of detecting a phase from a change in a position of a peak or a valley of a wave, entire data of the wave is treated, and the method based on the cycle which is previously known, thus a noise of other cycles can be removed. As a result, the phase of the periodic luminance change of the scattered light can be obtained easily and accurately.

First Variation of First Embodiment

A first variation of the first embodiment of the present invention will be described in detail with reference to the accompanying drawings. In the first variation of the first embodiment, an example of a stress measurement device having a different configuration from that of the first embodiment will be illustrated. Note that in the first variation of the first embodiment, a description regarding the same component as that of the embodiments, which had been already described, may be omitted.

Figure 14A:
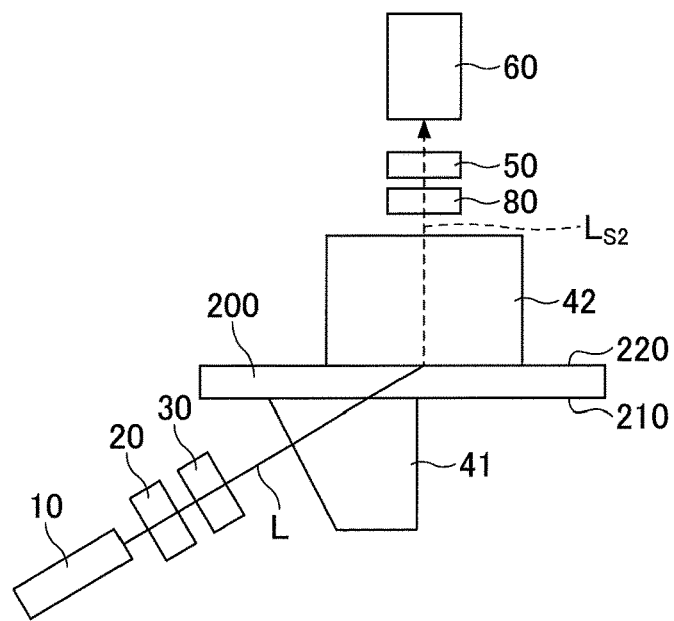
FIGS. 14A and 14B are diagrams depicting an example of a stress measurement device according to a variation 1 of the first embodiment.
Figure 14B:
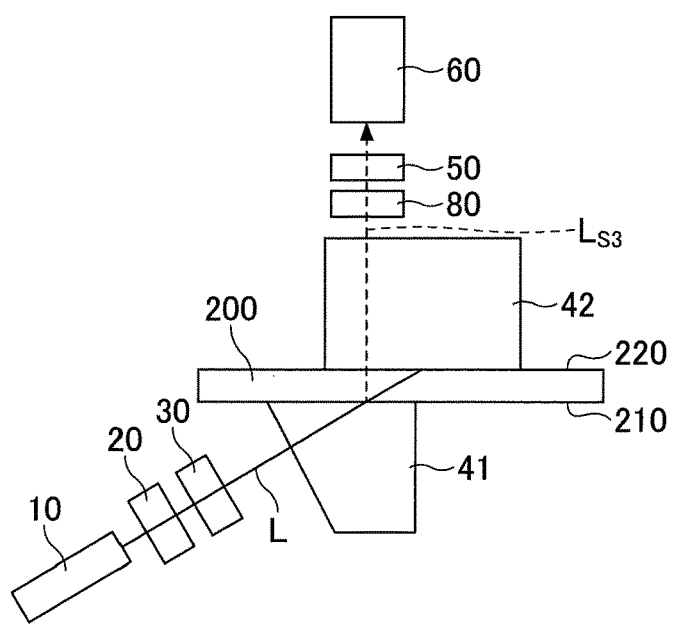

FIGS. 14A and 14B are diagrams depicting an example of the stress measurement device according to the first variation of the first embodiment. As illustrated in FIG. 14A, the stress measurement device 1A is different from the stress measurement device 1 (See FIG. 1) in that a light wavelength selection member 80, a light conversion member 50, and an imaging element 60 are arranged on a side opposite to a light supply member 41 with respect to the strengthened glass 200, and furthermore a light extraction member 42 is arranged so as to contact a rear surface 220 of the strengthened glass 200. Note that in FIGS. 14A and 14B, illustration of the arithmetic unit is omitted.

In the stress measurement device 1A, scattered light $L_{S2}$ generated on the rear surface 220 side of the strengthened glass 200 is caused to be incident into the imaging element 60 via the light extraction member 42, such as a prism, the light wavelength selection member 80, and the light conversion member 50, and a plurality of images are captured by the imaging element 60 which are spaced in time series within a predetermined period of time. Other configurations and operations are the same as those of the first embodiment.

Note that by providing the light supply member 41, a reflection on the surface 210 of the strengthened glass 200 of the laser light L can be controlled. When the reflection on the surface 210 of the laser light L is not a problem, the light supply member 41 may not be provided, and the laser light L may be incident directly into the strengthened glass 200.

Typically, a strengthened glass 200 has the same stress distribution on the front side and on the rear side. Thus, as in the first embodiment, the scattered light Ls may be detected on the front surface 210 side of the strengthened glass 200 (incident side of the laser light L). Moreover, as in the first variation of the first embodiment, the scattered light $L_{S2}$ on the rear surface 220 side of the strengthened glass 200 (emission side of the laser light L) may be detected.

Note that in the case of detecting the scattered light LS2 on the rear surface 220 side of the strengthened glass 200, laser light of the strengthened glass preferably satisfies the condition of total reflection. This is because when the laser light is totally reflected on the rear surface 220 of the strengthened glass 200, irregular reflection at the rear surface 220 of the strengthened glass 200 can be reduced, and unnecessary light can be prevented from being incident on the imaging element 60. By adjusting the incident angle of the laser light to the strengthened glass 200, the laser light can satisfy the condition of total reflection on the rear surface 220 of the strengthened glass 200.

Alternatively, as in the stress measurement device 1B illustrated in FIG. 14B, the scattered light LS3 generated on the front surface 210 side of the strengthened glass 200 and emitted to the rear surface 220 side may be caused to be incident into the imaging element 60 via the light extraction member 42, which is a prism or the like, the light wavelength selection member 80, and the light conversion member 50, and a plurality of images are captured by the imaging element 60 which are spaced in time series within a predetermined period of time. Other configurations and operations are the same as those of the first embodiment.

Note that, in the same way as the stress measurement device 1A, by providing the light supply member 41, a reflection on the surface 210 of the strengthened glass 200 of the laser light L can be controlled. When the reflection on the surface 210 of the strengthened glass 200 of the laser light L is not a problem, the light supply member 41 may not be provided, and the laser light L may be incident directly into the strengthened glass 200.

In either case of the stress measurement devices 1A and 1B, in the same way as the stress measurement device 1, a stress distribution in the depth direction from the rear surface 220 of the strengthened glass 200 can be calculated, on the basis of the phase change of the periodic luminance change of the scattered light, along the laser light L incident into the strengthened glass 200.

In particular, according to the stress measurement device 1D, the focal point of the laser is set to the same position from the glass surface layer without depending on the thickness of the glass plate. Thus, even when a strengthened glass having the same stress distribution is measured, there is no need to adjust the focal position of the laser or only a fine adjustment is enough. Accordingly, the measurement time becomes short, and the repetition accuracy is further improved.

Second Variation of First Embodiment

In the second modification of the first embodiment, another example of the stress measurement device having a different configuration from that of the first embodiment will be illustrated. Note that in the second variation of the first embodiment, a description regarding the same component as that of the embodiment, which had been already described may be omitted.

Figure 15:
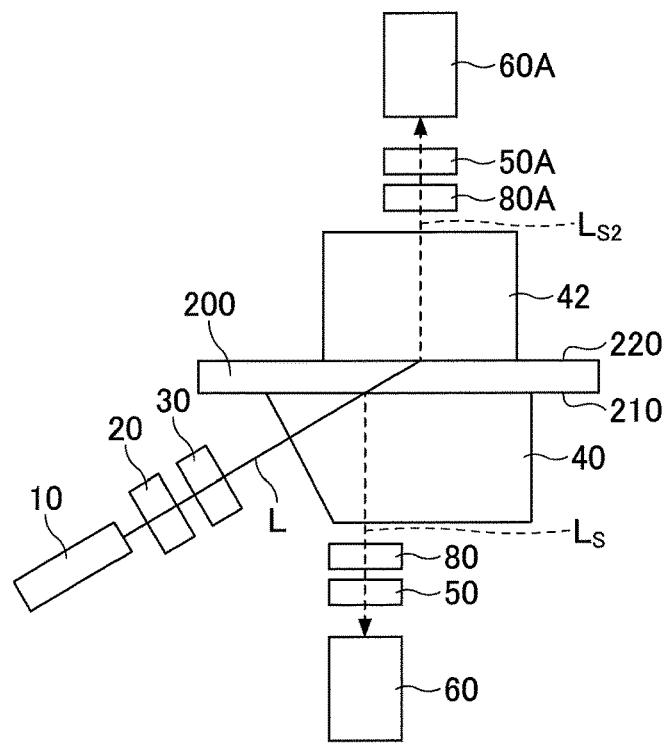
FIG. 15 is a diagram depicting an example of a stress measurement device according to a variation 2 of the first embodiment.

FIG. 15 is a diagram depicting an example of the stress measurement device according to a second variation of the first embodiment. As illustrated in FIG. 15, the stress measurement device 1C is different from the stress measurement device 1 (See FIG. 1) in that a light wavelength selection member 80A, a light conversion member 50A, and an imaging element 60A are arranged on a side opposite to a light supply member 40 with respect to the strengthened glass 200, and furthermore a light extraction member 42 is arranged so as to contact the rear surface 220 of the strengthened glass 200. Note that in FIG. 15, illustration of the arithmetic unit is omitted.

In the stress measurement device 1C, similarly to the stress measurement device 1, the scattered light LS emitted from the front surface 210 side of the strengthened glass 200 can be detected. Furthermore, in the stress measurement device 1C, the scattered light LS2 emitted from the rear surface 220 side of the strengthened glass 200 is caused to be incident into the imaging element 60A via the light extraction member 42, such as a prism, the light wavelength selection member 80A, and the light conversion member 50A, and a plurality of images are captured by the imaging element 60A which are spaced in time series within a predetermined period of time. Other configurations and operations are the same as those of the first embodiment.

In the stress measurement device 1C, according to the configuration illustrated in FIG. 15, the stress distribution in the depth direction from the front surface 210 of the strengthened glass 200, and the stress distribution in the depth direction from the rear surface 220 of the strengthened glass 200 can be calculated at the same time. The above-described property is effective for measuring a strengthened glass in which stress distributions in the front surface and in the rear surface are different from each other, or for confirming whether the front surface and the rear surface have the same stress distribution in a strengthened glass.

Third Variation of First Embodiment

In a third variation of the first embodiment, an example of a polarization phase difference variable member having a different configuration from that of the first embodiment will be illustrated. Note that in the third variation of the first embodiment, a description regarding the same component as that of the embodiments, which had been already described, may be omitted.

Figure 16:
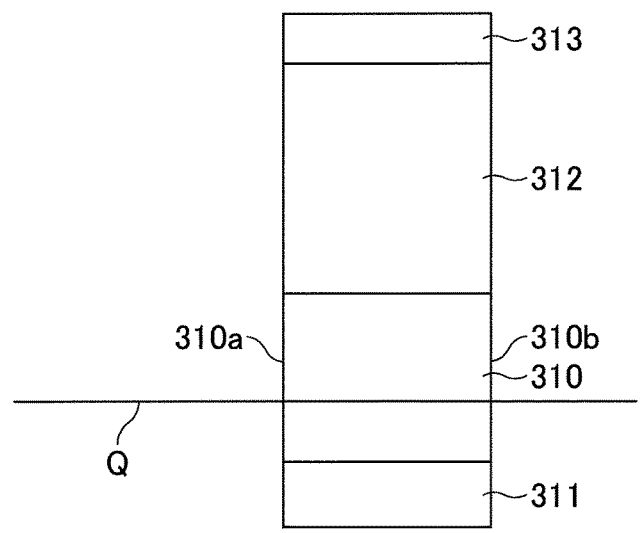
FIG. 16 is an explanatory diagram for a polarization phase difference variable member using a photoelastic effect.

For the polarization phase difference variable member, a photoelastic effect of a transparent material can be used, or the polarization phase difference can be changed by applying stress. FIG. 16 is an explanatory diagram for a polarization phase difference variable member using a photoelastic effect.

In a polarization phase difference variable member 30A, illustrated in FIG. 16, one surface of the polarization phase difference generating material 310 having a substantially rectangular parallelepiped shape is fixed with a fixing jig 311, and the surface of the polarization phase difference generating material 310 that is opposite to the above-described surface contacts a surface of a piezoelectric element 312; additionally, a surface of the piezoelectric element 312 that is opposite to the above-described surface is fixed by a fixing jig 313.

Two surfaces, 310a and 310b, of the polarization phase difference generating material 310, orthogonal to a surface contacting the piezoelectric element 312, and facing each other, are subjected to a mirror finishing, so that a polarized light can pass through. For the polarization phase difference generating material 310, a transparent material having a large photoelastic effect, for example, a quartz glass (glass) or polycarbonate (resin) may be used.

The piezo element 312 expands and contracts in a voltage application direction when an electric voltage is applied. The extension or contraction depends on the voltage being positive or negative. Although not shown in FIG. 16, a piezo element drive voltage generating circuit for controlling a voltage to be applied to the piezoelectric element 312 is connected to the piezo element 312.

When an electric voltage is applied to the piezo element 312 by the piezo element drive voltage generating circuit so that the piezo element 312 expands, a length of the piezo element 312 extends in a direction in which the electric voltage is applied. The piezo element 312 is arranged so that the polarization phase difference generating material 310 is located in the extension direction.

When a voltage is applied in the direction in which the piezo element 312 extends by the piezo element drive voltage generating circuit, the piezo element 312 extends in the direction of the polarization phase difference generating material 310. Because the piezo element 312 is fixed by the fixing jigs 311 and 313, a compressive stress is applied to the polarization phase difference generating material 310. According to the compressive stress on the polarization phase difference generating material 310, birefringence occurs in a direction in which a light beam Q passes, and a polarization phase difference is generated in the light beam Q. An amount of the polarization phase difference is proportional to the voltage applied to the piezo element 312. Thus, the polarization phase difference can be controlled by the piezo element drive voltage generating circuit for applying a driving voltage to the piezoelectric element 312.

For example, as a polarization phase difference generating material 310, a polycarbonate having a shape of a cube of 10 mm sides will be used. The photoelastic constant of the polycarbonate is about 700 nm/cm/MPa, and the Young's modulus is about 2.5 GPa.

For the piezo element 312, for example, a laminated piezo element in which a high dielectric ceramic, having a perovskite crystal structure of lead zirconate titanate or the like having a large piezo effect, is alternately stacked with an electrode can be used. For example, in the laminated piezo element, a thickness of one layer is 200 μm and 100 layers are laminated, and by setting the length to about 20 mm, elongation of 10 μm or more at an applied voltage of 100 V can be obtained.

Because the Young's modulus of the lead zirconate titanate, which is a material of the piezo element 312 is 10 times or more than that of the polycarbonate, the elongation of the piezo element 312 results in compression of the approximate entirety of the polycarbonate. For example, when the piezo element 312 extends by 10 μm, the polycarbonate having a shape of a cube of 10 mm sides is compressed by 0.1%. The compression stress at that time is 2.5 MPa. When the light beam Q passes through the polarization phase difference generating material 310 of 10 mm, a polarization phase difference of 1750 nm is generated. When the wavelength is 630 nm, the polarization phase difference of 2.8λ can be varied.

For example, a quartz glass having a shape of a cube of 10 mm sides is used for the polarization phase difference generating material 310. A quartz glass has a photoelastic constant of about 35 nm/cm/MPa and Young's modulus is about 70 GPa. Because the Young's modulus of lead zirconate titanate which is a material of the piezo element 312 is almost the same level as the quartz, almost a half of an extension of the piezo element 312 becomes a compression of the quartz glass. When the piezo element 312 extends by 10 μm, the polycarbonate having a shape of a cube of 10 mm sides is compressed by about 0.05%. The compressive stress at that time is about 35 MPa. When a light beam Q passes through a polarization phase difference generating material 310 of 10 mm, a polarization phase difference of 1225 nm is generated. When the wavelength is 630 nm, the polarization phase difference of 1.9λ can be varied.

In this way, in the case of generating the polarization phase difference by deforming the materials, a product of the photoelastic constant and the Young's modulus is important. A value of the product is 0.18 (no unit) for polycarbonate, and 0.26 (no unit) for quartz. That is, it is important to use a transparent member having a value of 0.1 or more for the polarization phase difference generating material 310.

In this way, the polarization phase difference variable member is not limited to a liquid crystal element. Any form of applying the piezo element may be used as long as the polarization phase difference upon being incident onto the strengthened glass 200 can be temporally changed and as long as the polarization phase difference to be changed is one or more times the wavelength λ of the laser light; additionally, other forms may be used.

Second Embodiment

In a second embodiment, an example of a stress measurement device used in combination with the stress measurement device according to the first embodiment will be described. Note that in the second embodiment, a description regarding the same component as that of the embodiments, which had been already described, may be omitted.

Figure 17:
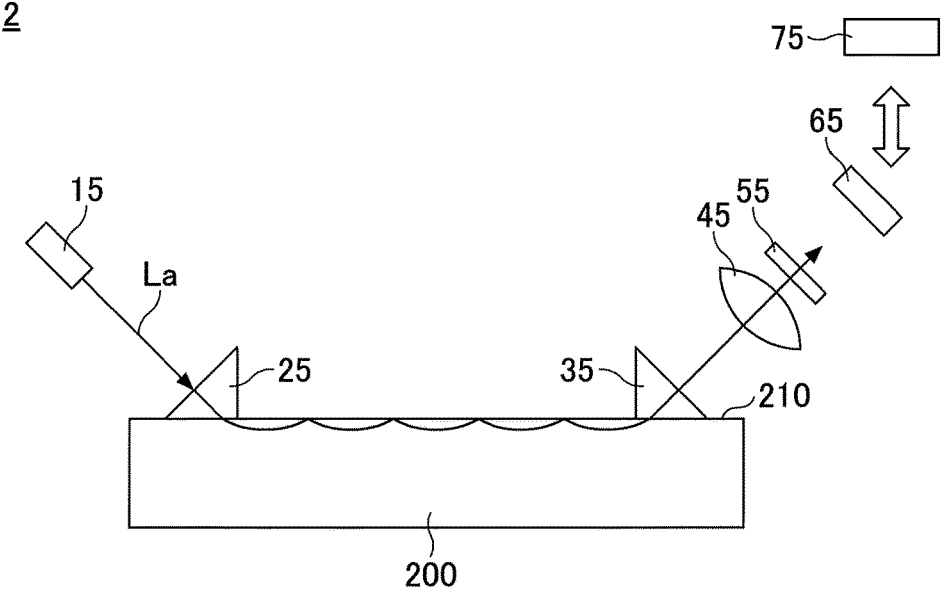
FIG. 17 is a diagram depicting an example of a stress measurement device according to a second embodiment.

FIG. 17 is a diagram depicting an example of a stress measurement device according to the second embodiment. See, for example, Yogyo-Kyokai-Shi (Journal of the Ceramic Association, Japan) 87 {3} 1979. As illustrated in FIG. 17, the stress measurement device 2 includes a light source 15; a light supply member 25; a light extraction member 35; a light conversion member 45; a polarization member 55; an imaging element 65; and an arithmetic unit 75. The stress measurement device 2 can be used in combination with the stress measurement device 1 illustrated in FIG. 1. The stress measurement device 2 may be used in combination with the stress measurement device 1A or 1B illustrated in FIGS. 14A and 14B; or the stress measurement device 1C illustrated in FIG. 15.

In the stress measurement device 2, the light source 15 is arranged so that a light beam La is incident onto the surface layer of the strengthened glass 200 from the light supply member 25. Because interference is utilized, the wavelength of the light source 15 is preferably a single wavelength that gives a simple light-dark display.

For the light source 15, for example, an Na lamp capable of easily obtaining light of a single wavelength can be used; the wavelength in this case is 589.3 nm. Moreover, for the light source 15, a mercury lamp having a wavelength shorter than that of the Na lamp may be used; the wavelength in this case is, for example, 365 nm, which is the mercury I-line. However, there are many bright lines in a mercury lamp, and the mercury lamp is preferably used through a band pass filter that transmits only the 365 nm line.

Moreover, an LED (Light Emitting Diode) may be used for the light source 15. In recent years, a variety of LEDs having a large number of wavelengths have been developed. However, spectrum widths of LED are 10 nm or more in a half width, a single wavelength property is poor, and wavelengths change due to temperatures. Therefore, an LED is preferably used through a band pass filter.

In the case where the light source 15 has a configuration in which a light from an LED passes through a band pass filter, the light source 15 does not have a single wavelength property such as the Na lamp or the mercury lamp, and the light source 15 can be used with any wavelength from an ultraviolet region to an infrared region, and thus is preferable. Note that the wavelength of the light source 15 does not affect the basic principle of measurement of the stress measurement device 2, and a light source with a wavelength other than the wavelength illustrated above may be used.

However, by using a light source for emitting ultraviolet light for the light source 15, the resolution of measurement can be enhanced. That is, because the surface layer of the strengthened glass 200 to be measured by the stress measurement device 2 has a thickness of about a few mm, by using a light source for emitting ultraviolet light, an appropriate number of interference fringes can be obtained, and the resolution is enhanced. When a light source for emitting light having a longer wavelength than the ultraviolet light is used for the light source 15, because the number of the interference fringes is reduced, the resolution is lowered.

The light supply member 25 and the light extraction member 35 are placed on the surface 210 of the strengthened glass 200, which is an object to be measured, in a state of being brought into optical contact with the surface 210. The light supply member 25 is provided with a function of causing a light from the light source 15 to be incident on the strengthened glass 200. The light extraction member 35 is provided with a function of emitting a light propagated through the surface layer of the strengthened glass 200 to the outside of the strengthened glass 200.

For the light supply member 25 and the light extraction member 35, for example, a prism made of an optical glass may be used. In this case, the refractive index of the prisms is required to be greater than the refractive index of the strengthened glass 200 so that a light beam optically enters or is emitted from the surface 210 of the strengthened glass 200 through the prisms. Moreover, the refractive index is required to be selected so that the incident light and the emitting light pass substantially orthogonally to an inclined surface of each prism.

For example, in the case where the inclination angle of the prism is 60°, and the refractive index of the strengthened glass 200 is 1.52, the refractive index of the prisms can be set to be 1.72. Note that for the light supply member 25 and the light extraction member 35, instead of prisms, other members having similar functions may be used. Alternatively, the light supply member 25 and the light extraction member 35 may be integrated. Moreover, in order to perform a stable optical contact, a liquid (or may be gel-like) having a refractive index, which is between the refractive index of the light supply member 25 along with the light extraction member 35 and the refractive index of the strengthened glass 200, may be filled between the strengthened glass 200 and each of the light supply member 25 and the light extraction member 35.

In the direction of light emitted from the light extraction member 35, the imaging element 65 is arranged, and the light conversion member 45 and the polarization member 55 are inserted between the light extraction member 35 and the imaging element 65.

The light conversion member 45 has a function of converting the light beam emitted from the light extraction member 35 into a bright line sequence, and focusing condensing the light beam onto the imaging element 65. For the light conversion member 45, for example, a convex lens can be used, but other members having similar functions may be used.

The polarization member 55 is a light separation means having a function of selectively transmitting one of two light components oscillating in parallel to and orthogonal to a boundary surface between the strengthened glass 200 and the light extraction member 35. For the polarization member 55, for example, a polarizing plate or the like arranged in a rotatable state can be used, but other members having similar functions may be used. The light component oscillating in parallel to the boundary surface between the strengthened glass 200 and the light extraction member 35 is S-polarized light, and the light component oscillating orthogonal to the boundary surface is P-polarized light.

Note that the boundary surface between the strengthened glass 200 and the light extraction member 35 is orthogonal to an emission surface of the light emitted to the outside of the strengthened glass 200 via the light extraction member 35. Thus, the light component oscillating orthogonal to the emission surface of the light emitted to the outside of the strengthened glass 200 via the light extraction member 35 is S-polarized light, and the light component oscillating in parallel to the emission surface is P-polarized light.

The imaging element 65 has a function of converting light, which is emitted from the light extraction member 35, and received via the light conversion member 45 and the polarization member 55, into an electric signal. For the imaging element 65, for example, an element similar to that of the imaging element 60 can be used.

An arithmetic unit 75 has a function of capturing image data from an imaging element 65, and performing an image processing and a numerical calculation. The arithmetic unit 75 may have a configuration having another function (for example, a function for controlling an amount of light of the light source 15 or an exposure time). The arithmetic unit 75 may be configured including, a CPU (central processing unit), a ROM (read only memory), a RAM (random access memory), a main memory, and the like.

In this case, the various functions of the arithmetic unit 75 are realized by a program stored in the ROM or the like read out to the main memory and executed by the CPU. The CPU of the arithmetic unit 75 can read/store data from/into the RAM as necessary. However, a part or all of the arithmetic unit 75 may be realized only by hardware. The arithmetic unit 75 may be physically constituted of a plurality of devices or the like. For the arithmetic unit 75, for example, a personal computer may be used.

In the stress measurement device 2, a light beam La incident on the surface layer of the strengthened glass 200 from the light source 15 through the light supply member 25 propagates in the surface layer. Then, when the light beam La propagates in the surface layer, a mode is generated according to the optical waveguide effect, the light beam La passes through a number of predetermined paths and is extracted to the outside of the strengthened glass 200 by the light extraction member 35.

Then, the light beam is focused on the imaging element 65 as bright lines of P-polarized light and S-polarized light for each mode according to the light conversion member 45 and the polarization member 55. Image data of the bright lines of P-polarized light and S-polarized light of the number of modes generated on the imaging element 65 are sent to the arithmetic unit 75. In the arithmetic unit 75, positions of the bright lines of P-polarized light and S-polarized light on the imaging element 65 are calculated from the image data sent from the imaging element 65.

With such a configuration, in the stress measurement device 2, on the basis of the positions of the bright lines of P-polarized light and S-polarized light, in the depth direction from the surface of the surface layer of the strengthened glass 200, a refractive index distribution of each of P-polarized light and S-polarized light can be calculated. Moreover, based on a difference between the calculated refractive index distributions of the P-polarized light and S-polarized light and on the basis of the photoelastic constant of the strengthened glass 200, the stress distribution in the depth direction from the surface of the surface layer of the strengthened glass 200 can be calculated.

In this way, the stress measurement device 2 is a measuring device using waveguide light of the surface layer of the strengthened glass. Here, the waveguide light on the glass surface is generated in a layer whose refractive index becomes lower as the depth from the surface increases. In a layer whose refractive index becomes higher as the depth increases, waveguide light is not present. For example, in a lithium-aluminosilicate glass, the refractive index becomes lower as the depth increases only near the outermost surface of the glass, and the refractive index increases with the depth from a certain depth. In the case of such a strengthened glass, a waveguide light is generated only in the outermost surface layer, in which the refractive index becomes lower as the depth increases; in other words, the stress distribution can be measured in a portion that is until a depth where the refractive index distribution becomes inverted.

In the image of the scattered light illustrated in FIGS. 9A and 9B according to the first embodiment, a point A in FIGS. 9A and 9B is on a glass surface, surface scattered light is strongly dispersed to the surroundings. The dispersed surface scattered light indicates information on the surface point. Information at the surface point A is correct information. However, for example, the scattered light of the laser light L at a slightly deep point in the glass slightly deeper from the surface point A is in a state where a scattered light originally reflecting a stress of the glass at the deeper point and a scattered light reflecting a stress at the surface point A are mixed. For such a point where scattered lights overlap with each other, it is difficult to measure a stress correctly.

The depth of a point where scattered lights overlap with each other depends on a quality of the glass or a surface state of the glass, but is typically about 10 μm. In a strengthened glass where a change in the stress in the depth direction is moderate near the outermost surface, e.g. in a surface region with a depth of about several tens of μm, the surface stress value is low or the strengthened layer is deep, even at a point with a depth of 10 μm or less where a stress cannot be measured accurately; in such a case, an accurate stress can be estimated by extrapolating a stress distribution in a deeper region with respect to the glass surface region.

However, for the strengthened glass having a stress distribution where a stress rapidly increases between the surface of the strengthened glass 200 and a point with a depth of 10 μm, a large error occurs in an estimated value of the stress value near the outermost surface by the extrapolation. In particular, the error in the stress value on the outermost surface is large. However, in a region other than the region where surface scattered light interferes, as described above, it is possible to accurately measure the stress distribution as an absolute value.

By combining a stress value or a stress distribution obtained by measuring the stress value on the outermost surface or the stress distribution near the outermost surface using the stress measurement device 2, and a stress distribution at a point, which is sufficiently deep from the outermost surface and is not obstructed by the surface scattered light, among the stress distributions measured using the stress measurement device 1, the entire stress distribution can be accurately measured.

In the case where the depth region with sufficient reliability of the stress measurement device 1 and the depth region in which the measurement by the stress measurement device 2 can be performed are not continuous, in the strengthened glass, by performing approximation calculation using a stress distribution function that is theoretically expected, the least squares method, it is possible to accurately estimate the stress of the discontinuous region.

Figure 18:
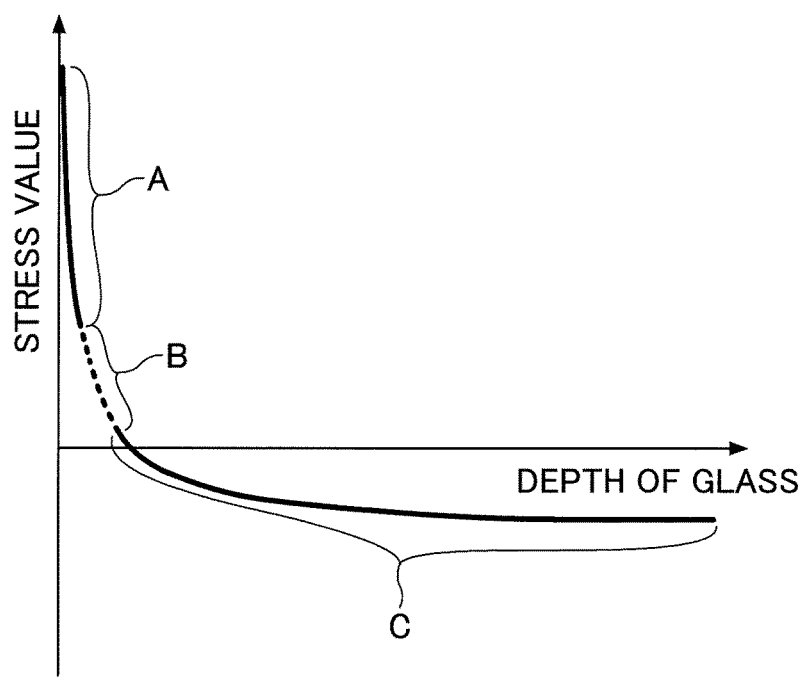
FIG. 18 is a diagram in which the stress distributions measured by the stress measurement devices 1 and 2 are shown in the same graph.

FIG. 18 is a diagram depicting the stress distributions measured by the stress measurement devices 1 and 2 in the same graph. More specifically, for the strengthened glass having stress distribution that is chemically strengthened in two steps, so as to have a region in which a slope of stress rapidly changes near the depth of 10 μm from the surface, the stress distribution near the outermost surface measured by the stress measurement device 2 (region A) and the stress distribution in the region with sufficient reliability measured by the stress measurement device 1 (region C) are shown in the same graph.

In the example of FIG. 18, there is a region B that is not measured by the stress measurement device 1 and the stress measurement device 2 between the region A and the region C. Based on stress distributions of regions A and C, a curve obtained by the least squares method with a function of the stress distribution expected in the region B is indicated by a dotted line. In this case, even when there is no real data of the region including the bend point, it is possible to estimate a bend point position from a curve obtained by the least squares method.

(Flow of Measurement)

Figure 19:
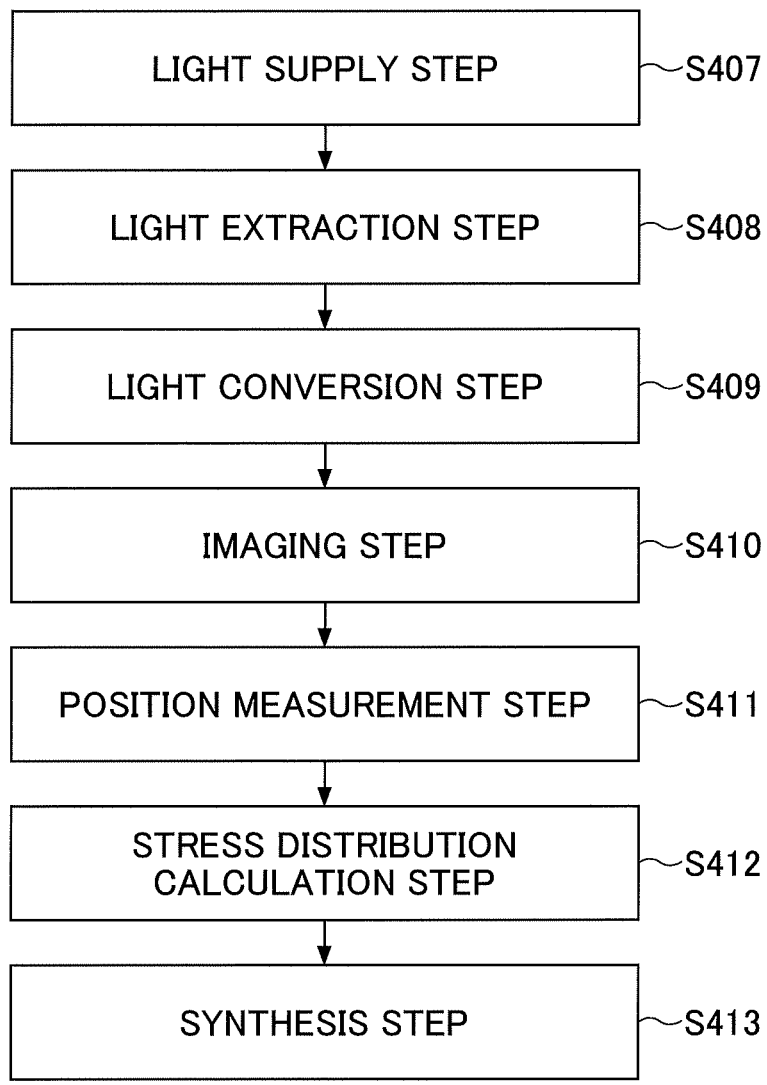
FIG. 19 is a flowchart depicting an example of a measurement method for the stress measurement device 2.
Figure 20:
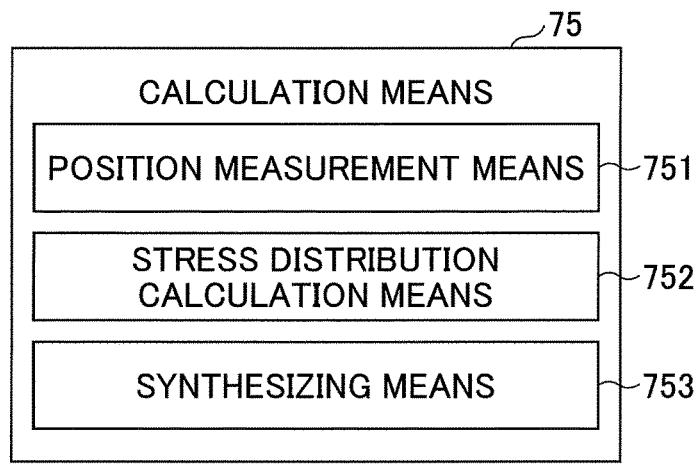
FIG. 20 is a diagram depicting an example of a functional block of an arithmetic unit 75 of the stress measurement device 2.

Next, a flow of measurement will be described with reference to FIGS. 19 and 20. FIG. 19 is a flowchart depicting an example of the measuring method of the stress measurement device 2. FIG. 20 is a diagram depicting an example of a functional block of the arithmetic unit 75 of the stress measurement device 2.

First, in step S407, a light from the light source 15 is incident in a surface layer of the strengthened glass 200 (light supply step). Next, in step S408, the light propagated in the surface layer of the strengthened glass 200 is extracted to the outside of the strengthened glass 200 (light extraction step).

Next, in step S409, the light conversion member 45 and the polarization member 55 convert two kinds of light components of the emitted light (P-polarized light and S-polarized light) oscillating in parallel to and orthogonal to the light emitting surface into two kinds of bright line arrays each having two or more bright lines (light conversion step).

Next, in step S410, the imaging element 65 captures the two kinds of bright line arrays converted in the light conversion step (imaging step). In step S411, a position measuring means 751 measures from an image obtained in the imaging step the positions of the respective bright lines (position measurement step).

Next, in step S412, the stress distribution calculation means 752 of the arithmetic unit 75 calculates, from the positions of at least two bright lines of each of the two kinds of bright line arrays, the refractive index distribution in the depth direction from the surface of the strengthened glass 200 corresponding to the two kinds of light components. Then, the stress distribution in the depth direction from the surface of the strengthened glass 200 is calculated based on the difference between the refractive index distributions of two kinds of light components, and the photoelastic constant of the glass (stress distribution calculation step).

Next, in step S413, the synthesizing means 753 of the arithmetic unit 75 synthesizes the stress distribution calculated in step S412 and the stress distribution calculated by the stress distribution calculation means 703 of the calculation unit 70 of the stress measurement device 1.

In the case where the depth region with sufficient reliability of the stress measurement device 1 and the depth region in which the measurement by the stress measurement device 2 can be performed are not continuous, the synthesizing means 753 of the arithmetic unit 75 calculates the stress distribution of the region B by the least squares method or the like, as illustrated in FIG. 18, for example, based on the stress distribution of the region A calculated by the stress distribution calculation means 752 of the arithmetic unit 75 of the stress measurement device 2, and the stress distribution of the region C calculated by the stress distribution calculation means 703 of the arithmetic unit 70 of the stress measurement device 1.

Note that the arithmetic unit 75 may include a CT value calculation means for calculating a CT value in addition to the configuration illustrated in FIG. 20, DOL_Zero value calculation means for calculating the DOL_Zero value, or the like. In this case, based on the stress distribution calculated by the synthesis means 753, CT values and DOL_Zero values can be calculated.

Figure 21:
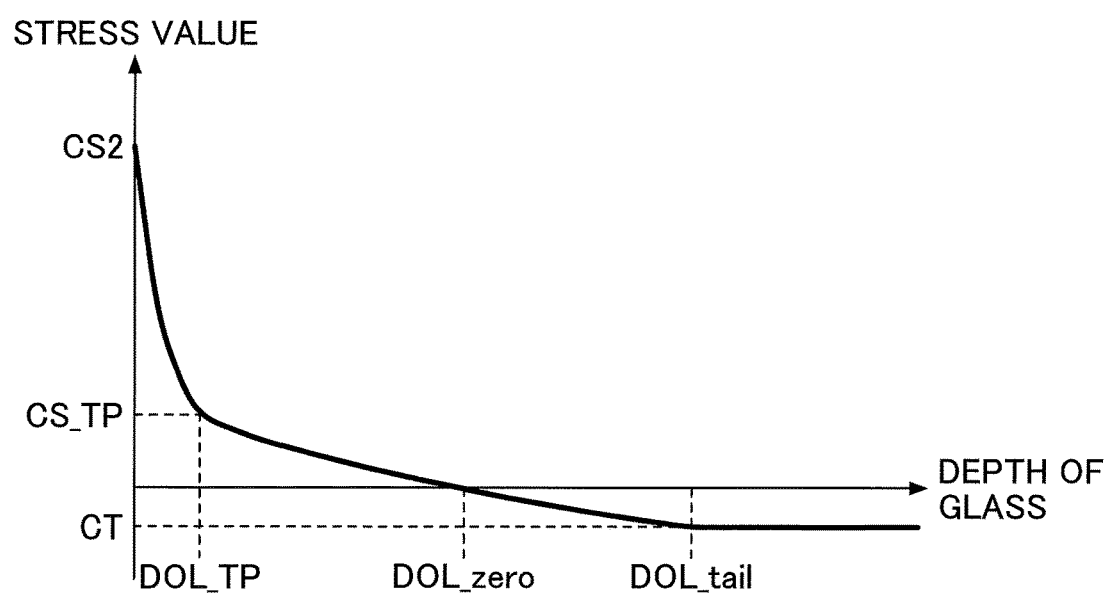
FIG. 21 is a diagram depicting an example of a stress distribution in a depth direction of the strengthened glass.

Next, an example of deriving each characteristic value of the stress distribution will be described. FIG. 21 is a diagram depicting an example of the stress distribution in the depth direction of the strengthened glass. In FIG. 21, CS2 is a stress value at the outermost surface, CS_TP is a stress value at a position where the stress distribution is bent, CT is a stress value at the deepest part of the glass; and DOL_TP is a glass depth at a position where the stress distribution is bent, DOL_zero is a glass depth at which the stress value becomes zero, DOL_tail is a glass depth at which the stress value becomes the same value as CT.

Figure 22:
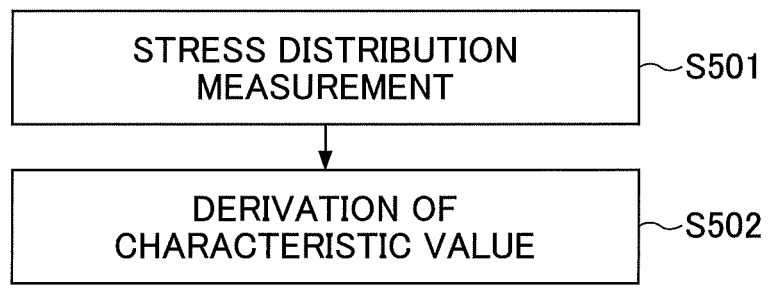
FIG. 22 is a flowchart depicting a first example of a process of deriving a characteristic value based on a stress distribution.

As illustrated in FIG. 22, stress distribution is measured in step S501, and a characteristic value can be derived based on the stress distribution measured in step S501 in step S502. The process will be described in detail below.

Figure 23:
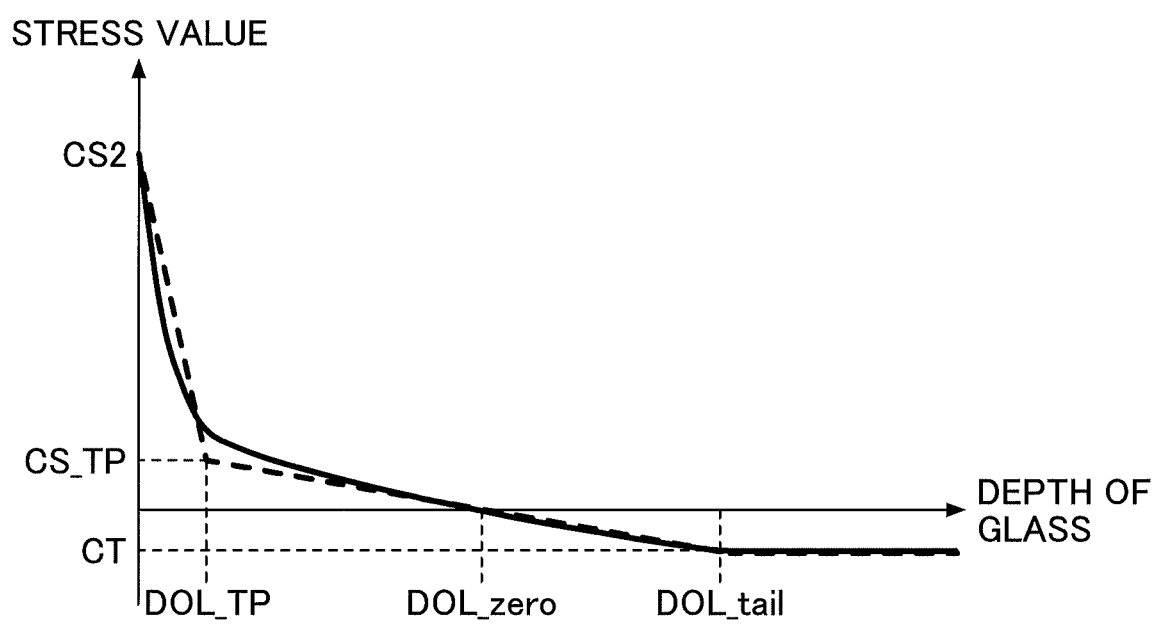
FIG. 23 is a diagram depicting an example of deriving each characteristic value from the measured stress distribution.
Figure 24:
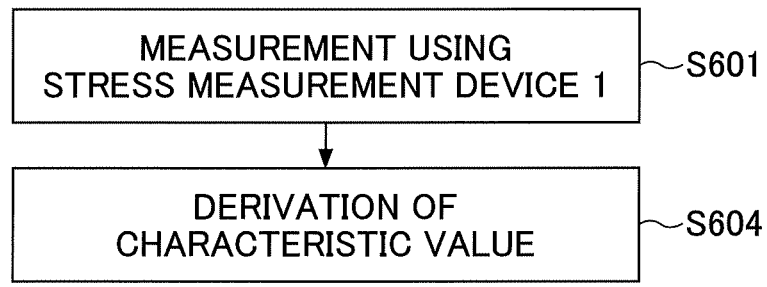
FIG. 24 is a flowchart depicting a second example of the process of deriving a characteristic value based on a stress distribution.

FIG. 23 shows an example in which each characteristic value is derived from the measured stress distribution. For example, in step S601 of FIG. 24, the whole distribution of the stress distribution (the solid line shown in FIG. 23)) is measured by the stress measurement device 1. Then, each characteristic value is derived in step S604.

In step S604, for example, each characteristic value is derived as follows. That is, as illustrated in FIG. 23, two line segments of a line segment passing through the CS2 and a line segment passing through the DOL_zero are considered. When the difference between the two line segments and the measured stress distribution is minimized, coordinate values of an intersection point of the two line segments are denoted as CS_TP and DOL_TP. Moreover, a coordinate value of an intersection of a line segment passing through DOL_zero and the CT is denoted as DOL_tail.

The abode-described technique can be applied to, for example, a lithium-aluminosilicate-based strengthened glass, a strengthened glass in which one chemical strengthening was performed using a mixed salt of sodium nitrate and potassium nitrate, a strengthened glass in which a chemical strengthening was performed using one or more times a molten salt containing sodium nitrate and a molten salt containing potassium nitrate respectively, and a strengthened glass in which both air cooling and chemical strengthening are performed.

Figure 25:
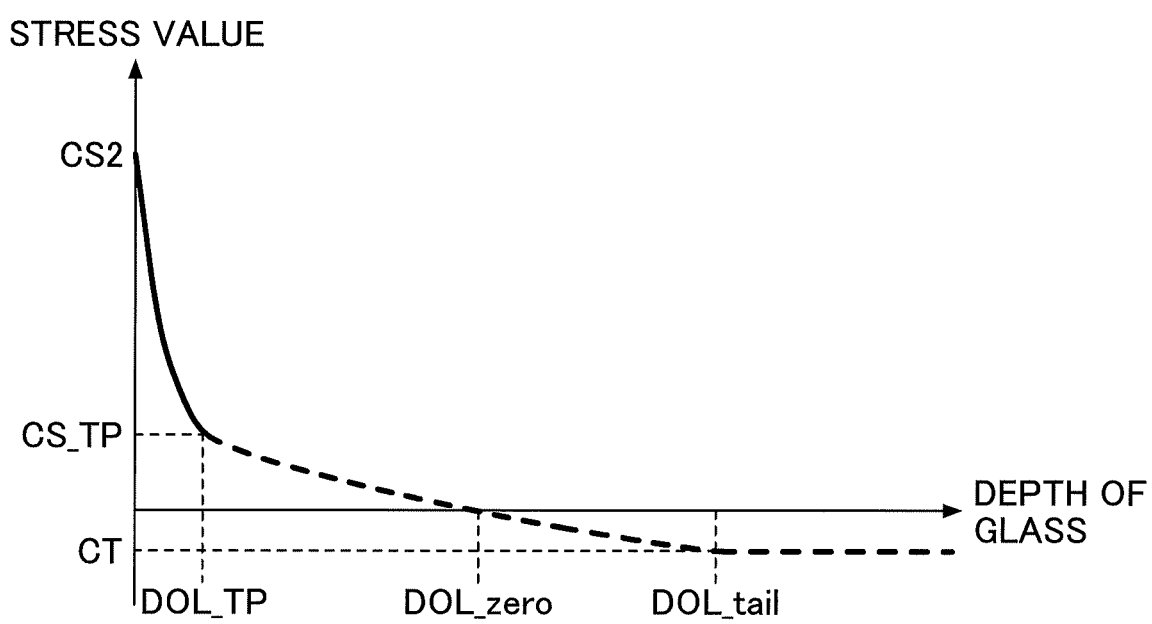
FIG. 25 is a diagram depicting another first example of deriving each characteristic value from the measured stress distribution.
Figure 26:
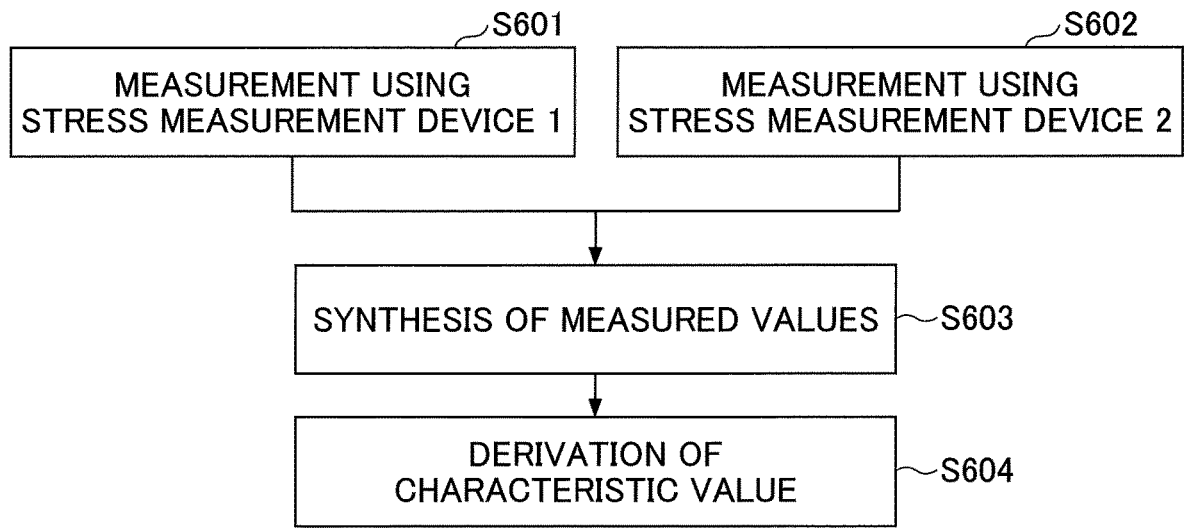
FIG. 26 is a flowchart depicting a third example of the process of deriving a characteristic value based on a stress distribution.

FIG. 25 is a diagram depicting another example of deriving each characteristic value from the measured stress distribution. For example, in step S601 of FIG. 26, the entire distribution of the stress distribution is measured by the stress measurement device 1. Next, in step S602, a glass surface layer side until DOL_TP is measured by the stress measurement device 2. Note that it is difficult to measure a deeper layer side until DOL_TP by the stress mearing device 2. Steps S601 and S602 are in a random order.

Next, in step S603, the part measured in step S602, and a part measured in step S601 on the deep layer side is synthesized. Thus, the stress distribution shown in FIG. 25 is obtained. Thereafter, for example, each characteristic value can be derived in the same manner as in the step S604 in FIG. 24, for example.

Figure 27:
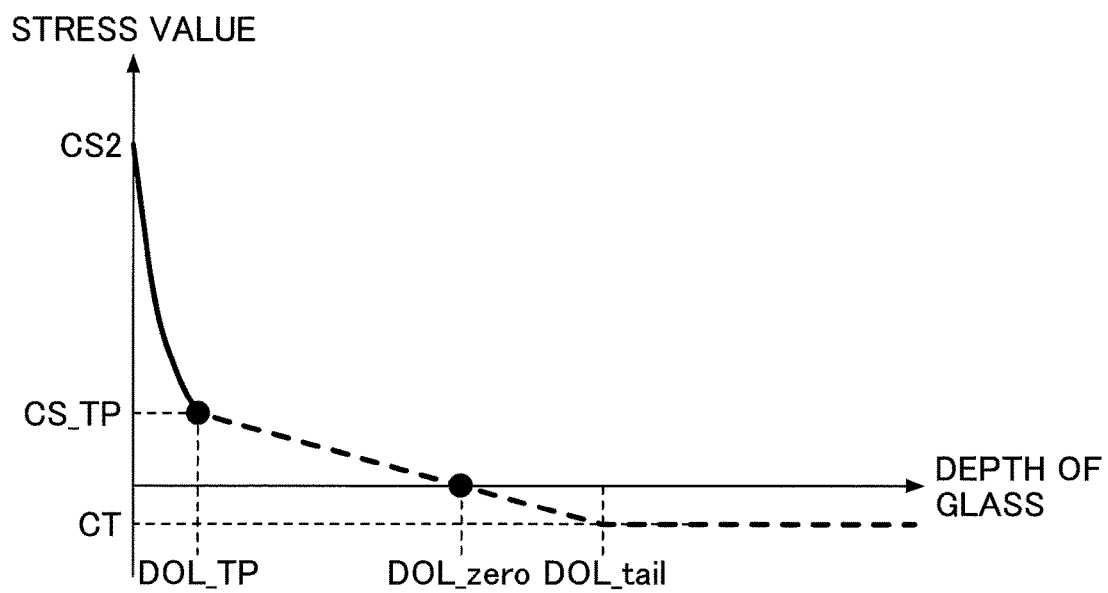
FIG. 27 is a diagram depicting another second example of deriving each characteristic value from the measured stress distribution.

Alternatively, in step S602 the process is performed in the same way as described above, and in step S601, DOL_zero and CT are measured. Then, in step S603, as illustrated in FIG. 27, a straight line is drawn from the intersection obtained in Step S601 (CS-TP, DOL_TP) passing through DOL_zero obtained in step S601, so that the stress distribution is defined until CT.

Figure 28:
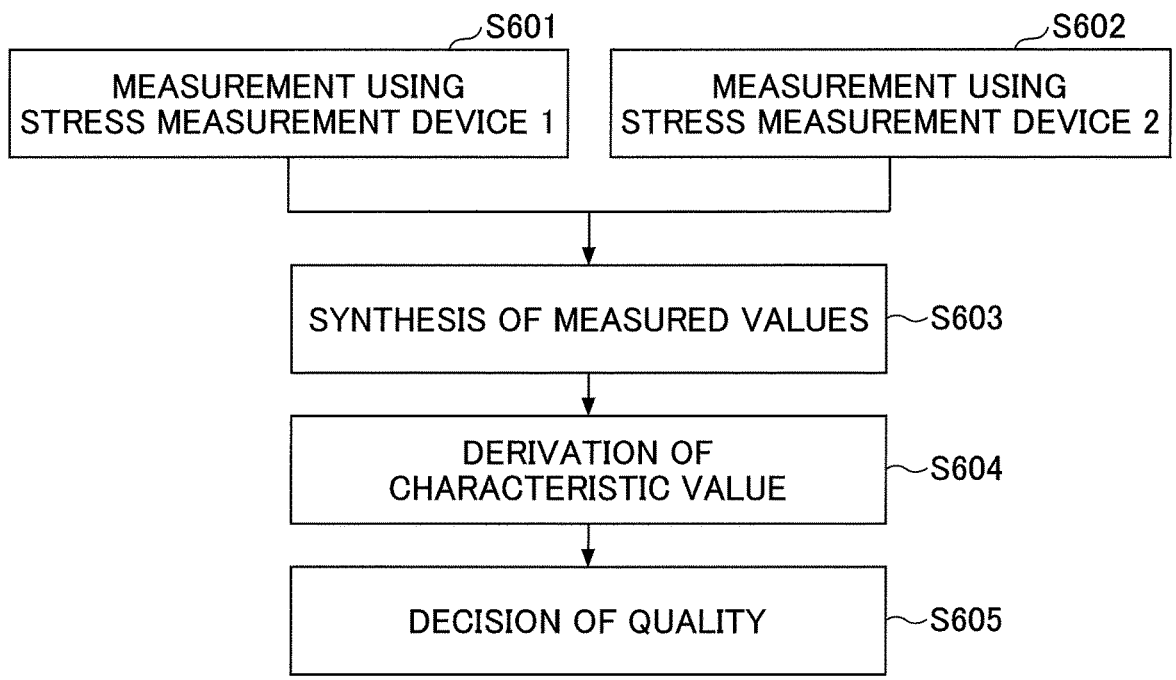
FIG. 28 is a flowchart depicting an example of a process of quality determination using each characteristic value obtained by measuring the stress distribution.

Quality determination can be performed using each characteristic value obtained by measuring the stress distribution. FIG. 28 is a flowchart depicting an example of a process of a quality determination using the respective characteristic values obtained by the measurement of the stress distribution. In FIG. 28, first, steps S601 to S603 are executed in the same manner as in FIG. 26. Next, in step S604, based on data obtained in steps S601 and S603 six characteristic values of CS2, CS_TP, CT, DOL_TP, DOL_zero, DOL_tail (hereinafter, may be simply referred to as "six measurement value") are derived. Next, in step S605, it is determined whether the six characteristic values derived in step S604 fall within an allowable range defined in the prior request specification. In this method, two measurements of step S601 and S602 are required for one quality determination.

Figure 29A:
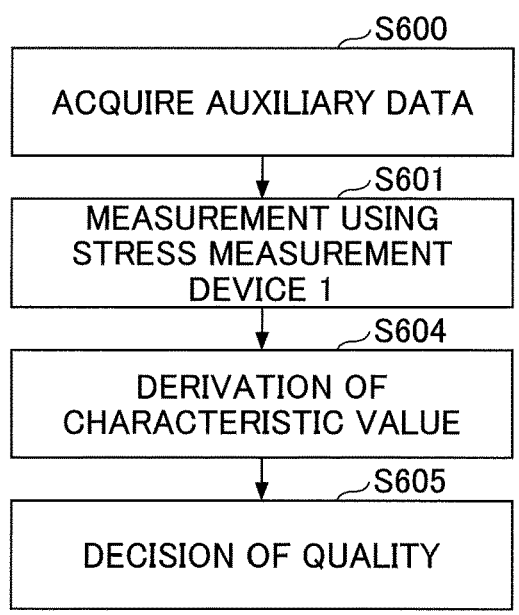
FIGS. 29A and 29B are flowcharts depicting another example of the process of quality determination using each characteristic value obtained by measuring the stress distribution.
Figure 29B:
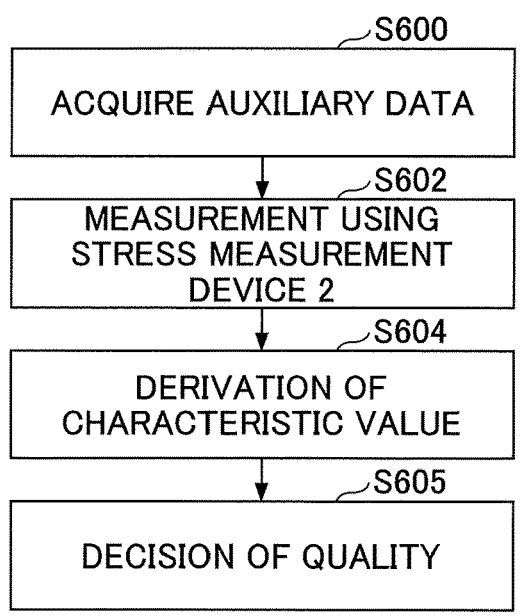

FIGS. 29A and 29B are flowcharts depicting another example of the process of the quality determination using the respective characteristic values obtained by the measurement of the stress distribution. In FIG. 29A, first, in step S600, preliminary data are acquired. Specifically, for example, by using the stress measurement devices 1 and 2 for a predetermined quantity for each lot, six characteristic values are derived. Then, the allowable range of the characteristic values is determined on the basis of the specification of a product and the derived characteristic values.

Next, in step S601, the glass deep layer side is measured by the stress measurement device 1 until DOL_TP. Then, in step S604, the six characteristic values are derived again on the basis of the data of the stress measurement device 2 in the step S600 and the data of the stress measurement device 1 in the step S601.

Next, in step S605, it is determined whether the six characteristic values measured in step S604 fall within the allowable range determined in step S600. In this method, regarding a quantity other than the quantities measured in the preliminary step, only one measurement in step S601 is required for one quality determination. Thus, the quality control flow can be simplified with respect to in the case of FIG. 28.

Alternatively, the process of the quality determination illustrated in FIG. 29B may be employed. In FIG. 29B, in the same way as in FIG. 29A, first, in step S600, preliminary data are acquired, and an allowable range of the characteristic value is determined.

Next, in step S602, a glass surface layer side until DOL_TP is measured by the stress measurement device 2. In step S604, the six characteristic values are derived again on the basis of the data of the stress measurement device 1 in the step S600 and the data of the stress measurement device 2 in the step S602.

Next, in step S605, it is determined whether the six characteristic values measured in step S604 fall within the allowable range determined in step S600. In this method, regarding a quantity other than the quantities measured in the preliminary step, only one measurement in step S602 is required for one quality determination. Thus, also in this case, in the same way as in FIG. 29A, the quality control flow can be simplified with respect to the case of FIG. 28.

Figure 30:
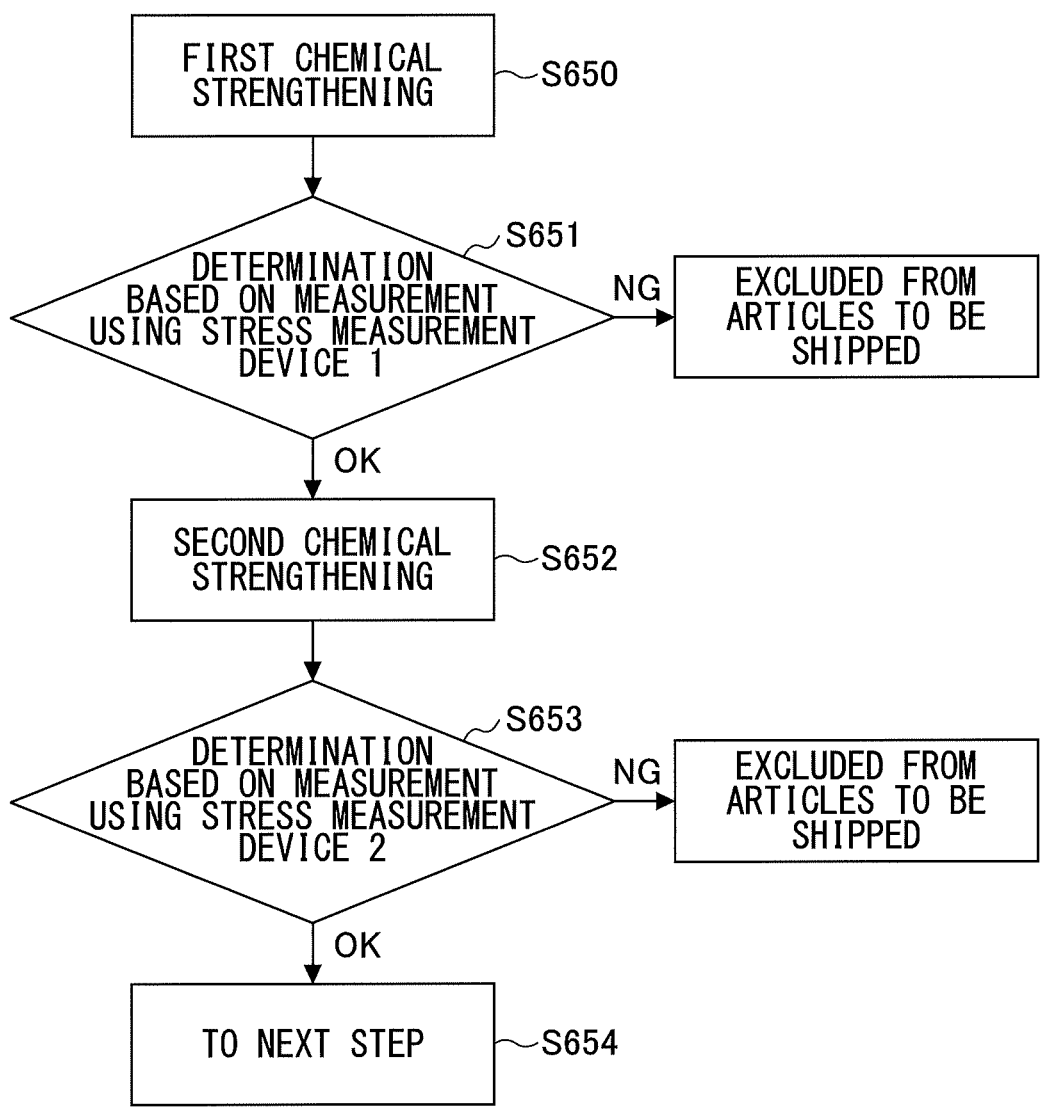
FIG. 30 is a flowchart depicting a first example of a process of quality determination in a case where a lithium-containing glass is strengthened two or more times.

FIG. 30 is a flowchart depicting a process of a quality determination in the case of performing two or more chemical strengthening processes for a lithium containing glass such as a lithium-aluminosilicate-based strengthened glass (glass containing 2 wt % or more of lithium). In FIG. 30, the strengthened glass related to the strengthening process other than the final strengthening process is determined on the basis of the measurement result of the stress measurement device 1, and the strengthened glass related to the final strengthening process is determined on the basis of the measurement result of the stress measurement device 2.

Specifically, first, the first chemical strengthening is performed in step S650. Then, in step S651, a stress distribution on the glass deep layer side until DOL_TP is measured by the stress measurement device 1 (in the following, may be referred to as a first stress distribution). When there is a problem in a measurement result in step S651 (in the case of NG), the strengthened glass is not shipped. If there is no problem in the measurement result in step S651 (in the case of OK), the process proceeds to step S652 to perform the second chemical strengthening. The quality determination in step S651 (determination of OK/NG) can be performed based on all of or a part of the six characteristic values derived from the measurement results of the stress measurement device 1 (e.g. CT and DOL_zero).

Next, in step S653, a stress distribution on the glass surface layer side until DOL_TP is measured by the stress measurement device 2 (hereinafter, referred to as a second stress distribution). When there is a problem in a measurement result in step S653 (in the case of NG), the strengthened glass is not shipped. If there is no problem in the measurement result in step S653 (in the case of OK), the process proceeds to step S654. Specific method of the quality determination in step S653 (determination of OK/NG) will be described later in detail.

The next step includes, for example, a touch polishing process. The touch polishing process is, for example, a final polishing process for polishing the surface of the strengthened glass 200 with a relatively low surface pressure. However, it is not essential to provide the touch polishing step, and step S653 may be the final step.

Moreover, after step S653, a third chemical strengthening process and a quality determination may be performed. In this case, in step S653, the strengthened glass related to the second strengthening process is determined on the basis of the measurement result of the stress measurement device 1, in the same way as step S651, and the strengthened glass related to the third (final) strengthening process is determined on the basis of the measurement result of the stress measurement device 2.

The same applies to the case where the number of strengthening processes is further increased. The strengthened glass related to the strengthening process other than the final strengthening process is determined on the basis of the measurement result of the stress measurement device 1, and the strengthened glass related to the final strengthening process is determined on the basis of the measurement result of the stress measurement device 2. Thus, the evaluation time can be shortened while maintaining the measurement reproducibility.

In the following, the specific method of the quality determination in step S653 (determination of OK/NG) will be described.

(Evaluation Data Derivation)

Figure 31:
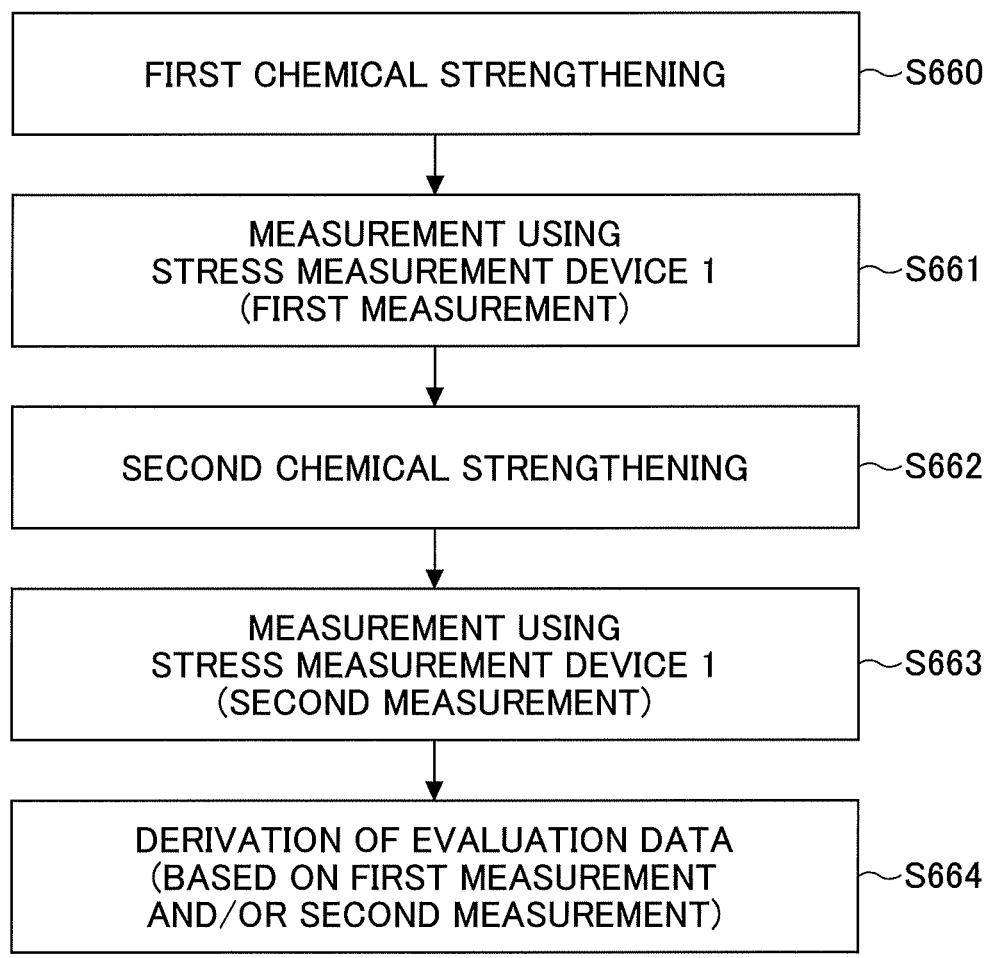
FIG. 31 is a flowchart depicting a second example of a process of quality determination in a case where the lithium-containing glass is strengthened two or more times.

First, evaluation data derivation is performed in advance. Specifically, as illustrated in FIG. 31, in step S660, the first chemical strengthening is performed. Then, in step S661, the glass deep layer side until DOL_TP is measured by the stress measurement device 1 (first measurement). Subsequently, in step S662, the second chemical strengthening is performed. Then, in step S663, the glass deep layer side until DOL_TP is measured by the stress measurement device 1 (second measurement). Then, in step S664, the evaluation data (first stress distribution) are derived based on any one of or both the first measurement result obtained in step S661 and the second measurement results obtained in step S663.

Note that the evaluation data derivation is performed using only a predetermined quantity for each lot. Moreover, the first chemical strengthening and the second chemical strengthening in the evaluation data derivation, are performed under the same conditions as the first chemical strengthening and the second chemical strengthening in times of mass production.

(Method for Quality Determination in Step S653)

First, based on the measurement result obtained in step S653, a plate thickness t of the glass to be subjected to the chemical strengthening, and the evaluation data obtained as illustrated in FIG. 31, a stress distribution on the glass surface layer side until DOL_TP (second stress distribution) and a stress distribution on the glass deep layer side until DOL_TP (first stress distribution) are synthesized. For example, a result as illustrated in FIG. 32 is obtained.

Figure 32:
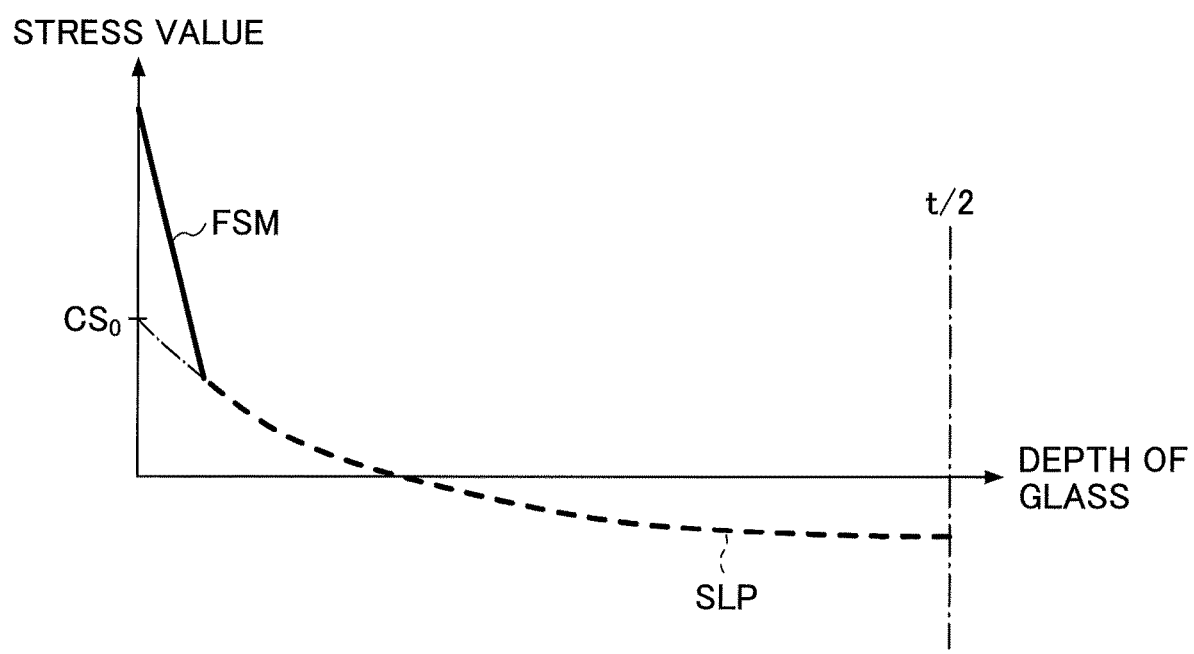
FIG. 32 is a diagram depicting an example of a result of a synthesis of a stress distribution near a glass surface layer and a stress distribution in a deep part of the glass.

In FIG. 32, an FSM indicated by a solid line indicates the stress distribution on the glass surface layer side until DOL_TP (second stress distribution). An SLP indicated by a broken line indicates a stress distribution on the glass deep layer side until DOL_TP (first stress distribution). Moreover, t/2 indicates a center of plate thickness of the glass. Moreover, $CS_0$ indicates a stress value on the surface when the first stress distribution (SLP) is extended to the surface side of the strengthened glass.

Next, CT is found from the stress distribution after synthesis, and each characteristic value is derived, and it is determined whether each characteristic value falls within the allowable range (shipping determination).

At this time, the second stress distribution (FSM in FIG. 32) may be approximated with a function. As an example of the function approximation, the second stress distribution is approximated by a linear function which will be given by the following equation 2 (Math 2).

[Math 2]

$$\sigma_f(x) = a \cdot x + CS2 \quad \text{(equation 2)}$$

In equation 2, $\sigma_f(x)$ is a second stress distribution, a is a slope, and CS2 is a stress value on the outermost surface.

As another example of the function approximation, the second stress distribution is approximated by a curve which will be given by the following equation 3 (Math 3).

[Math 3]

$$\sigma_f(x) = CS2 \cdot \text{erfc}(a \cdot x) \quad \text{(equation 3)}$$

In equation 3, $\sigma_f(x)$ is a second stress distribution as a function of x (depth of glass), a is a slope, CS2 is a stress value on the outermost surface, and erfc is an error function shown in equation 4 (Math 4).

[Math 4]

$$\text{erfc}(x) = 1 - \frac{2}{\sqrt{\pi}} \int_0^x e^{-\beta^2} d\beta \quad \text{(equation 4)}$$

Other examples of the function approximation include a polynomial.

Moreover, the first stress distribution (SLP in FIG. 32) may be moved in the vertical direction (in the direction of the coordinate axis of the stress value). Specifically, for example, in the stress distribution after the synthesis shown in FIG. 32, the first stress distribution (SLP) is moved in the direction of the coordinate axis of the stress value, and a CT where an integrated value of the stress distribution after the synthesis becomes zero is found, thereby each characteristic value is derived. Then, it is determined whether each characteristic value falls within an allowable range (shipping determination).

Moreover, the stress distribution $\sigma(x)$ after synthesis is approximated by the following equation 5 (Math 5), and a CT where an integrated value of $\sigma(x)$ (x=0 to t/2, t is a plate thickness of glass) becomes zero is found, thereby each characteristic value is derived. Then, it is determined whether each characteristic value falls within an allowable range (shipping determination).

[Math 5]

$$\sigma(x) = \text{Max}\left[\sigma_f(x), \frac{CS_0}{1 - \text{erfc}\left(c \cdot \frac{t}{2}\right)} \cdot \left\{\text{erfc}(c \cdot x) - \text{erfc}\left(c \cdot \frac{t}{2}\right)\right\} - CT\right] \quad \text{(equation 5)}$$

In equation 5, $\sigma(x)$ is the stress distribution after synthesis, $\sigma_f(x)$ is the second stress distribution, t is a plate thickness of the strengthened glass, and $CS_0$ and c are parameters derived based on the first stress distribution.

In formula (5), t is known. Moreover, $CS_0$ and c can be obtained from the measurement result of the stress measurement device 1 in the derivation of evaluation data.

$CS_0$ and c may be obtained from a simulation based on strengthening conditions.

Alternatively, $CS_0$ and c may be obtained from $CS_0'$ and c' derived from the measurement results of the stress measurement device 1 of the strengthened glass according to a first preceding strengthening before the final strengthening of the mass production, and equation 6 (Math 6) and equation 7 (Math 7) in the following.

[Math 6]

$$CS_0 = A1 \times CS_0' \quad \text{(equation 6)}$$

In equation 6, A1 is a constant of proportionality.

[Math 7]

$$c = A2 \times c' \quad \text{(equation 7)}$$

In equation 7, A2 is a constant of proportionality.

A1 and A2 may be obtained from the measurement result of the stress measurement device 1 in the evaluation data derivation, or may be obtained by simulation.

Note that the approximation of $\sigma(x)$ is not limited to equation 5, and may be, for example, polynomial approximation.

Practical Example

In Example 1, CS_TP (MPa), which is a characteristic value of the stress distribution of the strengthened glass subjected to two chemical strengthening treatments, was derived three times for the same sample by the method described with reference to FIG. 28, and evaluation time and measurement reproducibility were examined.

In Example 2, CS_TP (MPa), which is a characteristic value of the stress distribution of the strengthened glass subjected to two chemical strengthening treatments, was derived three times for the same sample by the method described with reference to FIGS. 30 to 32, and the evaluation time and the measurement reproducibility were examined. Specifically, based on the measurement result obtained in step S653 of FIG. 30, the thickness t of the glass to be chemically strengthened, and the evaluation data obtained in FIG. 31, when the second stress distribution (FSM) and the first stress distribution (SLP) were synthesized, the first stress distribution (SLP) was moved in the direction of the coordinate axis of the stress value, and CT where an integrated value of the stress distribution after synthesizing becomes zero was found, and thereby CS_TP was derived.

In Example 3, CS_TP (MPa), which is a characteristic value of the stress distribution of the strengthened glass subjected to two chemical strengthening treatments, was derived three times for the same sample by the method described with reference to FIGS. 30 to 32, and the evaluation time and the measurement reproducibility were examined. Specifically, based on the measurement result obtained in step S653 of FIG. 30, the thickness t of the glass to be chemically strengthened, and the evaluation data obtained in FIG. 31, when the second stress distribution (FSM) and the first stress distribution (SLP) were synthesized, the stress distribution after synthesizing σ(x) was approximated by equation 5, and CT where an integrated value of σ(x) (x=0 to t/2: t is a plate thickness of the glass) becomes zero was found, and thereby CS_TP was derived.

As comparative example 1, CS_TP (MPa), which is a characteristic value of the stress distribution of the strengthened glass subjected to two chemical strengthening treatments, was derived three times for the same sample by the method described in U.S. Patent Application Publication No. 2016/0356760, and the evaluation time (minutes) and the measurement reproducibility (difference between the maximum value and the minimum value) were examined.

The stress distributions obtained in comparative example 1 and Examples 1 to 3 are shown in FIGS. 33A to 33D, and a summary of the results are shown in TABLE 2. In FIGS. 33A to 33D, the stress value at a position where the stress distribution is bent is CS_TP.

TABLE 2

|  |  | Comparative example 1 | Example 1 | Example 2 | Example 3 |
|---|---|---|---|---|---|
| CS_TP (MPa) | N = 1 | 206.3 | 177.3 | 175.2 | 170.8 |
|  | N = 2 | 109.7 | 174.7 | 178.0 | 173.7 |
|  | N = 3 | 178.7 | 185.8 | 176.4 | 171.0 |
| Evaluation time (min) |  | <1 | ~10 | <1 | <1 |
| Measurement reproducibility (Max − Min) |  | 96.6 | 11.1 | 2.7 | 2.9 |

TABLE 2 shows that, in comparative example 1, the value of CS_TP derived three times for the same sample varies every time, and the measurement reproducibility is poor. In contrast, in Examples 1 to 3, variations in the value of CS_TP derived three times with respect to the same sample are small, and compared with comparative example 1, the measurement reproducibility is greatly enhanced. In particular, in examples 2 and 3, the measurement reproducibility is excellent. In addition, it was confirmed that the evaluation time was long in Example 1, but in the examples 2 and 3 the number of times of measurement by the stress measurement device 1 was reduced, and the evaluation time was short and the measurement reproducibility was excellent.

Third Embodiment

In a third embodiment, an example in which a liquid is sandwiched between the light supply member and the strengthened glass will be described. Note that in the third embodiment, a description regarding the same component as that of the embodiments, which had been already described, may be omitted.

Figure 34:
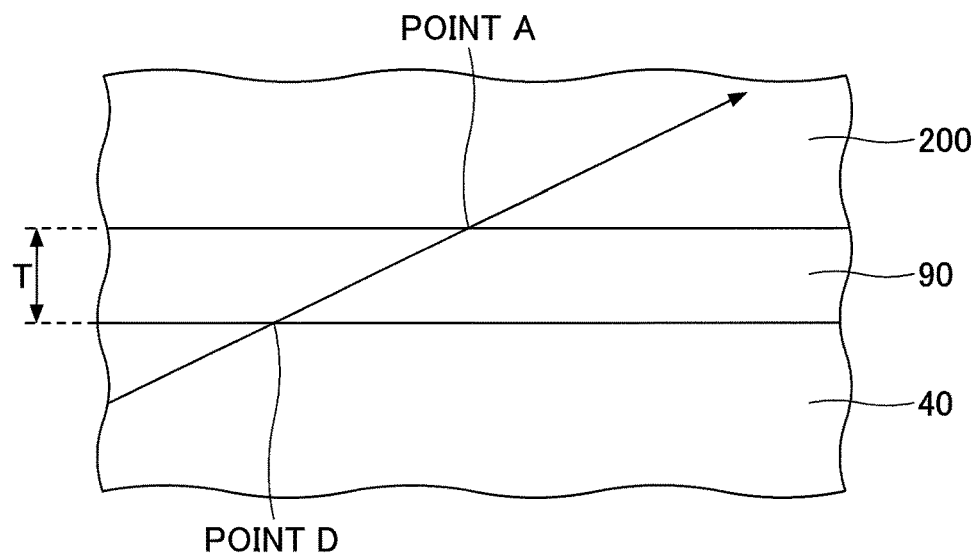
FIG. 34 is a diagram depicting an example of a stress measurement device according to a third embodiment.

FIG. 34 is a diagram depicting an example of a stress measurement device according to the third embodiment, and illustrating a cross section near an interface between the light supply member and the strengthened glass.

As shown in FIG. 34, in the present embodiment, a liquid 90 having almost the same refractive index as that of the strengthened glass 200 is interposed between the light supply member 40 and the strengthened glass 200 Because the refractive index of the strengthened glass 200 is slightly different depending on the kind of the strengthened glass, in order to completely match the refractive index of the light supply member 40 with the refractive index of the strengthened glass 200, it is necessary to replace the light supply member 40 for each kind of the strengthened glass 200. However, because this replacement work is inefficient, by interposing the liquid 90 having almost the same refractive index as the refractive index of the strengthened glass 200 between the light supply member 40 and the strengthened glass 200, laser light L can be efficiently incident into the strengthened glass 200.

For the liquid 90 includes, for example, a mixture liquid of 1-bromonaphthalene (n=1.64) and xylene (n=1.50) can be used. For the liquid 90, a mixture of a plurality of silicon oils having different structures may be used. For example, the refractive index of dimethyl silicone oil (n=1.38 to 1.41) and the refractive index of methylphenylsilicone oil (n=1.43 to 1.57)) can be adjusted by changing chain lengths of the methyl groups and the phenyl groups, respectively. The mixture of such a plurality of silicon oils in which refractive indices are adjusted in this way may be used for the liquid 90. Because the refractive index of the liquid 90 is determined by each mixing ratio, the refractive index of the liquid 90 can be made easily the same as the refractive index of the strengthened glass 200.

At this time, the difference in refractive index between the strengthened glass 200 and the liquid 90 is preferably set to ±0.03 or less, more preferably ±0.02 or less, and further preferably ±0.01 or less. In the case where the liquid 90 is absent, scattered light is generated between the strengthened glass 200 and the light supply member, and data cannot be acquired in a range of about 20 μm.

When a thickness of the liquid 90 is 10 μm or more, the scattered light is suppressed to about 10 μm or less. Thus, the thickness of the liquid 90 is preferably 10 μm or more. Furthermore, the thickness of the liquid 90 is preferably 500 μm or less taking into account the handling of the liquid.

Figure 35:
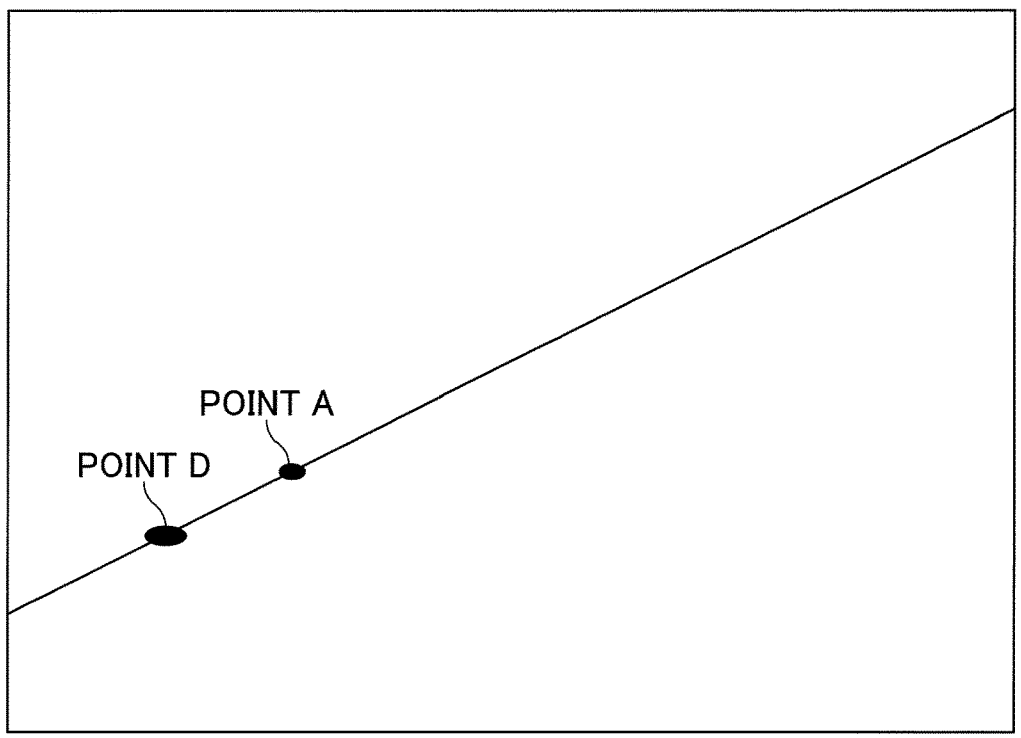
FIG. 35 is a diagram depicting an example of a scattered light image of a laser light L traveling through an interface between a light supply member and the strengthened glass.

FIG. 35 is a diagram depicting an example of an image of a scattered light of a laser light L travelling through an interface between the light supply member 40 and the strengthened glass 200. In FIG. 35, a point A is a surface scattering light of the strengthened glass, and a point D is a surface scattering light on a surface of the light supply member 40. A line between the point A and the point D represents a scattered light from the liquid 90.

When the thickness of the liquid 90 is thin, the point A and the point D are substantially the same, and a surface scattering light, in which the surface scattering light of the strengthened glass 200 is added to the surface scattering light of the light supply member 40, is generated. When a large number of strengthened glasses 200 are measured, a large number of scratches are generated on the surface of the light supply member 40. Then, a very large surface scattering light is generated.

However, as illustrated in FIG. 35, by interposition of the liquid 90, an interval between the light supply member 40 and the strengthened glass 200 is maintained, and thereby a surface scattering light of the light supply member 40 can be prevented from overlapping with a surface scattering light near the outermost surface layer of the strengthened glass 200.

Figure 36A:
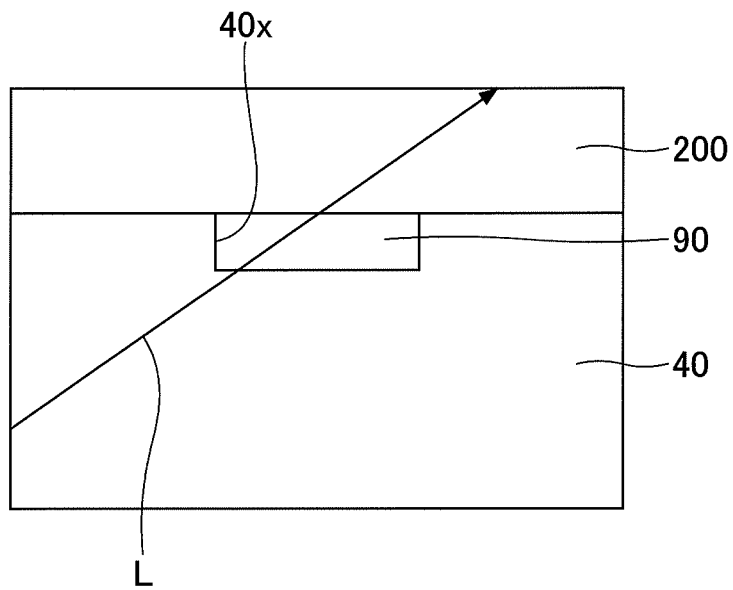
FIGS. 36A and 36B are diagrams depicting a first example of a structure for sandwiching a liquid between a light supply member and the strengthened glass.
Figure 36B:
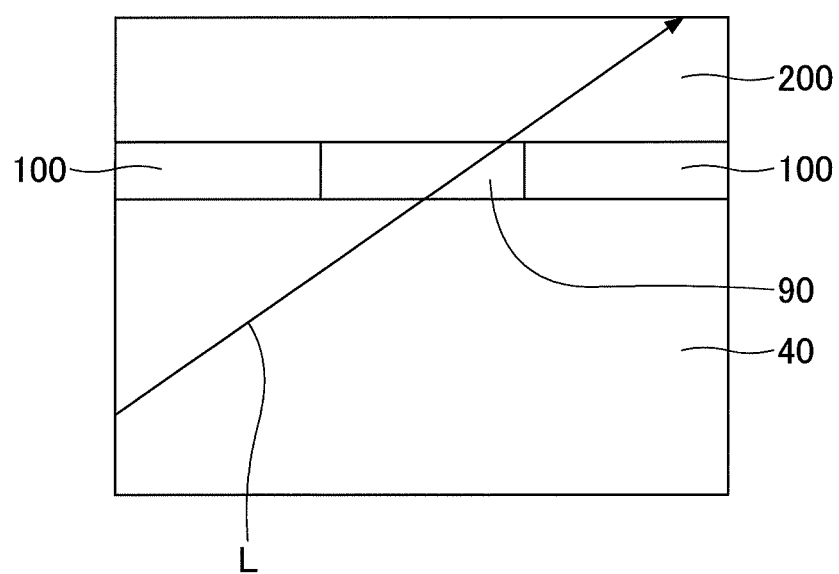

FIGS. 36A and 36B are diagrams depicting an example of a structure for interposing the liquid 90 between the light supply member 40 and the strengthened glass 200. As illustrated in FIG. 36A, a recess portion 40x having a depth of 10 μm or more is formed on the surface of the light supply member 40 by polishing and etching, and the recess portion 40x is filled with the liquid 90, and thereby the thickness of the liquid 90 can be made 10 μm or more in a stable manner. The depth of the recess portion 40x is preferably 500 μm or less taking into account an easiness of processing.

Moreover, instead of forming the recess portion 40x on the surface of the light supply member 40, as illustrated in FIG. 36B, by using a thin film formation technique such as a vacuum deposition or a sputtering, a land member configured of a metal, an oxide, a resin, or the like having a thickness of 10 μm or more may be formed on the surface of the light supply member 40, so that a land of the liquid 90 retained in the land member 100 is formed. By retaining the liquid 90 in the land member 100, the thickness of the liquid 90 can be made 10 μm or more in a stable manner. The thickness of the land member 100 is preferably 500 μm or less taking into account ease of processing.

Variation of Third Embodiment

In a variation of the third embodiment, another example of the structure for interposing a liquid 90 between the light supply member 40 and the strengthened glass 200, different from FIGS. 36A and 36B, will be described. Note that in the variation of the third embodiment, a description regarding the same component as that of the embodiments, which had been already described, may be omitted.

Figure 37:
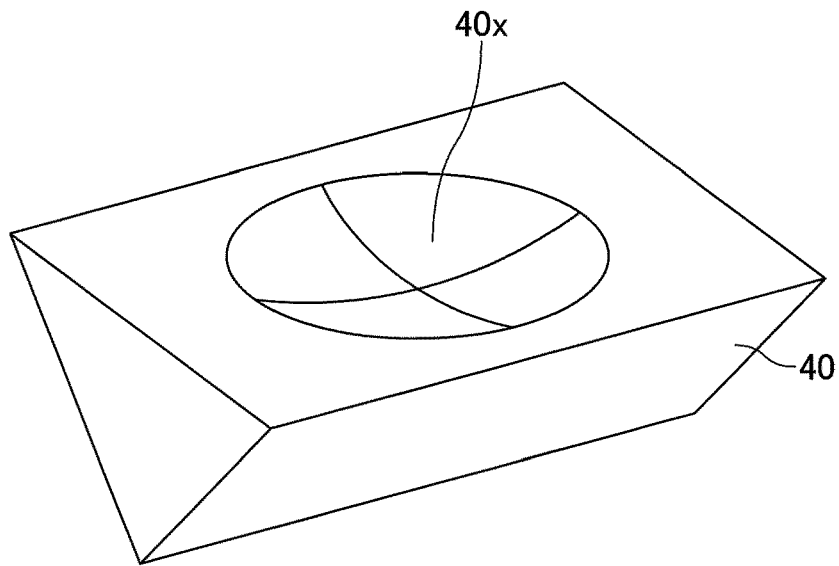
FIG. 37 is a diagram depicting a second example of the structure for sandwiching a liquid between the light supply member and the strengthened glass.

FIG. 37 is a diagram depicting a second example of the structure for interposing a liquid 90 between the light supply member 40 and the strengthened glass 200. As illustrated in FIG. 37, a bottom of the recess portion 40x formed on the surface of the light supply member 40 may not be flat. The recess portion 40x may be, for example, a spherical recess similar to a concave lens.

A depth of the recess portion 40x may be, for example, 10 μm or more and 500 μm or less. As an example, in the case where the depth of the recess portion is 50 μm and a diameter of a periphery of the recess portion is 10 mm, a radius of curvature R can be set to be 200 mm.

The recess portion 40x can be easily formed in a spherical recess by using the same manufacturing method as that of the concave lens. Because a refractive index of the liquid 90 filled in the recess portion 40x is the same as the refractive index of the light supply member 40, there is no effect of a lens by the liquid 90 in the spherical recess, and a trajectory of the laser light or an image of the camera that captures the scattered light is not affected.

Figure 38:
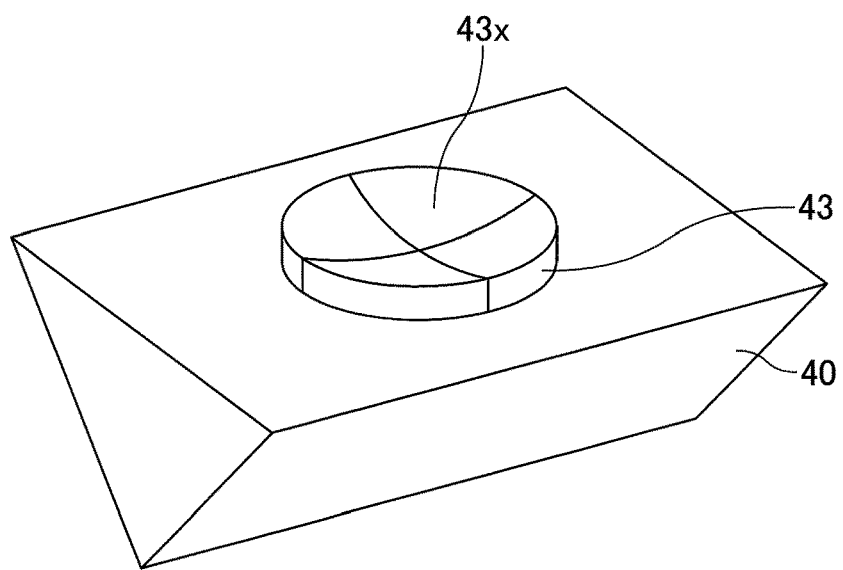
FIG. 38 is a diagram depicting a third example of the structure for sandwiching a liquid between the light supply member and the strengthened glass.

FIG. 38 is a diagram depicting a third example of the structure for interposing a liquid 90 between the light supply member 40 and the strengthened glass 200. As illustrated in FIG. 38, on a surface of the light supply member 40 on the strengthened glass 200 side, a single concave lens 43 that is a projection part is attached. The single concave lens 43 is in contact with the strengthened glass 200.

The single concave lens 43 is a part of an optical path of the laser light that enters into the strengthened glass 200 via the light supply member 40. On the single concave lens 43, for example, a spherical recess 43x is formed. A depth of the recess portion 43x may be, for example, 10 μm or more and 500 μm or less.

The light supply member 40 and the single concave lens 43 are formed as separate bodies, respectively, and bonded to each other by an optical adhesive agent having substantially the same refractive index as that of the light supply member 40 and the single concave lens 43.

In a typical processing for an optical element, a formation process of a prism that is composed of plain surfaces and a lens formation process of forming a spherical surface are different from each other in technique. It is difficult to form a prism having a concavity of a spherical shape, a large number of processes are required, productivity is poor, and manufacturing costs are quite expensive. That is, it is difficult to integrate the light supply member 40, which is a prism, with the single concave lens 43.

However, each of the light supply member 40 that is a prism and the single concave lens 43 alone can be easily formed by each processing technique. Moreover, a glass plate having substantially the same refractive index as that of the light supply member 40 and the single concave lens 43 may be inserted arranged between the light supply member 40 and the single concave lens 43. The glass plate can be used for mounting the light supply member 40 to the stress measurement device main body.

Figure 39:
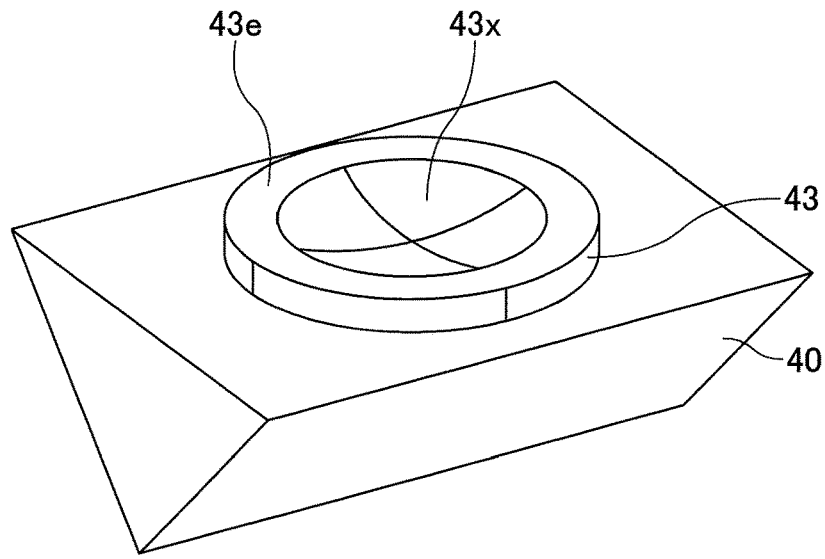
FIG. 39 is a diagram depicting a fourth example of the structure for sandwiching a liquid between the light supply member and the strengthened glass.

FIG. 39 is a diagram depicting a fourth example of the structure for interposing a liquid 90 between the light supply member 40 and the strengthened glass 200. As illustrated in FIG. 39, a flat outer edge portion 43e may be formed around the single concave lens 43. In the structure illustrated in FIG. 39, because the flat outer edge portion 43e is a surface that is in contact with the strengthened glass 200, when the strengthened glass 200 is in contact with the light supply member 40, the strengthened glass 200 and the light supply member 40 can be made parallel to each other with high precision. Moreover, damage such as a scratch on the strengthened glass 200 can be reduced.

Figure 40:
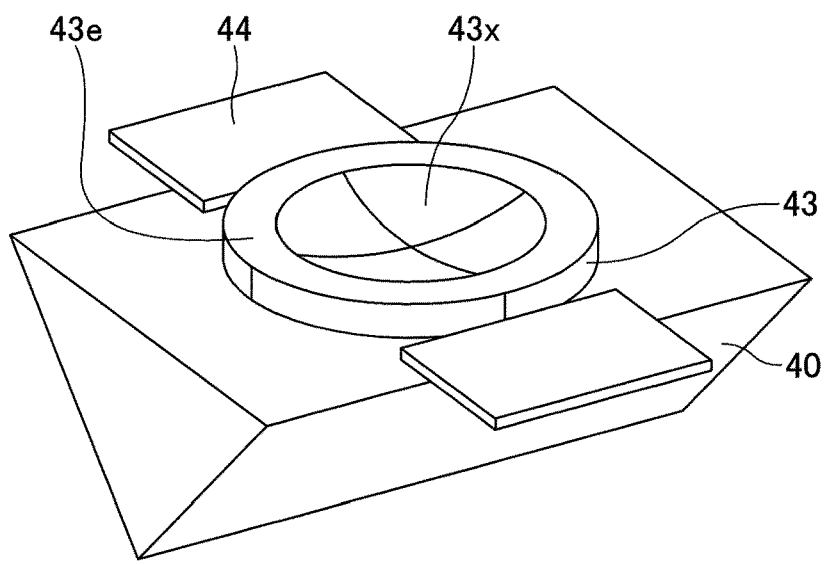
FIG. 40 is a diagram depicting a fifth example of the structure for sandwiching a liquid between the light supply member and the strengthened glass.

FIG. 40 is a diagram depicting a fifth example of the structure for interposing a liquid 90 between the light supply member 40 and the strengthened glass 200. As illustrated in FIG. 40, the light supply member 40 and the single concave lens may not be bonded to each other by an optical adhesive agent, interposing a liquid having the same refractive index such as the liquid 90, and may be fixed from an outer peripheral side surface so as not to move using a detachable support body 44.

By configuring the support body 44 so as to be freely opened and closed using a spring or the like, only the single concave lens 43 can be replaced easily. For example, in the case where the single concave lens 43 is damaged or a scratch occurs in the lens by contacting with the strengthened glass 200 or the like, or in the case of changing to a single concave lens 43 having a concave portion of another shape, it is enough to prepare a plurality of single concave lenses in advance and the lens may be replaced.

Note that if the single concave lens 43 is retained in an exchangeable manner, any shape or structure of the support body 44 may be possible.

Figure 41:
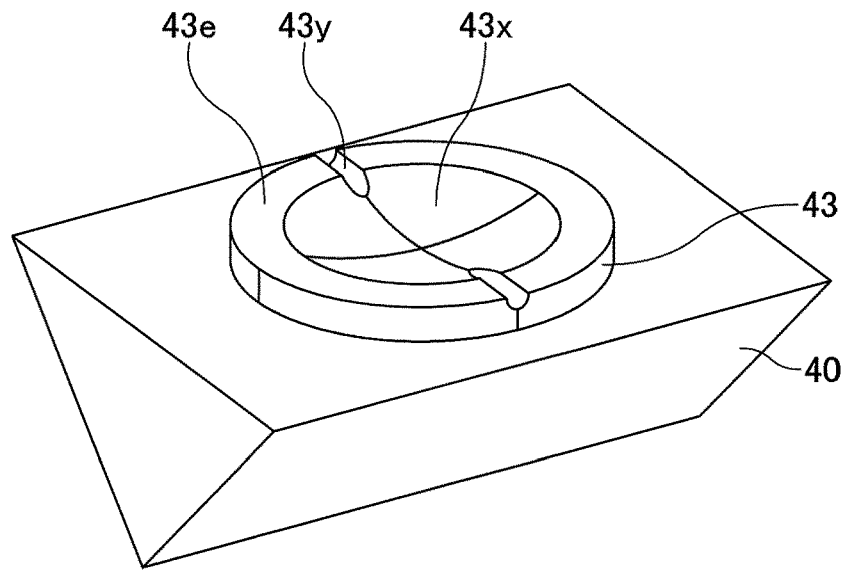
FIG. 41 is a diagram depicting a sixth example of the structure for sandwiching a liquid between the light supply member and the strengthened glass.

FIG. 41 is a diagram depicting a sixth example of the structure for interposing a liquid 90 between the light supply member 40 and the strengthened glass 200. As illustrated in FIG. 41, a groove 43y for discharging the liquid 90 may be formed in the flat outer edge portion 43e formed on a periphery of the single concave lens 43. The groove 43y is communicated with the recess 43x.

When the liquid 90 is dropped into the recess 43x, and the strengthened glass 200 is placed on the light supply member 40, bubbles may remain in the recess 43x. By arranging the groove 43y for discharging the liquid 90 to the outside of the recess 43x, when the liquid 90 is dropped into the recess 43x and the strengthened glass 200 is placed, from the groove 43y bubbles are discharged with the liquid 90, and thereby bubbles can be prevented from remaining in the recess 43x.

Figure 42:
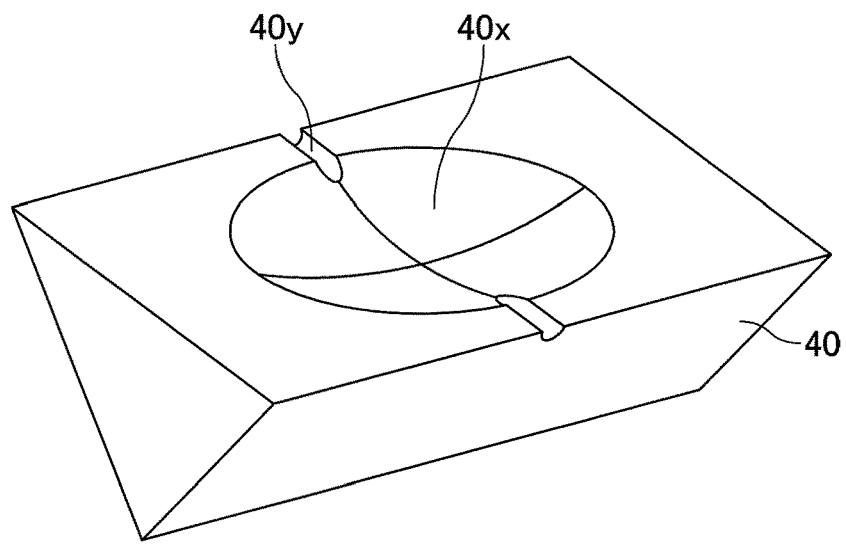
FIG. 42 is a diagram depicting a seventh example of the structure for sandwiching a liquid between the light supply member and the strengthened glass.

As illustrated in FIG. 42, a groove 40y that communicates with the recess 43x may be formed on a surface of the light supply member 40 in contact with the strengthened glass 200. In the same manner as in the case of FIG. 41, by arranging the groove 43y for discharging the liquid 90 to the outside of the recess 43x, when the liquid 90 is dropped into the recess 43x and the strengthened glass 200 is placed, bubbles are discharged with the liquid 90 from the groove 43y, and thereby bubbles can be prevented from remaining in the recess 43x.

In FIGS. 37 to 42, a crossing curve drawn in the recess 40x or 43x, or a vertical line drawn on a side surface of the single concave lens 43 was drawn for convenience in order to facilitate viewing of the drawing, and does not indicate an actual line (thin groove, projection, or the like).

Moreover, in the above description, the recess 40x or 43x has been described as a spherical recess. However, the recess 40x or 43x is not limited to a spherical shape, and is only required to have a curved part. The recess 40x or 43x may be a recess such as an aspherical surface. Moreover, the groove shape and the number of the grooves 40y or 43y may be set optionally.

Fourth Embodiment

In the fourth embodiment, an example of the stress measurement method in consideration of the refractive index of the strengthened glass will be described. Note that in the fourth embodiment, a description regarding the same component as that of the embodiments, which had been already described, may be omitted.

A formula for determining a stress St from a polarization phase difference Rt at the depth D of laser light can be expressed as the following equation 8 (Math 8):

[Math 8]

$$St = \frac{1}{C} \cdot \frac{dRt}{dD} \cdot \frac{1}{\cos^2 \Psi} \quad \text{(equation 8)}$$

where C is the photoelastic constant of the strengthened glass, and $\Psi$ is an angle formed between the laser light and the surface 210 of the strengthened glass 200, i.e. an incident complementary angle (refractive angle).

In equation 8, the last term including $\Psi$ indicates a correction of a contribution of a birefringence caused by a stress to the laser light. That is, an internal stress due to the strengthening of the strengthened glass 200 is parallel to the surface 210, while the laser light is obliquely incident on the surface 210. Thus, the correction of the contribution of the birefringence caused by the stress is required, and the last factor including $\Psi$ indicates an amount of correction. Note that in equation 8, although St is used in equation 8, because a coordinate system for the stress distribution is different from that in equation 1, another symbol is used for the sake of convenience.

Figure 43:
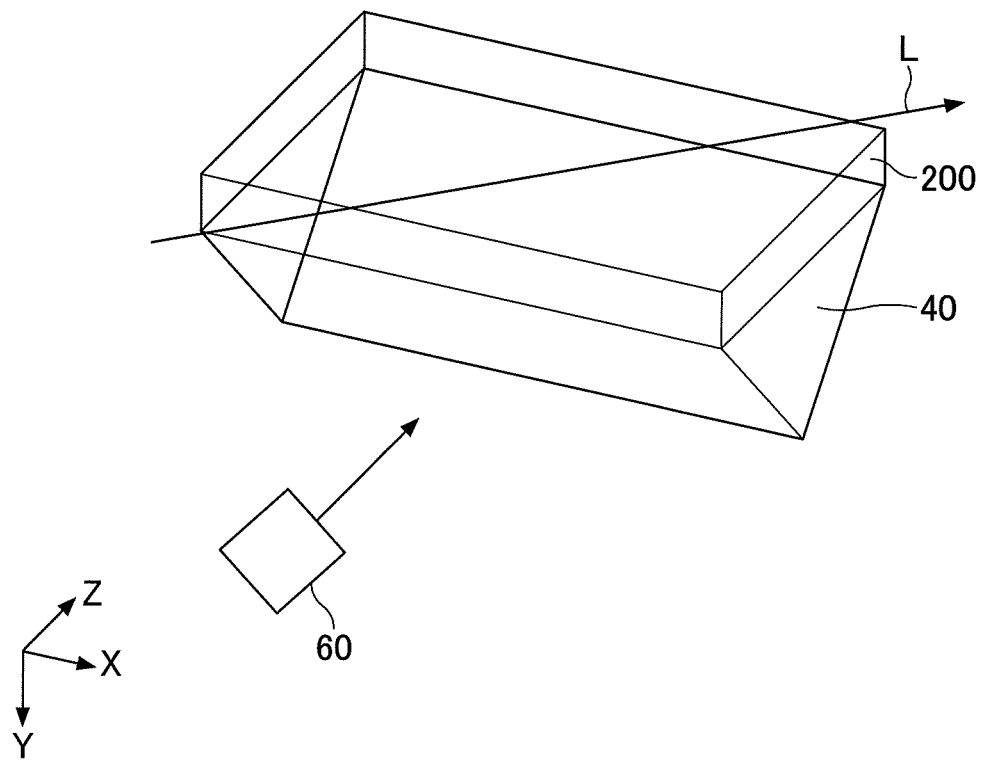
FIG. 43 is a diagram for explaining that the laser light L is incident into the strengthened glass.

FIG. 43 is a diagram for explaining that the laser light L is incident on the strengthened glass 200. In FIG. 43, the surface of the strengthened glass 200 is in contact with the upper surface of the light supply member 40, and the laser light L is located in an xyz coordinate system where the upper surface of the light supply member 40 and the surface of the strengthened glass 200 in contact with the upper surface of the light supply member 40 are on an XZ plane. Then, the laser light L is incident on the incident end face of the light supply member 40, passes through an interface between the upper surface of the light supply member 40 and the strengthened glass 200, and is incident into the strengthened glass 200. The imaging device 60 captures a laser trajectory (trajectory of the laser light L) from an oblique angle of 45° below.

Figure 44:
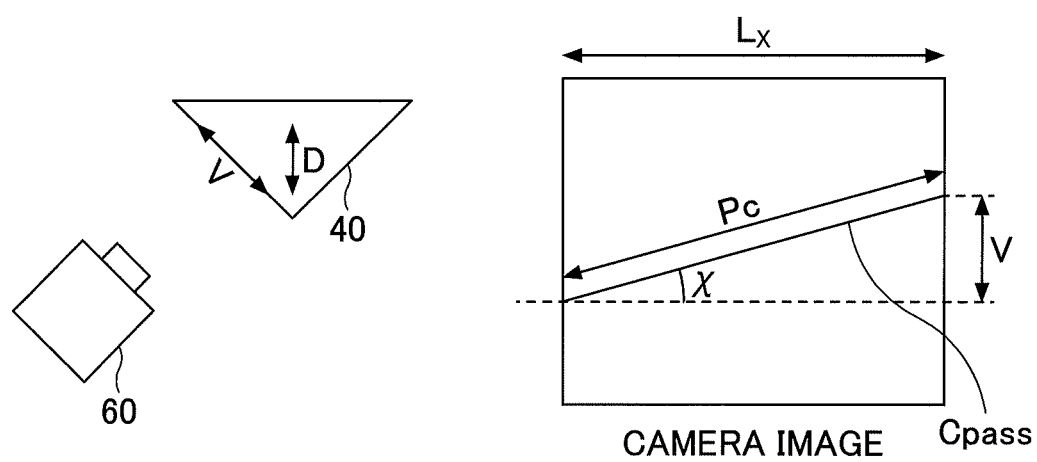
FIG. 44 is a diagram for explaining an image of a laser track taken from a position of an imaging element in FIG. 43.

FIG. 44 is a diagram for explaining an image of the laser trajectory captured from the location of the imaging element 60 in FIG. 43. The laser trajectory on the image captured by the imaging element 60 will be referred to as Cpass. A length of Cpass is Pc, an angle of the laser trajectory on the image is $\chi$, a distance in the horizontal direction on the image is Lx, and a distance in the vertical direction on the image is V. In the stress measuring device 1, an image analysis is performed for an image from the imaging element 60 of the laser light L (correctly, scattered light from the laser light L), and finally a stress inside the strengthened glass 200 is measured.

However, because the image acquired by the imaging element 60 is an image from an oblique angle of 45° below, a length Pc of the laser trajectory Cpass on the image may be different from an actual length of the laser light L. Moreover, the angle x on the image is different from an actual incident complementary angle T. Thus, in order to obtain a stress using equation 8 from an image of the laser light L, a conversion formula for obtaining an actual distance P of the laser light L, or the incident complementary angle $\Psi$ will be required.

Figure 45:
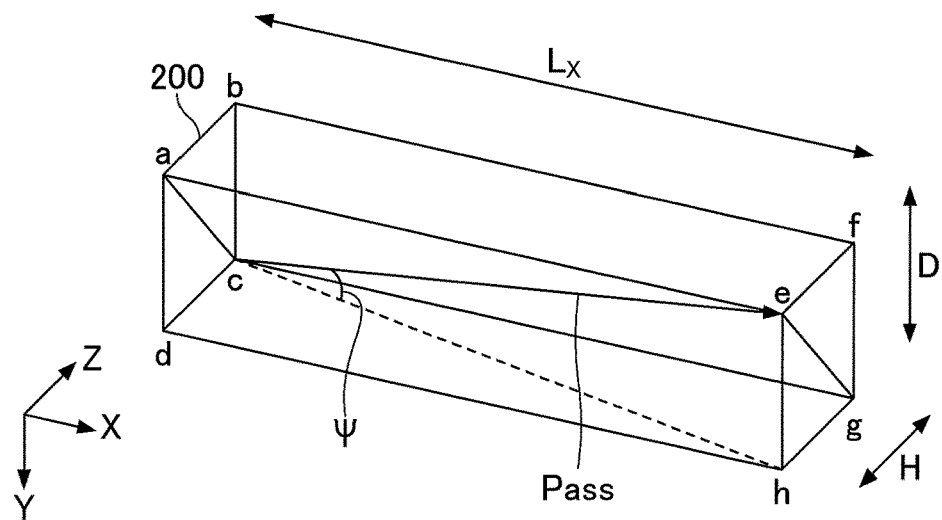
FIG. 45 is a diagram for explaining definitions of an angle and a length of laser light in the light supply member or the strengthened glass in FIG. 43.

FIG. 45 is a diagram for explaining definitions of the angle and length of the laser light in the light supply member 40 or the strengthened glass 200 in FIG. 43. In the following, a rectangular parallelepiped with vertices abcdefgh will be considered. A length of a side bf will be denoted as Lx, a length of a side ab will be denoted as H, and a length of a side fg will be denoted as D. D is the same as a depth of the light supply member 40 or a depth of the strengthened glass 200. In FIG. 45, the laser light L goes from the vertex c to the vertex e, and a trajectory of the laser light L will be denoted as Pass.

An upper surface abfe is assumed to be parallel to the upper surface of the light supply member 40 and the surface of the strengthened glass 200 in FIG. 43. A length ce of the trajectory Pass of the laser light is denoted by P, and $\Psi$ is an incident complementary angle of the laser light with respect to the surface of the strengthened glass 200. Moreover, a surface acge is equivalent to an incident surface of the laser light L.

Figure 46:
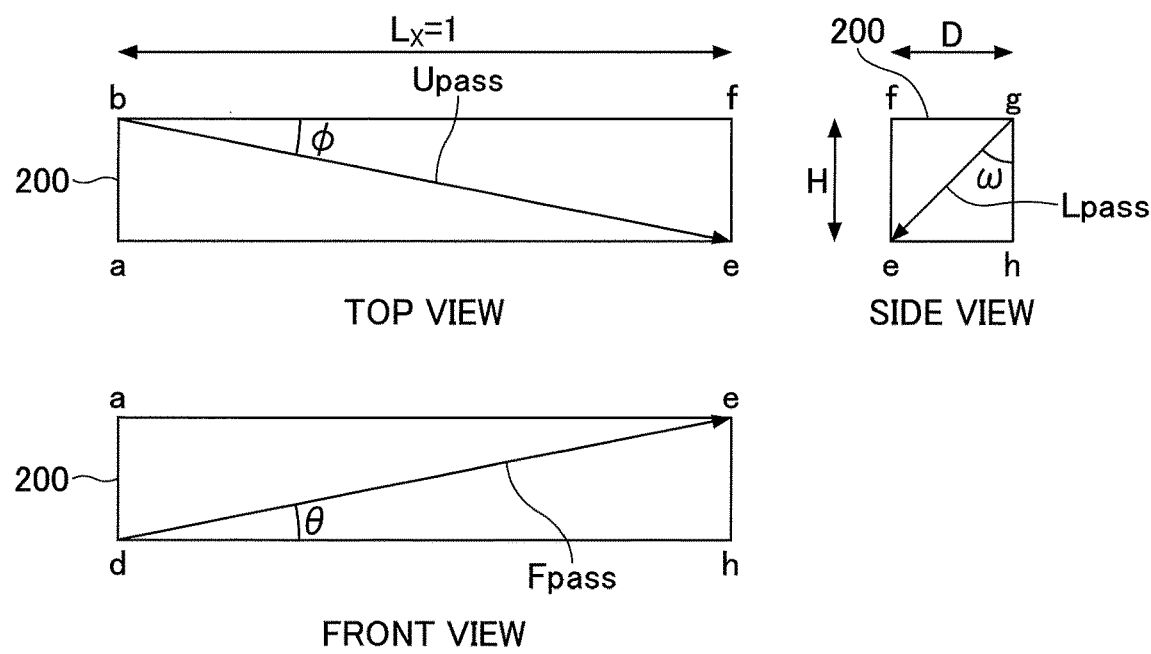
FIG. 46 is a top view, a front view, and a side view of FIG. 45.

FIG. 46 includes a top view, a front view, and a side view of FIG. 45. A trajectory of the laser light L viewed from the upper surface will be denoted as Upass, a length of the trajectory Upass will be denoted as Pu, a trajectory of the laser light L viewed from the front surface will be denoted as Fpass, a length of the trajectory Fpass will be denoted as Pf, a trajectory of the laser light L viewed from the side surface will be denoted as Lpass, and a length of the trajectory Lpass will be denoted as P1. An angle ω of the trajectory Lpass of the laser light L viewed from the side surface is an incident surface angle of the laser light L. A Z-axis rotational angle of the laser light L will be denoted as φ, and a Y-axis rotational angle of the laser light L will be denoted as θ.

In FIG. 45, when the length H of the side ab is the same as the length D of the side fg, the angle ω of the trajectory Lpass of the laser light L viewed from the side surface is 45°, and the incident surface angle ω of the laser light L is 45°. In the case where the length H is the same as the length D, because the Z-axis rotational angle φ of the laser light L is the same as the Y-axis rotational angle θ of the laser light L in FIG. 46, in order to make the incident surface angle of the laser light L in the strengthened glass 200 to 45°, it is found that the Z-axis rotational angle of the laser light L is required to be the same as the Y-axis rotational angle of the laser light L.

Moreover, the length P of the trajectory Pass of the laser light is expressed the following equation 9 (Math 9).

[Math 9]

$$P=\sqrt{L_x^2+D^2+H^2} \quad \text{(equation 9)}$$

Moreover, when Lx is set to a unit length, e.g. 1, from the angles φ and θ, the lengths D, H and Pu are obtained. Because the incident complementary angle Ψ of the laser light with respect to the surface of the strengthened glass is an angle between Pass and Upass, the length P of the laser light L and the incident complementary angle Ψ with respect to the surface of the strengthened glass 200 can be easily obtained from them.

(In the Case where the Refractive Index Np of the Light Supply Member is the Same as the Refractive Index Ng of the Strengthened Glass)

If the refractive index np of the light supply member 40 is the same as the refractive index ng of the strengthened glass 200, angles of the lasers or relations thereof are also the same in the light supply member 40 and in the strengthened glass 200. For example, when the Y-axis rotation angle θ and the Z-axis rotation angle φ of the laser in the light supply member 40 or in the strengthened glass 200 is 15°, respectively, the refractive index ng of the strengthened glass 200 is 1.516, and the refractive index np of the light supply member 40 is the same as the refractive index of the strengthened glass np=1.516, the incident surface angle ω is 45° in the strengthened glass 200, and the incident complementary angle Ψ is 14.5°

From FIG. 44, when the incident surface is 45°, the image is an image viewed perpendicularly to the incident surface. The distance Pc of the trajectory Cpass of the laser, illustrated in FIG. 44, is the same as the actual distance P of the trajectory Pass of the laser, and an actual depth D can be obtained from a depth V on the image using the following equation 10 (Math 10).

[Math 10]

$$D=V \times \sin 45° \quad \text{(equation 10)}$$

Using the aforementioned values, from the image of the imaging element 60 of the laser light, the stress of the strengthened glass can be calculated.

(In the Case where the Refractive Index Np of the Light Supply Member is not the Same as the Refractive Index Ng of the Strengthened Glass)

The aforementioned description relates to the case where the light supply member 40 and the strengthened glass 200 have the same refractive index, laser light goes through a boundary surface between the light supply member 40 and the strengthened glass 200 without being refracted, and the laser lights in the light supply member 40 and in the strengthened glass 200 are parallel to each other. However, actually, the refractive indices of the light supply member 40 and the strengthened glass 200 are not necessarily the same.

When the refractive indices of the light supply member 40 and the strengthened glass 200 are different from each other, the Z-axis rotation angle of the laser light is not changed, and only the Y-axis rotation angle is changed. Thus, even if the incident surface angle of the laser light in the strengthened glass 200 is 45° under the condition where the refractive indices of the light supply member 40 and of the strengthened glass 200 are the same, when the refractive index of the strengthened glass 200 is different from the refractive index of the light supply member 40, the incident surface angle of the laser light of the strengthened glass 200 deviates from 45°. Then, the distance Pc of the laser trajectory Cpass illustrated in FIG. 44 is different from the actual distance P of the laser trajectory Pass (Pc≠P). Moreover, the equation 10 is not satisfied.

It is difficult to directly measure an incident complementary angle Ψ and an incident surface angle ω of the laser light in the strengthened glass. Then, a trajectory of laser light will be considered in the case where the refractive index np of the light supply member 40 and the refractive index ng of the strengthened glass 200 are different from each other.

Moreover, when the laser light is incident on the light supply member 40 from the air, by an angle of the laser light before being incident on the light supply member 40 and an angle of the laser light with respect to an incident end face of the light supply member 40 on which the laser light is incident, the laser light is refracted, and is incident on the light supply member 40. Thus, taking into account the incident complementary angle before the laser light is incident on the light supply member 40 and also the angle of the incident end face of the light supply member 40, the required incident complementary angle of the laser light and the incident surface angle in the strengthened glass 200 will be considered.

In order to distinguish the angles φ and θ between in the strengthened glass 200 and in the light supply member 40, the angles in the strengthened glass 200 will be denoted as φg and θg, the angles in the light supply member 40 will be denoted as φp and θp, and angles before being incident on the light supply member 40 will be denoted as φL and θL. Moreover, the Z-axis rotational angle and the Y-axis rotational angle of the incident end face on which the laser of the light supply member 40 is incident will be denoted as β and α, respectively. Moreover, the refractive index of the light supply member 40 will be denoted as np, and the refractive index of the strengthened glass 200 will be denoted as ng.

When np and ng are different from each other, or when β and α are different from φL and θL, respectively, at the Z-axis rotation angle of a pair of φL and φp1; a pair of φp2 and φg; at the Y-axis rotation angle of α, a pair of θL and θp1; and a pair of θp2 and θg satisfy Snell's law, respectively. If the angles before the laser light is incident on the light supply member 40, φL and θL, the angles of the incident end surface of the light supply member 40 α and β, and the refraction indices ng and np are known in advance, parameters required for measurement, i.e. the rotational angle of the laser light in the strengthened glass 200, φg and θg, incident complementary angle Ψ and incident surface angle ω can be easily calculated.

The rotational angles, φL and θL, before the laser light is incident on the light supply member 40, the rotational angles, β and α, of the incident end face of the light supply member 40 on which the laser light is incident, and the refractive index np of the light supply member 40 are determined by the design of the device, and known. The refractive index of the strengthened glass 200 can be obtained by a typical refractive index measurement device.

Then, from the refractive index of the strengthened glass 200, measured using another method, and φL, θL, α, β, and np, determined by the design of the device, and the refractive index of the strengthened glass 200, φg, θg, the incident complementary angle Ψ, and incident surface angle ω of the laser light in the strengthened glass 200 are obtained, from Pc and χ of the image of the imaging element 60 of the laser light, conversion formulas to the incident complementary angle Y and the incident surface angle ω of the laser light in the strengthened glass 200 are obtained, and thereby the stress distribution in the strengthened glass can be measured from equation 8. In the following, a specific example will be shown.

Figure 47:
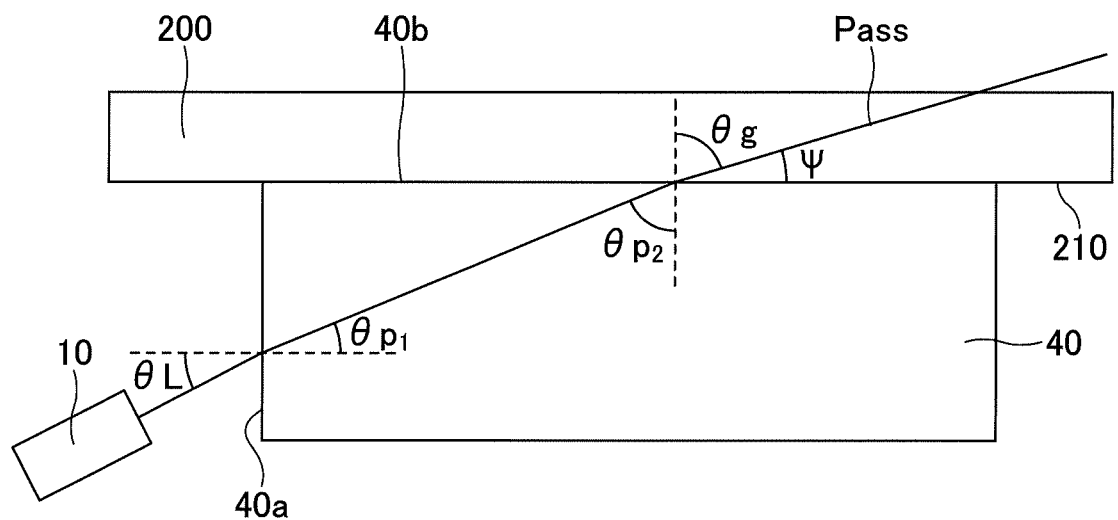
FIG. 47 is a diagram depicting a concept of laser light traveling through the light supply member and the strengthened glass.
Figure 48:
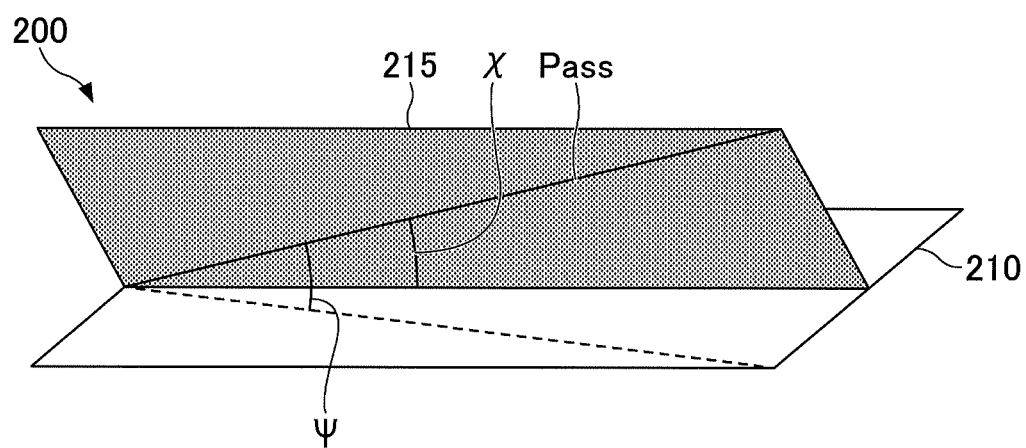
FIG. 48 is a diagram depicting a concept of laser light traveling in the strengthened glass.

FIG. 47 is a conceptual diagram of laser light traveling in the light supply member and the strengthened glass. Note that although a three-dimensional angle is actually formed, in FIG. 47, the laser light is two-dimensionally shown for the sake of convenience. FIG. 48 is a conceptual diagram of a laser light traveling through the strengthened glass, an element 215 schematically depicts an observation surface observed from the imaging element 60 by a satin-like pattern.

In FIGS. 47 and 48, θL is an angle between the laser light, incident on the light supply member 40 from the laser light source 10, and a normal line to the incident surface 40a of the light supply member 40 (on the laser light source 10 side). Moreover, $\theta_{P1}$ is an angle between the laser light, incident on the light supply member 40 from the laser light source 10, and a normal line to the incident surface 40a of the light supply member 40 (on the light supply member 40 side). Furthermore, $\theta_{P2}$ is an angle between the laser light, incident on the strengthened glass 200 from the light supply member 40, and a normal line to a light emission surface 40b of the light supply member 40 (on the light supply member 40 side). Note that because the incident surface 40a of the light supply member 40 is not actually orthogonal to the light emission surface 40b of the light supply member 40, the sum of the angles $\theta_{P1}$ and $\theta_{P2}$ is not always 90°.

Moreover, θg is an angle between the laser light, incident on the strengthened glass 200 from the light supply member 40, and a normal line to the light emission surface 40b of the light supply member 40 (on the strengthened glass 200 side), Ψ is an incident complementary angle (90-θg) formed between the surface 210 of the strengthened glass 200 (evaluation surface) and the laser light in the strengthened glass 200. Moreover, χ is a slope of the laser light observed from the imaging element 60. Note that when the angles θ, Ψ and the like are considered three dimensionally, the angles may be divided as illustrated in FIG. 46.

Figure 49:
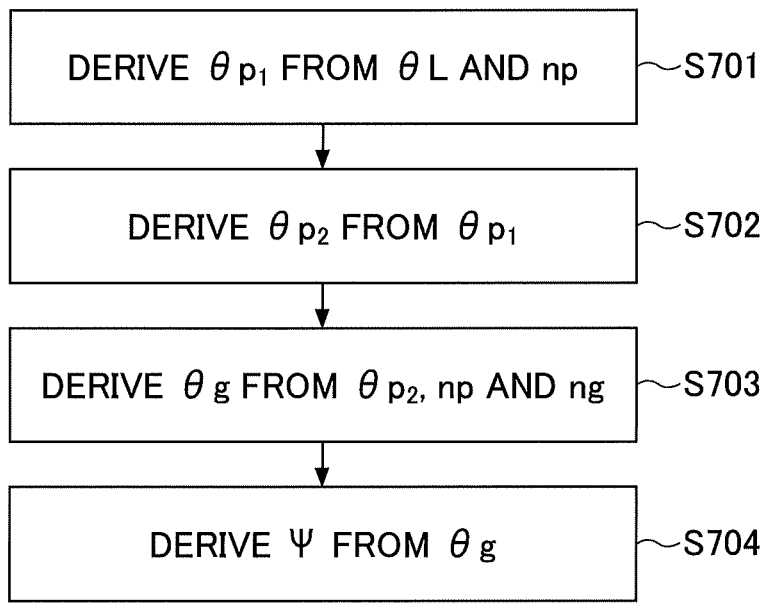
FIG. 49 is a flowchart depicting an example of a process for obtaining an incident complementary angle $\Psi$.

The incident complementary angle Ψ can be obtained, for example, according to a flowchart shown in FIG. 49. That is, first, in step S701, $\theta_{P1}$ is derived from θL and np. $\theta_{P1}$ can be obtained from θL and np by Snell's equation.

Next, in step S702, $\theta_{P2}$ is derived from $\theta_{P1}$. $\theta_{P2}$ can be obtained from $\theta_{P1}$ on the basis of the shape of the light supply member 40. Then, in step S703, θg is derived from $\theta_{P2}$, np, and ng. θg can be obtained by Snell's equation from $\theta_{P2}$, np, and ng.

Next, in step S704, Ψ is derived from θg. Ψ can be determined from θg by geometric calculations. That is, Ψ=90°−θg.

Ideally, the refractive index np of the light supply member 40 is the same as the refractive index ng of the strengthened glass 200. However, a variety of types of strengthened glasses are used, and refractive indices of the strengthened glasses are different. An optical glass forming the light supply member 40 is not necessarily a glass having the same refractive index as that of the strengthened glass.

For example, the most frequently used optical glass S-BSL7 (manufactured by Ohara Inc.) has np=1.516. An optical glass S-FSL5 (manufactured by Ohara Inc.) for the lowest refractive index np=1.487; and an optical glass S-TIL6 (manufactured by Ohara Inc.) for the highest refractive index np=1.5317 is available Thus, when a strengthened glass having a refractive index within a certain range is measured, it is necessary to perform the measurement using the optical supply member 40 formed of an optical glass having a refractive index close to the range.

For example, when the refractive index ng of the strengthened glass is 1.51, the incident complementary angle Ψ of the strengthened glass is 13.7°, and the incident surface angle ω is 43°. From the aforementioned values, a conversion expression can be obtained, and an accurate stress can be obtained by using equation 8.

Moreover, it is also possible to calculate the refractive index ng of the strengthened glass 200 from the angle χ of a laser image of the imaging element 60 inversely. That is, the refractive index ng of the strengthened glass 200 may be derived based on an image of the laser light acquired by the imaging element 60.

Figure 50:
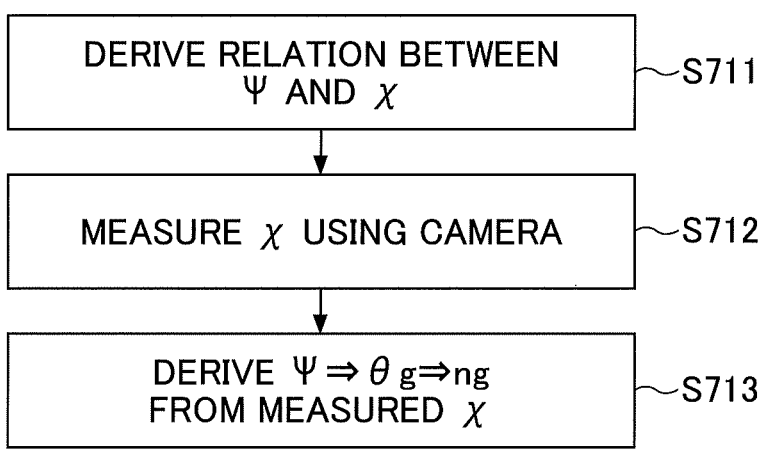
FIG. 50 is a flowchart depicting an example of a process of obtaining a refractive index ng of the strengthened glass.

Specifically, first, in step S711 in the flowchart shown in FIG. 50, a relationship between the incident complementary angle Ψ and the angle χ shown in FIG. 48 is derived. The relation between the incident complementary angle Ψ and the angle χ can be obtained by geometric calculations. Next, in step S712, the angle χ is measured by the imaging element 60 (camera).

Next, in step S713, the incident complementary angle Ψ is obtained from the relationship derived in step S711 using the angle χ measured in step S712. Furthermore, $\theta_g$=90°−Ψ is obtained. Then, the refractive index ng can be derived from known $\theta_{P2}$, ng and θg by using Snell's equation.

It is also possible to measure the stress distribution in the strengthened glass 200, by obtaining the refractive index ng of the strengthened glass 200 from the angle χ of the laser image of the imaging element 60, as above, and by obtaining a conversion formula on the basis of the refractive index ng of the strengthened glass 200.

However, due to a slope or the like when the strengthened glass 200 is mounted on the light supply member 40, an error occurs in the value of the refractive index ng of the strengthened glass 200 derived by the method illustrated in FIG. 50. Thus, in order to stably measure the stress distribution in the strengthened glass with high accuracy, it is preferable to measure the refractive index ng of the strengthened glass 200 in advance using another method (measurement by a refractive index measuring device or the like).

Figure 51:
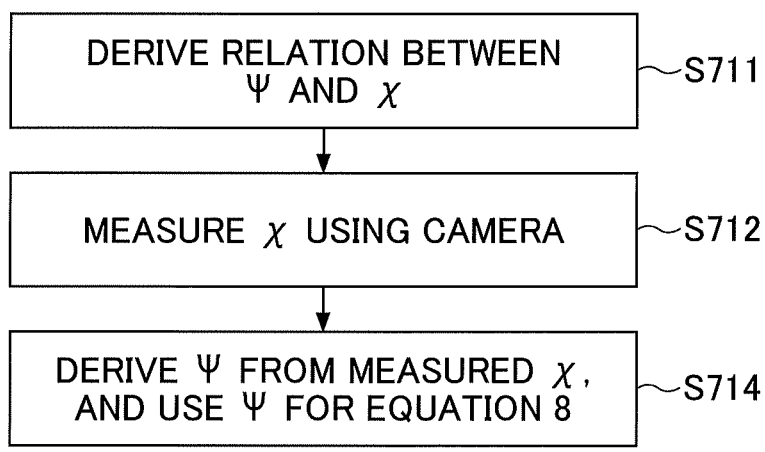
FIG. 51 is a flowchart depicting another example of the process for obtaining the incident complementary angle T.

Moreover, it is also possible to calibrate the incident complementary angle Ψ from the angle χ of the laser image of the imaging element 60. For example, in step S711 of a flowchart shown in FIG. 51, in the same manner as the case in FIG. 50, the relationship between the incident complementary angle Ψ and the angle χ is derived. In the same manner as in the case of FIG. 50, in step S712, the angle χ is measured by the imaging element 60. Then, in step S714, the incident complementary angle Ψ is derived from the relationship derived in step S711 using the angle χ measured in step S712. By applying the incident complementary angle Ψ derived in step S714 to equation 8, an accurate stress can be obtained.

Moreover, when the value of the refractive index ng of the strengthened glass 200 is known in advance, it is also effective to design an optimum light supply member 40 in consideration of the value of the refractive index ng of the strengthened glass 200.

The incident complementary angle Ψ and the incident surface angle ω in the strengthened glass 200 can be known by calculation. However, when the difference between the refractive index ng of the strengthened glass 200 and the refractive index np of the light supply member 40 increases, a deviation of the incident surface angle ω from 45° increases. Thus, when exceeding the focal depth of the lens of the imaging element 60, it becomes out of focus, a spatial resolution is lowered, and the correct stress distribution cannot be measured.

For example, in the case where the refractive index ng of the strengthened glass 200 is 1.49, the incident complementary angle Ψ of the laser light in the strengthened glass 200 is 10.3°, and the incident surface angle ω is 35°. In this case, the incident complementary angle Y can be corrected by calculation. However, the incident surface angle ω is deviated from 45° by 10°, and the measurement accuracy cannot be maintained only by the correction in the calculation.

Then, it is preferable to set the angle of the surface of the light supply member 40 on which the laser light is incident, so that the angle between the incident surface of the strengthened glass 200 on which the laser light is incident and the surface of the strengthened glass 200 is 45±5°.

For example, in the case where the distance of the laser trajectory is 300 μm, when the incident surface angle ω is shifted by 10°, a difference in the distance to the laser light in the strengthened glass 200 from the imaging element 60 is 52 μm. A length of the difference exceeds a focal depth of a lens that forms an image at the imaging element 60. Then, a laser trajectory captured by the imaging element 60 becomes out of focus, and the measurement accuracy is deteriorated.

Figure 52:
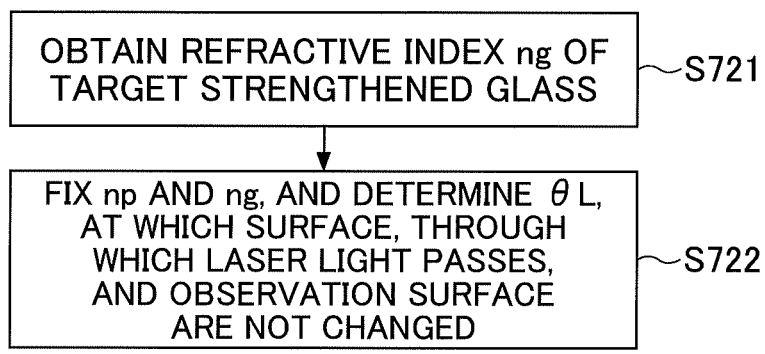
FIG. 52 is a flowchart depicting an example of a process of obtaining $\theta L$, at which a surface through which a laser light passes and an observation surface are not changed.

Then, for example, in step S721 of the flowchart shown in FIG. 52, the value of the refractive index ng of the target strengthened glass 200 ng is obtained. Next, in step S722, the refractive index ng of the strengthened glass 200 and the refractive index np of the light supply member 40 are fixed, the angles θL and φL are determined so that the surface where the laser light passes through coincides with the observation surface.

For example, assume the case where the refractive index ng of the strengthened glass 200 is 1.49. The Y rotation angle θL=15° of the laser light is set to be the same as the Z rotation angle φL=15° of the laser light. Moreover, the Y rotation angle β of the incident end face of the light supply member 40 is set to 15°, and the Z rotation angle α is set to 14.4°. Then, the incident complementary angle Ψ of the laser light is obtained to be 14.4°, and the incident surface angle ω is obtained to be 44.8° in the strengthened glass 200. The obtained angles are substantially the same as the designed values for the observation surface. Thus, the measurement accuracy is not deteriorated.

When the light supply member 40 of the aforementioned specification is manufactured, arrangement of the laser light source 10 is unchanged, and only the light supply member 40 is replaced, it becomes possible to accurately measure the stress distribution of the strengthened glass 200 with the refractive index ng that is greatly different from the refractive index np of the light supply member 40. Moreover, in order to reduce a returned light to the laser light source 10, the surface 210 of the strengthened glass 200 may be at a small angle (about 0.5 to 1°) to the surface of the light supply member 40 from which the laser light entering the strengthened glass 200 is emitted. In this case, a correction due to the arrangement to the stress can be estimated by using equation 8.

Fifth Embodiment

In a fifth embodiment, an example of a stress measuring device provided with a function of measuring a glass thickness will be described. Note that in the fifth embodiment, a description regarding the same components as that of the previously described embodiments may be omitted.

In a thin plate-like strengthened glass, a compressive stress is formed on a surface for strengthening. Then, a tensile stress is generated inside the glass in order to balance the stress as a whole.

Figure 53:
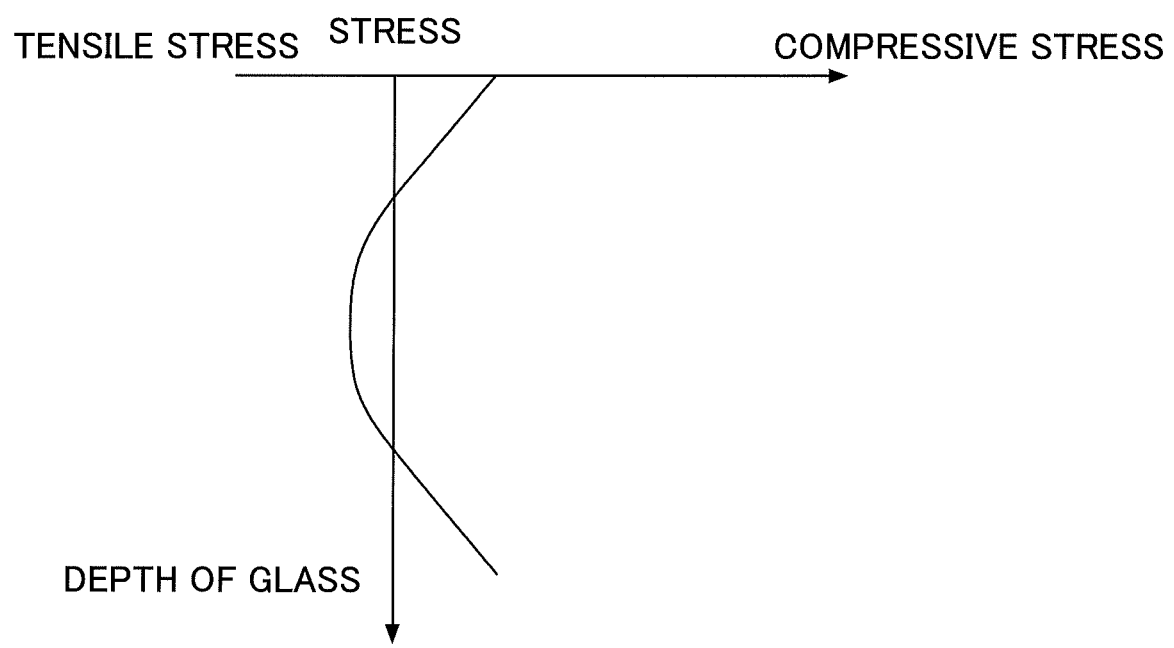
FIG. 53 is a diagram depicting an example of a stress distribution in the depth direction in the strengthened glass.

FIG. 53 is a diagram depicting an example of a stress distribution in the depth direction of the strengthened glass. A tensile stress is generated in a central portion with respect to a compressive stress formed on the surface. In principle, the stress is 0 as a whole. That is, an integration value (stress energy) of the stress distribution from the surface to the rear surface in the depth direction is 0.

In other words, an integration value of the compressive stress of the surface (compression energy) is equal to an integration value (tensile energy) of the tensile stress of the central portion. Moreover, typically, in a chemically strengthening process, the chemical strengthening process on both sides of the glass is performed under the same conditions, and the stress distribution is symmetrical with respect to the center of the glass. Thus, an integration from the surface to the glass middle point in the depth direction is also zero.

In the stress measurement device 1, a stress value is obtained by the glass depth, a differential value of a phase value (e.g. FIG. 7) of a change of a scattered light intensity, and a photoelastic constant (See first embodiment). Thus, the glass depth and a phase of change in scattered light intensity are the same as the integration value of the stress value. That is, in FIG. 7, a phase value at the center point of the strengthened glass and a phase value at the outermost surface of the strengthened glass are the same.

In the stress measurement device 1, there is a problem that when the laser light is diffusely reflected on the outermost surface of the strengthened glass, and irregular reflection light is generated, the phase value of the scattering intensity change at the outermost surface of the strengthened glass cannot be correctly measured.

Then, the phase value at the center point of the strengthened glass is used for the phase value of the scattering intensity change at the outermost surface or for correction thereof. Thus, for example, a stress value at the outermost surface of the strengthened glass and a stress value near the uppermost surface of the strengthened glass, along with the stress distribution, can be accurately measured. Moreover, when the measured phase value does not reach the center of the strengthened glass, the measured phase value may be extrapolated to the center of the strengthened glass, and set to be the phase value at the center of the strengthened glass.

In this way, when the thickness of the strengthened glass is known, based on the calculated stress distribution and the thickness of the strengthened glass, an amount of phase change at the outermost surface of the strengthened glass can be estimated so that the stress is balanced, and the surface stress value can be corrected.

Figure 54:
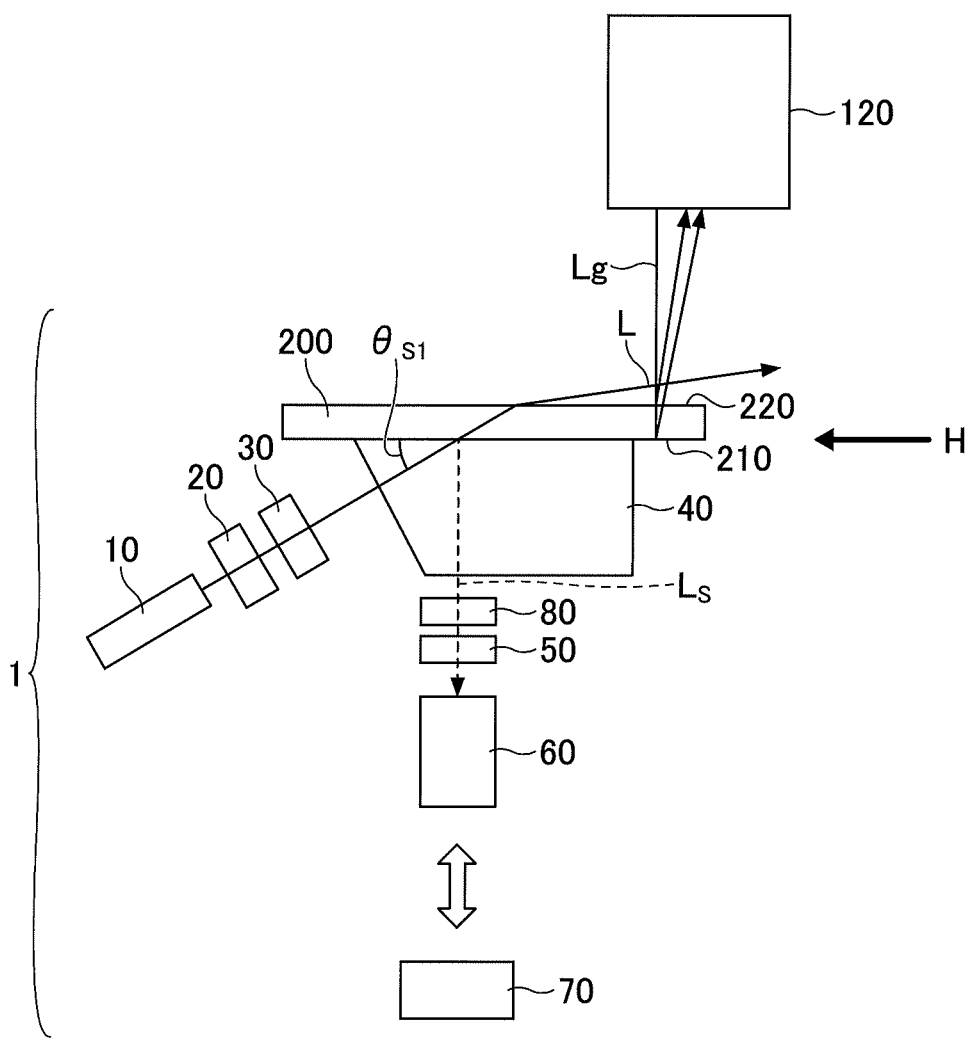
FIG. 54 is a diagram depicting an example of a stress measurement device in which a glass thickness measuring device is installed.

FIG. 54 is a diagram depicting an example of a stress measurement device in which a glass thickness measuring device is installed. The stress measurement device 3, illustrated in FIG. 54, has a configuration in which the glass thickness measuring device 120 is provided in the stress measurement device 1.

The glass thickness measuring device 120 includes a laser light source, a light receiving part, and an arithmetic part which are not shown. A laser light Lg emitted from the laser light source of the glass thickness measuring device 120 is reflected at the surface 210 and the rear surface 220 of the strengthened glass 200, and received by the light receiving part of the glass thickness measuring device 120. The arithmetic part of the glass thickness measuring device 120 measures a thickness of the strengthened glass 200 based on the light received by the light receiving part. For the glass thickness measuring device 120, for example, a commercially available glass thickness meter may be used.

In the stress measurement device 3, from the scattering light intensity change in the strengthened glass 200 due to the laser light from the laser light source 10, a phase value can be measured in a depth direction in the strengthened glass 200 from the surface by the stress measuring device 1. At the same time, in the stress measurement device 3, the thickness of the strengthened glass 200 can be measured by a glass thickness measuring device 120.

From the thickness and the phase value in the depth direction of the strengthened glass 200 measured by the glass thickness measuring device 120, the phase value at the center of the strengthened glass 200 can be measured or obtained by extrapolation. Then, based on the phase value, the phase value at the outermost surface of the strengthened glass 200 is set or corrected, and thereby the stress distribution can be obtained from the phase value in the depth direction in which the outermost surface is corrected.

In this way, in the stress measuring device 3 provided with means for measuring thickness of strengthened glass, the stress distribution and the thickness of the strengthened glass are measured, based on the measured thickness of the strengthened glass, and the amount of phase change at the outermost surface of the strengthened glass can be estimated.

As described above, the preferred embodiments have been described in detail. However, the present invention is not limited to the above-described embodiment, without departing from the scope of claims, various modifications and substitutions can be made in the embodiments described above.

For example, in each of the aforementioned embodiments, in the stress measurement device 1 or 2, the light source is described as a component. However, the stress measurement device 1 or 2 may not have a light source. A user of the stress measurement device 1 or 2 may prepare and use an appropriate light source.

REFERENCE SIGNS LIST 1, 1A, 1B, 1C, 2, 3 stress measurement device
10 laser light source
15 light source
20, 55 polarization member
25, 40, 41 light supply member
30, 30A polarization phase difference variable member
35, 42 light extraction member
40a incident surface of light supply member
40b emission surface of light supply member
40x, 43x recess
40y, 43y groove
43 projection
43e outer edge
44 support body
45, 50, 50A light conversion member
60, 60A, 65 imaging element
70, 75 arithmetic unit
80, 80A light wavelength selection member
90 liquid
100 land member
120 glass thickness measuring device
200 strengthened glass
210 surface of strengthened glass
215 observation surface
220 rear surface of strengthened glass
250 incident surface of laser light
301 digital data storage circuit
302 clock signal generation circuit
303 DA converter
304 voltage amplifier circuit
310 polarization phase difference generating material
311, 313 fixing jig
312 Piezo element
701 luminance change measuring means
702 phase change calculation means
703 stress distribution calculation means
751 position measuring means
752 stress distribution calculation means
753 synthesis means

What is claimed is:

1. A stress measurement device for strengthened glass comprising:
    a polarization phase difference variable member configured to vary a polarization phase difference of a laser light by one wavelength of the laser light or more;
    an imaging element configured to image a plurality of times at a predetermined time interval a scattered light emitted according to the laser light with the varied polarization phase difference entering the strengthened glass, and obtain a plurality of images; and
    an arithmetic unit configured to measure a periodic change in luminance of the scattered light using the plurality of images, calculate a change in a phase of the change in luminance, and calculate a stress distribution in a depth direction from a surface of the strengthened glass based on the change in the phase.

2. The stress measurement device for strengthened glass according to claim 1,
    wherein the polarization phase difference variable member is a liquid crystal element.

3. The stress measurement device for strengthened glass according to claim 1,
    wherein a product of a photoelastic constant and a Young's modulus of the polarization phase difference variable member is 0.1 or more, and
    wherein the polarization phase difference variable member is a transparent member that generates the polarization phase difference by applying a stress.

4. The stress measurement device for strengthened glass according to claim 1,
    wherein the transparent member is configured of quartz glass or polycarbonate.

5. The stress measurement device for strengthened glass according to claim 1,
wherein a position of a smallest beam diameter of the laser light is located in an ion exchange layer of the strengthened glass, and
wherein the smallest beam diameter is 20 μm or less.

6. The stress measurement device for strengthened glass according to claim 1,
wherein an incident surface of the laser light incident on the strengthened glass is inclined by 45±5° with respect to the surface of the strengthened glass.

7. The stress measurement device for strengthened glass according to claim 6 further comprising:
a light supply member for causing the laser light with the varied polarization phase difference to enter the strengthened glass, which is a subject to be measured, obliquely with respect to the surface of the strengthened glass,
wherein an angle of a surface of the light supply member on which the laser light is incident is set so that the incident surface of the laser light incident on the strengthened glass is inclined by 45±5° with respect to the surface of the strengthened glass.

8. The stress measurement device for strengthened glass according to claim 1 further comprising:
a light supply member for causing the laser light with the varied polarization phase difference to enter the strengthened glass, which is a subject to be measured, obliquely with respect to the surface of the strengthened glass; and
a liquid between the light supply member and the strengthened glass, a difference between a refractive index of the liquid and a refractive index of the strengthened glass being 0.03 or less,
wherein a thickness of the liquid is 10 μm or more and 500 μm or less.

9. The stress measurement device for strengthened glass according to claim 8,
wherein a recess having a depth of 10 μm or more and 500 μm or less is formed on a surface of the light supply member in contact with the strengthened glass, and
wherein the recess is filled with the liquid.

10. The stress measurement device for strengthened glass according to claim 8,
wherein a projection part in contact with the strengthened glass is provided on a surface of the light supply member,
wherein the projection part forms a part of an optical path of the laser light incident into the strengthened glass via the light supply member,
wherein a recess having a depth of 10 μm or more and 500 μm or less is formed on the projection part on a side in contact with the strengthened glass, and
wherein the recess is filled with the liquid.

11. The stress measurement device for strengthened glass according to claim 10,
wherein the projection part is held attachably or detachably to/from a surface of the light supply member.

12. The stress measurement device for strengthened glass according to claim 10,
wherein a flat outer edge portion is formed around the recess, and
wherein the flat outer edge portion is a surface in contact with the strengthened glass.

13. The stress measurement device for strengthened glass according to claim 9,
wherein the recess includes a surface provided with a curved portion.

14. The stress measurement device for strengthened glass according to claim 9,
wherein a groove for discharging the liquid is formed on a periphery of the recess.

15. The stress measurement device for strengthened glass according to claim 9,
wherein when a refractive index of the light supply member and the refractive index of the strengthened glass are different from each other,
the refractive index of the strengthened glass is acquired,
an incident complementary angle when the laser light is incident on the strengthened glass is derived from a relation between a trajectory of the laser light in the strengthened glass obtained based on the refractive index of the strengthened glass and an image of the laser light acquired by the imaging element,
a stress distribution that is in a depth direction from the surface of the strengthened glass is corrected based on a value of the incident complementary angle.

16. The stress measurement device for strengthened glass according to claim 15,
wherein the refractive index of the strengthened glass is obtained based on the image of the laser light acquired by the imaging element.

17. The stress measurement device for strengthened glass according to claim 1,
wherein when a thickness of the strengthened glass is known, a phase change amount with respect to an outermost surface of the strengthened glass that balances a stress balance is estimated based on the calculated stress distribution and the thickness of the strengthened glass, and a surface stress value is corrected.

18. The stress measurement device for strengthened glass according to claim 1 further comprising:
a means for measuring a thickness of the strengthened glass,
wherein the stress distribution and the thickness of the strengthened glass are measured, and a phase change amount with respect to an outei most surface of the strengthened glass is estimated based on the measured thickness of the strengthened glass.

19. The stress measurement device for strengthened glass according to claim 1,
wherein on an emission side of the laser light of the strengthened glass, the laser light in the strengthened glass satisfies a condition of total reflection.

20. The stress measurement device for strengthened glass according to claim 1 further comprising:
a second light supply member for causing a light from a second light source to be incident into a surface layer having a compressive stress layer of the strengthened glass;
a light extraction member for emitting a light propagated in the surface layer to the outside of the strengthened glass;
a light conversion member for converting two kinds of light components oscillating in parallel to and orthogonal to a boundary surface between the strengthened glass and the light extraction member included in the light emitted via the light extraction member, into two kinds of bright line arrays each having two or more bright lines;

a second imaging element for capturing the two kinds of bright line arrays; and a position measuring means for measuring the two or more bright lines of each of the two kinds of bright line arrays from an image captured by the second imaging element, wherein the arithmetic unit synthesizes a stress distribution of a first region in the depth direction from the surface of the strengthened glass corresponding to the two kinds of light components calculated based on a measurement result by the position measuring means, and a stress distribution of a region other than the first region calculated based on the change in the phase.

21. The stress measurement device for strengthened glass according to claim 1, wherein a light wavelength selection member, which does not transmit 50% or more of a light having a wavelength of greater than or equal to the wavelength of the laser light by 100 nm and a light having a wavelength of less than or equal to the wavelength of the laser light by 100 nm, is inserted into an optical path of the laser light incident on the imaging element.

22. A stress measuring method for strengthened glass comprising:

a polarization phase difference variable step of varying a polarization phase difference of a laser light by one wavelength of the laser light or more;

an imaging step of imaging a plurality of times at a predetermined time interval a scattered light emitted according to the laser light with the varied polarization phase difference entering the strengthened glass, and obtaining a plurality of images; and an arithmetic step of measuring a periodic change in luminance of the scattered light using the plurality of images, calculating a change in a phase of the change in luminance, and calculating a stress distribution in a depth direction from a surface of the strengthened glass based on the change in the phase.

23. The stress measuring method for strengthened glass according to claim 22, wherein in the polarization phase difference variable step the polarization phase difference is varied by a liquid crystal element.

24. The stress measuring method for strengthened glass according to claim 22 further comprising:

a step of calculating, based on positions of bright lines of P polarization and S polarization, refractive index distributions of the P polarization and the S polarization, respectively, and obtaining a second stress distribution based on a refractive index distribution difference between the P polarization and the S polarization and a photoelastic constant of the strengthened glass.

25. The stress measuring method for strengthened glass according to claim 24 further comprising:

a step of synthesizing the first stress distribution and the second stress distribution, obtained by using the stress measuring method for strengthened glass according to claim 24, for one or more strengthened glass among a plurality of strengthened glasses manufactured by a same manufacturing process, to obtain a stress distribution, and for another strengthened glass, obtaining a stress distribution only by measuring any one of the first stress distribution and the second stress distribution.

26. A manufacturing method of strengthened glass comprising:

obtaining a characteristic value from a stress value obtained by using a stress measuring method for strengthened glass including a polarization phase difference variable step of varying a polarization phase difference of a laser light by one wavelength of the laser light or more, an imaging step of imaging a plurality of times at a predetermined time interval a scattered light emitted according to the laser light with the varied polarization phase difference entering the strengthened glass, and obtaining a plurality of images, and an arithmetic step of measuring a periodic change in luminance of the scattered light using the plurality of images, calculating a change in a phase of the change in luminance, and calculating a stress distribution in a depth direction from a surface of the strengthened glass based on the change in the phase; and confirming whether the characteristic value falls within a management range, before performing a shipping determination.

27. The manufacturing method of strengthened glass according to claim 26, wherein in the polarization phase difference variable step the polarization phase difference is varied by a liquid crystal element.

28. The manufacturing method of strengthened glass according to claim 26 further comprising:

a step of calculating, based on positions of bright lines of P polarization and S polarization, refractive index distributions of the P polarization and the S polarization, respectively, and obtaining a second stress distribution based on a refractive index distribution difference between the P polarization and the S polarization and a photoelastic constant of the strengthened glass.

29. The manufacturing method of strengthened glass according to claim 28 further comprising:

synthesizing the first stress distribution and the second stress distribution obtained by the stress measuring method for one or more strengthened glass among a plurality of strengthened glasses manufactured by a same manufacturing process, to obtain a stress distribution, and for another strengthened glass, obtaining a stress distribution only by measuring any one of the first stress distribution and the second stress distribution.

30. The manufacturing method of strengthened glass according to claim 26 further comprising:

two or more strengthening steps of preparing strengthened glass obtained by strengthening a lithium containing glass, and performing a shipping determination for the strengthened glass, wherein in each of the strengthening steps, the shipping determination is performed based on the first stress distribution obtained by the stress measuring method.

31. The manufacturing method of strengthened glass according to claim 30, wherein in a final strengthening step, the stress measuring method includes a step of calculating, based on positions of bright lines of P polarization and S polarization, refractive index distributions of the P polarization and the S polarization, respectively, and obtaining a second stress distribution based on a refractive index distribution difference between the P polarization and the S polarization and a photoelastic constant of the strengthened glass, and the shipping determination is performed based on the second stress distribution obtained by the stress measuring method.

32. The manufacturing method of strengthened glass according to claim 31,
wherein in a strengthening step, of the two or more strengthening steps, other than the final strengthening step, the shipping determination is performed based on a stress value at a deepest part of the glass (CT) derived from the first stress distribution, and a glass depth at which a stress value becomes zero (DOL_zero).

33. The manufacturing method of strengthened glass according to claim 31,
wherein in the final strengthening step, a function approximation is performed for the second stress distribution, to perform the shipping determination.

34. The manufacturing method of strengthened glass according to claim 33,
wherein the function approximation is performed with equation 2, $$\sigma_f(x) = a \cdot x + CS2 \quad \text{(equation 2)}$$

where $\sigma_f(x)$ is the second stress distribution, a is a slope, and CS2 is a stress value on an outermost surface.

35. The manufacturing method of strengthened glass according to claim 33,
wherein the function approximation is performed with equation 3, $$\sigma_f(x) = CS2 \cdot \mathrm{erfc}(a \cdot x) \quad \text{(equation 3)}$$

where $\sigma_f(x)$ is the second stress distribution, a is a slope, CS2 is a stress value on an outermost surface, and erfc is an error function.

36. The manufacturing method of strengthened glass according to claim 31,
wherein in the strengthening step other than the final strengthening step, using a second stress distribution obtained in the strengthening step, a plate thickness of the strengthened glass t, and a first stress distribution which was measured in advance under a same condition, the first stress distribution and the second stress distribution are synthesized, a stress value at a deepest part of the glass (CT) is found from the synthesized stress distribution, a characteristic value is derived, and the shipping determination is performed according to whether the characteristic value falls within an allowable range.

37. The manufacturing method of strengthened glass according to claim 31,
wherein in the strengthening step other than the final strengthening step, using a second stress distribution obtained in the strengthening step, a plate thickness of the strengthened glass t, and a first stress distribution which was measured in advance under a same condition, the first stress distribution and the second stress distribution are synthesized, a stress value at a deepest part of the glass (CT), at which an integration value of the synthesized stress distribution becomes zero, is found, a characteristic value is derived, and the shipping determination is performed according to whether the characteristic value falls within an allowable range.

38. The manufacturing method of strengthened glass according to claim 31,
wherein in the strengthening step other than the final strengthening step, using a second stress distribution obtained in the strengthening step, a plate thickness of the strengthened glass t, and a first stress distribution which was measured in advance under a same condition, the first stress distribution and the second stress distribution are synthesized, the synthesized stress distribution is approximated with equation 5, $$\sigma(x) = \mathrm{Max}\left[\sigma_f(x), \frac{CS_0}{1 - \mathrm{erfc}\left(c \cdot \frac{t}{2}\right)} \cdot \left\{\mathrm{erfc}(c \cdot x) - \mathrm{erfc}\left(c \cdot \frac{t}{2}\right)\right\} - CT\right] \quad \text{(equation 5)}$$

where $\sigma(x)$ is the stress distribution after synthesis, $\sigma_f(x)$ is the second stress distribution, t is a plate thickness of the strengthened glass, $CS_0$ and c are parameters derived based on the first stress distribution,
a stress value at a deepest part of the glass (CT), at which an integration value (x=0 to t/2) of $\sigma(x)$ becomes zero, is found, a characteristic value is derived, and the shipping determination is performed according to whether the characteristic value falls within an allowable range.

39. The manufacturing method of strengthened glass according to claim 38,
wherein the parameters $CS_0$ and c are derived based on the first stress distribution which was measured in advance under the same condition.

40. The manufacturing method of strengthened glass according to claim 38,
wherein the parameters CS0 and c are derived based on parameters CS0' and c' derived from a first stress distribution obtained in a first preceding strengthening step occurring before the final strengthening step, and equation 6 and equation 7

$$CS_0 = A1 \times CS_0' \quad \text{(equation 6)}$$

and $$c = A2 \times c' \quad \text{(equation 7)}$$

where A1 and A2 are constants of proportionality.

41. The manufacturing method of strengthened glass according to claim 40,
wherein the constants of proportionality A1 and A2 are derived based on the first stress distribution which was measured in advance under the same condition.

* * * * *